United States Patent [19]
Smith, II et al.

[11] Patent Number: 5,884,298
[45] Date of Patent: Mar. 16, 1999

[54] METHOD FOR ACCESSING AND UPDATING A LIBRARY OF OPTICAL DISCS

[75] Inventors: Robert H. Smith, II, Trabuco; Scott R. Hanggie, Aliso Viejo, both of Calif.; Mark L. Weaver; Stephan E. Benzie, both of Ann Arbor, Mich.

[73] Assignee: Cygnet Storage Solutions, Inc., San Jose, Calif.

[21] Appl. No.: 770,853

[22] Filed: Dec. 20, 1996

Related U.S. Application Data

[60] Provisional application Nos. 60/023,233 Mar. 29, 1996 and 60/025,752 Sep. 19, 1996.

[51] Int. Cl.$^6$ ........................................................ G06F 17/30
[52] U.S. Cl. .............................................. 707/2; 707/204
[58] Field of Search ........................................ 707/2, 204

[56] References Cited

U.S. PATENT DOCUMENTS

| | | | |
|---|---|---|---|
| 5,455,926 | 10/1995 | Keele et al. | 711/4 |
| 5,568,455 | 10/1996 | Balsom | 711/4 |
| 5,590,320 | 12/1996 | Maxey | 707/203 |
| 5,604,824 | 2/1997 | Chui et al. | 382/248 |
| 5,628,014 | 5/1997 | Checchini et al. | 707/205 |
| 5,678,023 | 10/1997 | Adams et al. | 711/112 |
| 5,727,197 | 3/1998 | Burgess et al. | 707/2 |

*Primary Examiner*—Wayne Amsbury
*Attorney, Agent, or Firm*—Hopkins & Carley

[57] ABSTRACT

A method accesses and updates information from a library of optical discs and includes a step of cataloging optical discs. The cataloging step includes the generation of a unique value for each of the cataloged discs. The unique value is produced by iteratively reading data from each disc and iteratively combining the data. The cataloging step includes the generation of catalog data streams. The catalog data streams include fixed length data representing file and directory attributes and variable length data representing file names and directory names. The method includes the further step of producing limited depth catalogs representing file and directory information on the optical discs. The limited depth catalogs have a fixed number of subdirectory levels and file types. The fixed number is selected by a user, and the file types are selected by a user. The method includes the further step of caching optical disc data to a hard disc. The cached data are written to the hard disc when the optical disc data are requested more frequently than other optical disc data. The requests are monitored by a caching file system. The caching file system determines when the requests for data can be satisfied by cached data. The caching file system satisfies the requests by accessing and communicating requested data from the cache. The method includes the step of reconciling actual storage locations of optical discs with storage locations represented in a database. The method includes the step of manipulating physical components of an optical disc library by dragging and dropping icons displayed on a user interface, the icons being associated with the physical components. The method includes the step of displaying an hierarchical index to a user, said index representing the subordinate relationship of the components of an optical disc library. The method includes the step of recording check-out and check-in transactions and maintaining a history of such transactions.

13 Claims, 36 Drawing Sheets

FIG. 7B

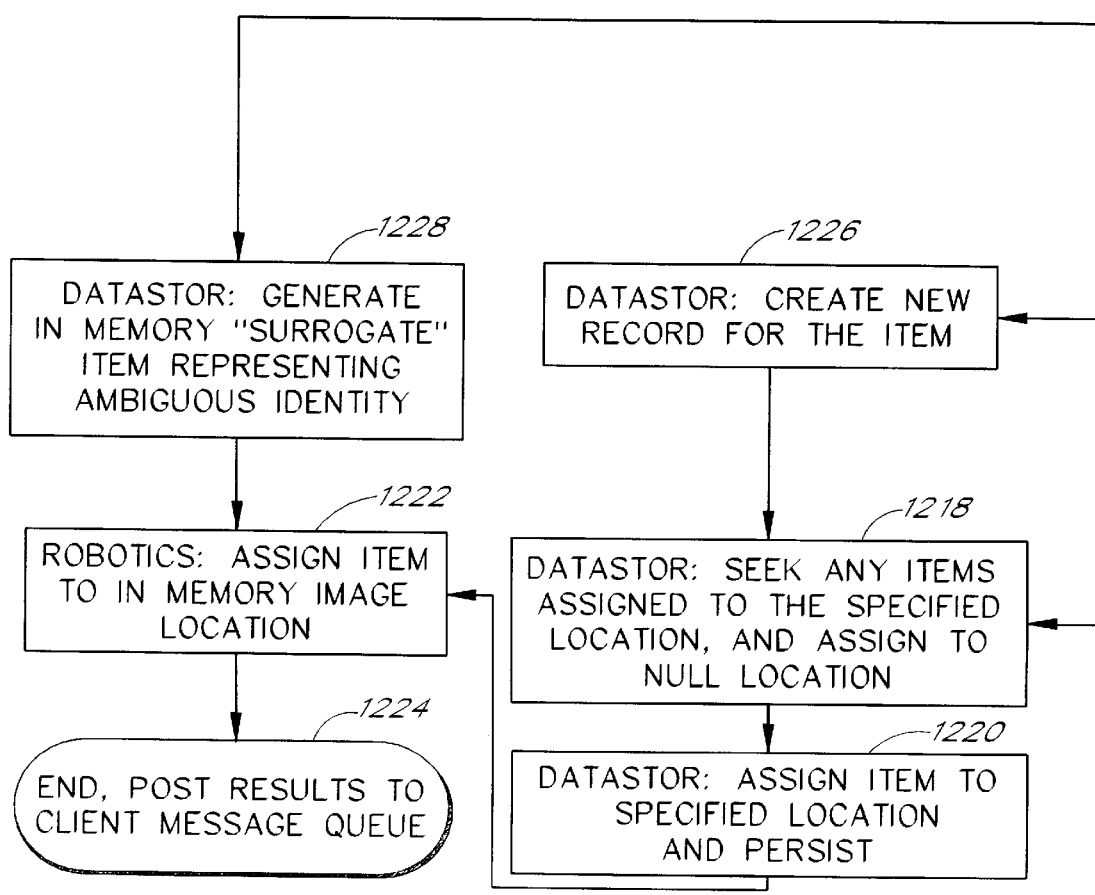

METHOD FOR ACCESSING AND UPDATING A LIBRARY OF OPTICAL DISCS

This application claims priority from U.S. Provisional Application No. 60/025752 filed on Sept. 19, 1996 and also claims priority from U.S. Provisional Application No. 60/023233 filed on Mar. 29, 1996.

BACKGROUND OF THE INVENTION

1. Field of the Invention

This invention relates to the field of high-capacity data storage, and more particularly relates to a method for accessing and updating a library of optical discs.

2. Description of the Related Art

The availability of data is expanding as the density of storage media increases and the cost of such media decreases. At present, distributors of vast quantities of digital data publish their data on CD-ROM (compact disc read-only memory) as the media of choice. The high volume of materials published on CD-ROM has driven the cost of CD-ROM media to affordable levels.

Important information resources are now distributed as multiple-CD-ROM sets, such as medical journals, business contacts, academic studies from a variety of sciences, education volumes, and the list is growing. Due to the popularity of compact discs, resulting from increased efficiency and faster access to greater amounts of information, collections of CD-ROM media are becoming larger and more difficult to manage in businesses across the country.

Computers are now being sold with CD-ROM drives as a standard, factory installed feature. Yet, few computers and CD-ROM reading devices can read more than one CD-ROM disc at a time. As the need to access CD-ROM data grows in proportion to the size of disc collections, the ability to manage CD-ROM discs becomes more difficult, yet, at the same time, more important.

One problem is simply tracking the location of each CD-ROM disc. CD-ROM discs tend to become lost or misplaced easily due to their small size. Another problem is the need to interchange and/or sequentially load different CD-ROM titles as the need arises. Yet another issue is making the information contained on any given CD-ROM accessible to many users.

What is needed is a complete system for managing a library of CD-ROM media, and for making this library available to many persons.

SUMMARY OF THE INVENTION

The present invention provides multiple computer users with the ability to access a library of removable computer-readable media, such as optical discs. Advantageously, the present invention permits cataloging of optical discs wherein the contents of each disc are made available to users via a browsable, hierarchical index, and each disc is assigned to a storage location, such as a particular tray of a particular magazine. As a further advantage, the present invention permits users to check-out and check-in optical discs, and provides a reconciliation process to ensure that a computer-based index mapping individual optical discs to discrete storage locations is always up-to-date despite occasional misplacement of optical discs. A flexible method for uniquely identifying an optical disc using data comprising its contents assists the reconciliation process.

Users of the present invention benefit still further by icon-based retrieval and loading of optical discs whereby the mere dragging and dropping of icons causes a robotic optical disc exchanger to retrieve a selected optical disc from a storage location and to load it into an optical disc drive. The present invention resolves any conflicts arising when two or more users simultaneously attempt to use the same optical disc drive. The present invention also enhances performance of an optical disc library by storing frequently used or otherwise important optical disc data in a high-speed cache.

One aspect of the present invention is a method for accessing and updating information from the library of optical discs. That method comprises the steps of cataloguing optical discs, the cataloguing step including the generation of a unique contents-based value for each of the catalogued discs, the unique value produced by iteratively reading data from the target disc and condensing the data using a selected hashing algorithm, the cataloguing step including the generation of catalogue data streams, the catalogue data streams comprising fixed length data representing file and subdirectory attributes as well as variable length data representing file names and directory names; producing limited catalogues representing file and directory information on the optical discs, the limited catalogues confined to a fixed maximum number of subdirectory levels, the limited catalogues including files and directories on the disc possessing attributes which match a specific set of filter parameters, the fixed maximum number of subdirectory levels selected by a user, and the filter parameters selected by a user; and caching optical disc data to a hard disc, the cached data being written to the hard disc when the optical disc data is requested more frequently than other optical disc data, the request being monitored by a caching file system, the caching file system determining when the request for data can be satisfied by cached data, the caching file system satisfying the request by accessing and communicating requested data from the cache. The method preferably includes the step of reconciling the storage location of an optical media device, the optical media device stored in the storage location, the storage location represented by first data stored in the computer memory, the first data being associated with second data identifying an expected optical media device, the storage location being examined by a computer controlled reading device to identify the optical media device, the reading device generating a third data identifying the optical media device, the third data compared to the second data.

Another aspect of the present invention is a method for creating a fingerprint identification value to identify removable computer readable media. The fingerprint identification value comprises a fixed number of binary bits. The method comprises the steps of reading file and directory information from the removable computer readable media to produce a stream of bytes; sequentially adding each successive byte in the stream to a successive eight-bit segment of the fingerprinted identification value, the successive eight-bit segment being the least signification eight bits of the fingerprint identification value following any addition involving the most significant bit of the fingerprint identification value; and replacing each successive eight-bit segment of the fingerprint identification value with the least significant eight bits of the sum of the addition performed on the successive segment.

Still another aspect of the present invention is a method of accessing removable computer-readable media. The computer readable media are stored in the media storage location of a media transport device. The method comprises the steps of presenting a media load option to a user via a user interface running on a computer; associating a set of commands with the media load option, the set of commands causing the media transport device to retrieve a computer-readable medium from a media storage location and to load the computer readable medium in a media-reading device; monitoring user input for selection of the media load option; and responding to selection of the media load option by issuing the set of commands to the media transport device. Preferably, the media load option comprises an icon selectable via a mouse.

Still another aspect of the present invention is a method of accessing removable computer-readable media in a media transport device. The method comprises the steps of (1) associating a computer-readable medium with a medium icon, the medium icon occupying a two-dimensional space while displayed on a user interface of a user computer, the medium icon being movable within the user interface by user input; (2) associating a media-reading device with a reader icon, the reader icon occupying a two-dimensional space while displayed on the user interface; (3) associating a first set of commands with a first spatial relationship between the medium icon and the reader icon, the first spatial relationship occurring when the two-dimensional space of the medium icon shares any portion of the two-dimensional space of the reader icon, the first set of commands causing the media transport device to retrieve the computer-readable medium from a media storage location and to load the computer-readable medium in a media-reading device; (4) associating a second set of commands with a second spatial relationship between the medium icon and the reader icon, the second spatial relationship occurring when the two-dimensional space of the medium icon shares no portion of the two-dimensional space of the reader icon, the second set of commands causing the media transport device to unload said computer readable medium from the media-reading device and to store the computer-readable medium in the media storage location; (5) monitoring user input for movement of the medium icon; (6) issuing the first set of commands to the media transport device if the first spatial relationship occurs and if the computer-readable medium is not in the media reading device; and (7) issuing the second set of commands to the media transport device if the second spatial relationship occurs and if the computer-readable media is in the media-reading device.

Another aspect of the present invention is a method for physically controlling removable computer-readable media from a user interface. The method comprises the steps of associating a physical medium with an icon; associating a physical media access device with an icon; selecting a first icon associated with a physical medium; dragging the selected first icon to a location proximate to a second icon associated with a physical media access device; dropping said first icon at the second icon, and moving the physical medium associated with the first icon to the device associated with the second icon.

Yet another aspect of the present invention is a method for using the computer to control a media transport device. The method comprises the steps of running a client process on the computer, the client process displaying a user interface to a user, the user interface presenting a media transport option to the user; running a server process on the computer; monitoring user input for selection of the media transport option; responding to selection of the media transport option by transmitting first media transport commands to the server process; translating the other server process the first media transport commands into second media transport commands; transmitting the second media transport commands to the media transport device to cause physical movement of a computer-readable medium from a storage location for such media into a media-reading device.

Still another aspect of the present invention is a method for displaying an hierarchical index comprising components of a library of optical media. The method comprises the steps of (1) maintaining in a computer-readable memory a first storage location data record corresponding to a first media storage device; (2) maintaining the computer-readable memory an optical media record corresponding to an optical medium, the optical medium storing computer-readable data, the optical media record having a data identifier identifying the computer-readable data, the first media storage device storing the optical medium, the first storage location data record having a medium identifier uniquely identifying the optical medium; (3) displaying a library index option to a user via a user computer; (4) monitoring user input for selection of the library index option; (5) responding to selection of the library index option by displaying a first storage device icon associated with the first media storage device; (6) monitoring user input for selection of the first storage device icon; (7) responding to selection of the first storage device icon by displaying an optical medium icon having first horizontal and vertical displacements from the first storage device icon, and by displaying the medium identifier proximate to the optical medium icon; (8) monitoring user input for selection of the medium icon; and (9) responding to selection of the medium icon by displaying the data identifier, the data identifier having second horizontal and vertical displacements from the medium icon.

Another aspect of the present invention is a method for displaying an hierarchical index comprising components of a library of optical media. The method comprises the steps of (1) maintaining in a computer-readable memory a first storage location data record corresponding to a first media storage device; (2) maintaining in the computer-readable memory a second storage location data record corresponding to a second media storage device, the first storage location data record having a subordinate storage identifier identifying the second storage device, the first storage media device storing the second media storage device; (3) maintaining in the computer-readable memory an optical media record corresponding to an optical medium, the optical medium storing computer readable data, the second media storage device storing the optical medium, the second storage location data record having a medium identifier uniquely identifying the optical medium; (4) displaying a library index option to a user via a user computer; (5) monitoring user input for selection of the library index option; (6) responding to selection of the library index option by displaying a first storage device icon associated with the first media storage device; (7) monitoring user input for selection of the first storage device icon; (8) responding to selection of the first storage device icon by displaying a second storage device icon at first horizontal and vertical displacements from the first storage device icon, by retrieving the subordinate storage identifier from the first storage location data record, and by displaying the subordinate storage identifier proximate to the second storage device icon; (9) monitoring user input for selection of the second storage device icon; and (10) responding to selection of the second storage device icon by displaying an optical media icon at first horizontal and vertical displacements from the second storage device icon, by retrieving the medium identifier from the second storage location data record, and by displaying the medium identifier proximate to the optical medium icon.

Still another aspect of the present invention is a method for using the computer to control storage of removable computer readable media. The computer utilizes a media-reading device as a temporary storage location. The method comprises the steps of (1) storing a first removable computer readable medium in an originating storage location; (2) determining a destination storage location, the originating storage location different from the destination storage location; (3) generating with the computer detection commands for a media transport device and transmitting the detection commands to the media transport device, the media transport device responding to the detection commands by detecting the presence of a second removable computer-readable medium stored in the destination storage location; (4) generating with the computer first retrieval commands and transmitting the first retrieval commands to the media transport device, the media transport device responding to the first retrieval commands by removing the second removable computer-readable medium from the destination storage location and by storing the second removable computer-readable medium in the media reading device; and (5) generating with the computer second retrieval commands and transmitting the second retrieval commands to the media transport device, the media transport device responding to the second retrieval command by removing the first removable computer readable medium from the originating storage location and by storing the first removable computer-readable medium in the destination storage location.

Yet another aspect of the present invention for using a computer to control storage of removable computer-readable media. The computer utilizes a media-reading device as a temporary storage location. The method comprises the steps of (1) storing in computer-readable memory a data record associating a first media identifier with a storage identifier, the media identifier identifying a first removable computer-readable medium, the storage identifier identifying an originating storage location, the first removable computer-readable medium stored in the originating storage location; (2) determining a destination storage location for the first removable computer-readable medium, the originating storage location different from the destination storage location; (3) generating with the computer detection commands for a media transport device and transmitting the detection commands to the media transport device, the media transport device responding to the detection commands by detecting the presence of a second removable computer-readable medium stored in the destination storage location; (4) generating with the computer first retrieval commands and transmitting the first retrieval commands to the media transport device, the media transport device responding to the first retrieval commands by removing the second removable computer-readable medium from the destination storage location and by storing the second removable computer-readable medium in the medium-reading device; (5) generating with the computer second retrieval commands and transmitting the second retrieval commands to the media transport, the media transport device responding to the second retrieval commands by removing the first removable computer-readable medium from the originating storage location and by storing the first removable computer-readable medium in the destination storage location; and (6) associating via the data record a first media identifier with a second storage identifier, the second storage identifier identifying the destination storage location.

Yet another aspect of the present invention is a method for displaying and browsing an index comprising the contents of an off-line optical media storage device. The method comprises the steps of (1) maintaining in computer-readable memory an off-line magazine data record corresponding to the off-line optical media storage device; (2) maintaining in computer-readable memory an optical medium data record corresponding to an optical medium, the optical medium storing computer-readable data, the off-line magazine data record having a medium identifier identifying the optical medium, the off-line optical media storage device storing the optical medium; (3) displaying an off-line magazine option to a user via a user computer; (4) monitoring user input for selection of the off-line magazine option; (5) responding to selection of the off-line magazine option by displaying an off-line magazine icon associated with the off-line optical media storage device; (6) monitoring user input for selection of the off-line magazine icon; and (7) responding to selection of the off-line magazine icon by displaying an optical medium icon at first horizontal and vertical displacements from the off-line magazine icon, by retrieving the medium identifier from the off-line magazine data record, and by displaying the medium identifier proximate to the optical medium icon.

Another aspect of the present invention is a method for verifying the location of an optical media device. The method comprises the steps of (1) storing first data in a computer memory, the first data identifying the optical media device; (2) storing second data in the computer memory, the second data representing an expected storage location, the second data associated with the first data; (3) displaying a selectable representation of the optical media device to a user via a user interface of the user computer; (4) monitoring user input for selection of the selectable representation; (5) responding to selection of the selectable representation by transmitting commands via the user computer to an optical media device reader, the commands causing the optical media device reader to access the expected storage location; (6) determining via the optical media device reader whether the expected storage location is occupied; (7) reading via the optical media device reader the identity of a found optical media device occupying the expected storage location; and (8) comparing the read identity to the first data.

Another aspect of the present invention is a method for checking-out and checking-in removable, computer-readable media in a media storage system. The method comprises the steps of (1) monitoring a user computer for a media selection event, the media selection event corresponding to user input identifying a removable, computer-readable medium; (2) accessing a first check-out transaction record stored on computer storage media accessible by the user computer, the first check-out transaction record representing a prior check-out of the removable computer-readable medium; (3) scanning the first check-out transaction record for check-in data representing a prior check-in corresponding to the prior check-out; (4) responding to the presence of the check-in data by displaying to the user a check-out option on the screen of the user computer and monitoring user input for selection of the check-out option; and (5) creating a second check-out transaction record associated with the removable computer-readable medium, the check-out transaction record storing a representation of a check-out operation.

Yet another checking of the present invention is a method for checking-out and checking-in a removable media magazine. The magazine stores a plurality of removable, computer-readable media. The method comprises the steps of (1) monitoring a user computer for a magazine selection event, the magazine selection event corresponding to user input identifying a removable media magazine; (2) accessing a first check-out transaction record stored on computer storage media accessible by the user computer, the first check-out transaction record representing a prior check-out of the removable media magazine; (3) scanning the first check-out transaction record for check-in data representing a prior check-in corresponding to the prior check-out; (4) responding to the presence of the check-in data by displaying to the user a check-out option on the screen of the user computer and monitoring user input for selection of the check-out option; and (5) creating a second check-out transaction record associated with the removable media magazine, the check-out transaction record storing a representation of a check-out operation.

Another aspect of the present invention is a method for cataloguing the contents of a removable computer-readable medium. The method comprises the steps of (1) generating a first medium identifier identifying a removable computer-readable medium, the first medium identifier generated by iteratively combining data read from the removable computer-readable medium; (2) prompting a user to specify a maximum number of catalogue levels; (3) monitoring user input for entry of the maximum number of catalogue levels; (4) prompting a user to specify file filter parameters; (5) monitoring user input for entry of the file filter parameters; (5) reading from the removable computer-readable medium successive levels of files and directories up to the maximum number of catalogue levels; (6) retaining attributes and names for directories and files which match the file filter parameters; (7) producing a first data stream comprising the retained names arranged such that names of directories precede names of files and names from a successive directory level follow names from a preceding directory level; (8) producing a second data stream comprising a series of fixed length data blocks, each fixed length data block comprising a retained attribute of a file or directory, each fixed length data block having a pointer to a position in the first data stream at which an associated name occurs, each fixed length data block having a value corresponding to a length of an associated name, each fixed length data block having attributes representing a directory having a pointer to a fixed length data block corresponding to a file from the represented directory; and (9) associating the first medium identifier with the first and second data streams.

Yet another aspect of the present invention is a method for caching data from a removable computer-readable medium to a hard disk. The method comprises the steps of (1) storing caching criteria on a hard disk; (2) requesting access to information stored on the removable computer-readable medium; (3) determining whether the information is stored in a cache on a hard disk; (4) determining whether the information is marked for cache storage by scanning a database record for presence of a cache-to-do flag, the database record associated with the removable computer-readable medium, and if the cache-to-do flag is present in the database record then storing the information in the cache; (5) determining whether the information satisfies the caching criteria, and if the caching criteria are satisfied then marking the information for cache storage by storing a cache-to-do flag in the database record. Preferably, the caching criteria include a frequency-of-use threshold value. The method also preferably includes the further step of increasing a usage frequency value associated with the removable computer-readable medium.

BRIEF DESCRIPTION OF THE DRAWINGS

The present invention will be described below in connection with the accompanying drawing figures in which:

FIGS. 7A and 7B illustrate a graphical user interface representing actual optical media elements and a hierarchical view and a subordinate view of the contents of a user-selected element;

FIGS. 12A, 12B, and 12C comprise a flowchart illustrating the steps of reconciling and synchronizing an actual location of an optical disc magazine with an expected location of the magazine;

DETAILED DESCRIPTION OF THE PREFERRED EMBODIMENT

Figure 1:
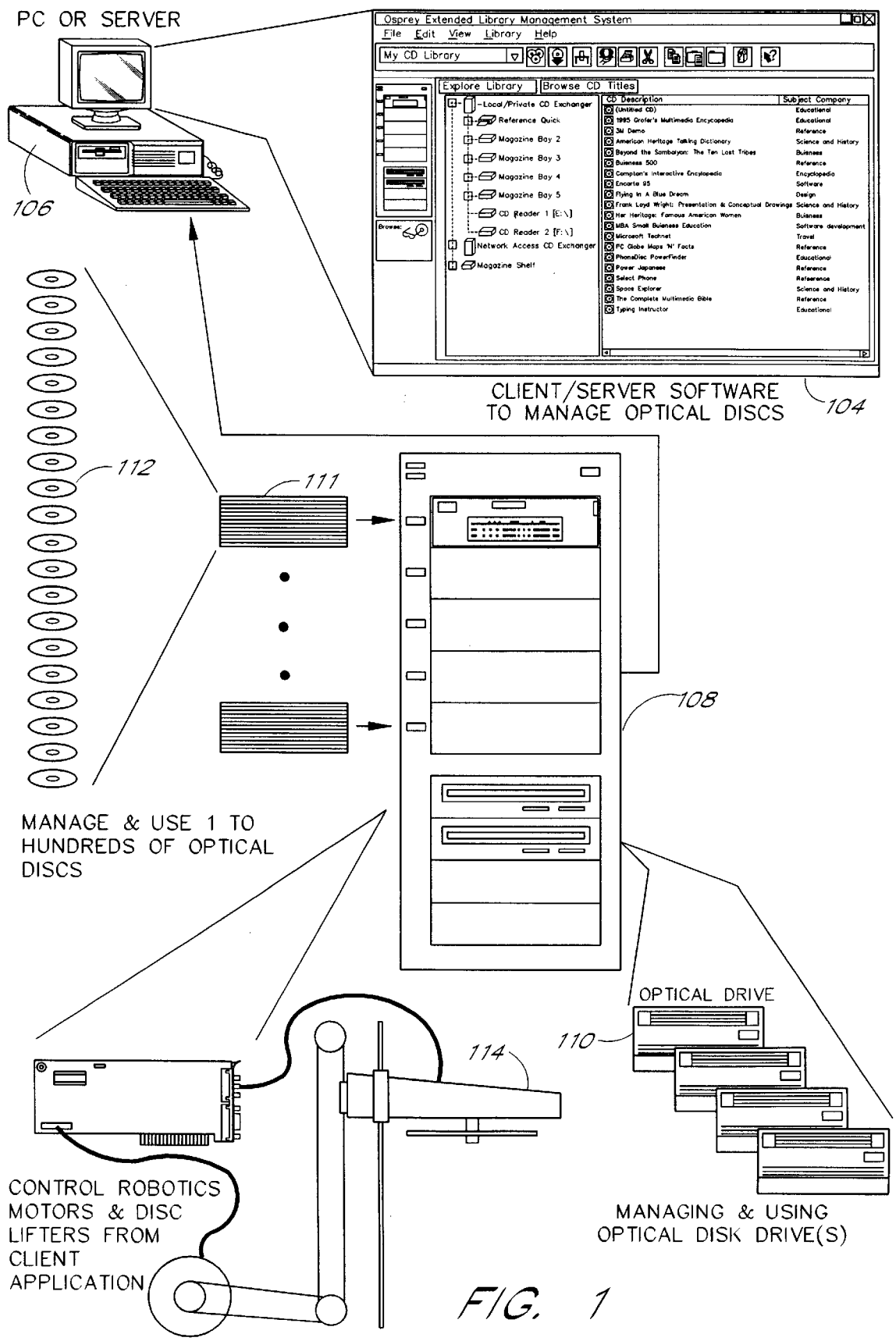
FIG. 1 illustrates components of an optical disc management system controlled by a graphical user interface.

The present invention is directed to a system which enables a computer to manage a library of optical disc media. As illustrated in FIG. 1, the present system running on a personal computer 102 provides a graphical user interface 104 which enables a user to control the retrieval of optical discs from jukebox-based storage, the loading of optical discs into optical disc drives (which read from or write to optical discs), as well as the unloading of optical discs from optical disc drives and the replacement of optical discs into jukebox storage locations.

Just as importantly, the present invention maintains databases representing the contents of each individual optical disc cataloged into an optical disc library, as well as the identity and location of each disc. The graphical user interface 104 of the present invention interacts with maintained databases to permit a user to browse the entire contents of one or more optical disc libraries. The optical discs comprising an optical disc library can be loaded in optical disc drives or optical disc jukeboxes, can be stored off-line, or can be stored in any combination of these.

In a preferred embodiment, a user browses the contents of an optical disc jukebox by positioning a mouse pointer over an icon representing a jukebox and clicking a mouse button. Clicking the jukebox icon exposes a number of magazine icons, each representing a physical optical disc magazine (a magazine capable of storing multiple optical discs). Clicking a magazine icon exposes a number of optical disc icons, each representing a physical optical disc assigned to the magazine represented by the selected magazine icon. Clicking on an optical disc icon causes a display of files and directories (each represented by an icon) comprising the contents of the represented optical disc. Clicking on a directory icon exposes further files and subdirectories. Thus, a user conveniently browses the contents of an optical disc collection held by a jukebox. However, the optical disc management system of the present invention is not limited to one jukebox. Any number of jukeboxes can be browsed. Further an optical disc management system embodying the present invention can operate with any optical disc jukebox or disc changer which responds to digital signals. Each is represented by a single icon presented by the graphical user interface of the present invention.

Furthermore, when the number of optical discs in a library exceeds the capacity of all available jukeboxes, those discs which cannot be loaded into jukeboxes are managed in an off-line magazine shelf. The optical discs associated with the off-line magazine shelf cannot be physically manipulated via a computer. The off-line magazine shelf represents any number of magazines (which are physically stored outside of jukeboxes) and is itself represented by a single icon. Clicking the off-line magazine shelf icon exposes all magazines assigned to the magazine shelf. Clicking any magazine then exposes all the individual optical discs assigned to the selected magazine. Although optical discs assigned to magazines of the magazine shelf cannot be automatically loaded, indexes of the contents of these optical discs are represented in databases comprising one or more optical disc libraries, and, thus, optical discs and magazines not physically loaded into jukeboxes are available for browsing.

The graphical user interface 104 in accordance with present invention advantageously provides the user with the ability to manage an entire library of optical discs from a single computer 106. The graphical user interface 104 provides visual representations of both the physical components of an optical disc library, as well as the contents of the library. The physical components of the optical disc library are represented by icons. Thus, for example, icons appearing on the user screen represent an optical disc jukebox 108, one or more optical disc drives 110, one or more optical disc magazines 111, and individual optical discs 112. Upon browsing or reviewing the contents of the optical disc library and locating a desired optical disc, the user is able to accomplish physical retrieval and loading of the optical disc by merely dragging an optical disc icon on top of an icon representing an optical disc drive. Such active icons provide the user of an optical disc library with a new level of convenience: access to hundreds of optical disc titles without ever touching a disc and without ever leaving the computer 102.

The present invention thus provides abstraction between the user and physical components of an optical disc library, allowing the user to remotely control and manage the physical state of an optical disc library and to access the contents of the library. By tracking the location of each individual optical disc inside identifiable storage magazines, and by tracking the location of each storage magazine, the present invention is able to send commands to robotic elements 114 which accomplish retrieval and loading of optical discs from magazine storage locations into optical disc drives.

The design of the present invention is based on a client/server architecture. Those skilled in the art will appreciate that multiple computers on a network can run a client component to communicate with one or more distributed server components which directly control physical optical disc libraries. The present invention thus permits a single computer to control and access an optical disc library, or, alternatively, permits many computers to access many optical disc libraries.

Figure 2:
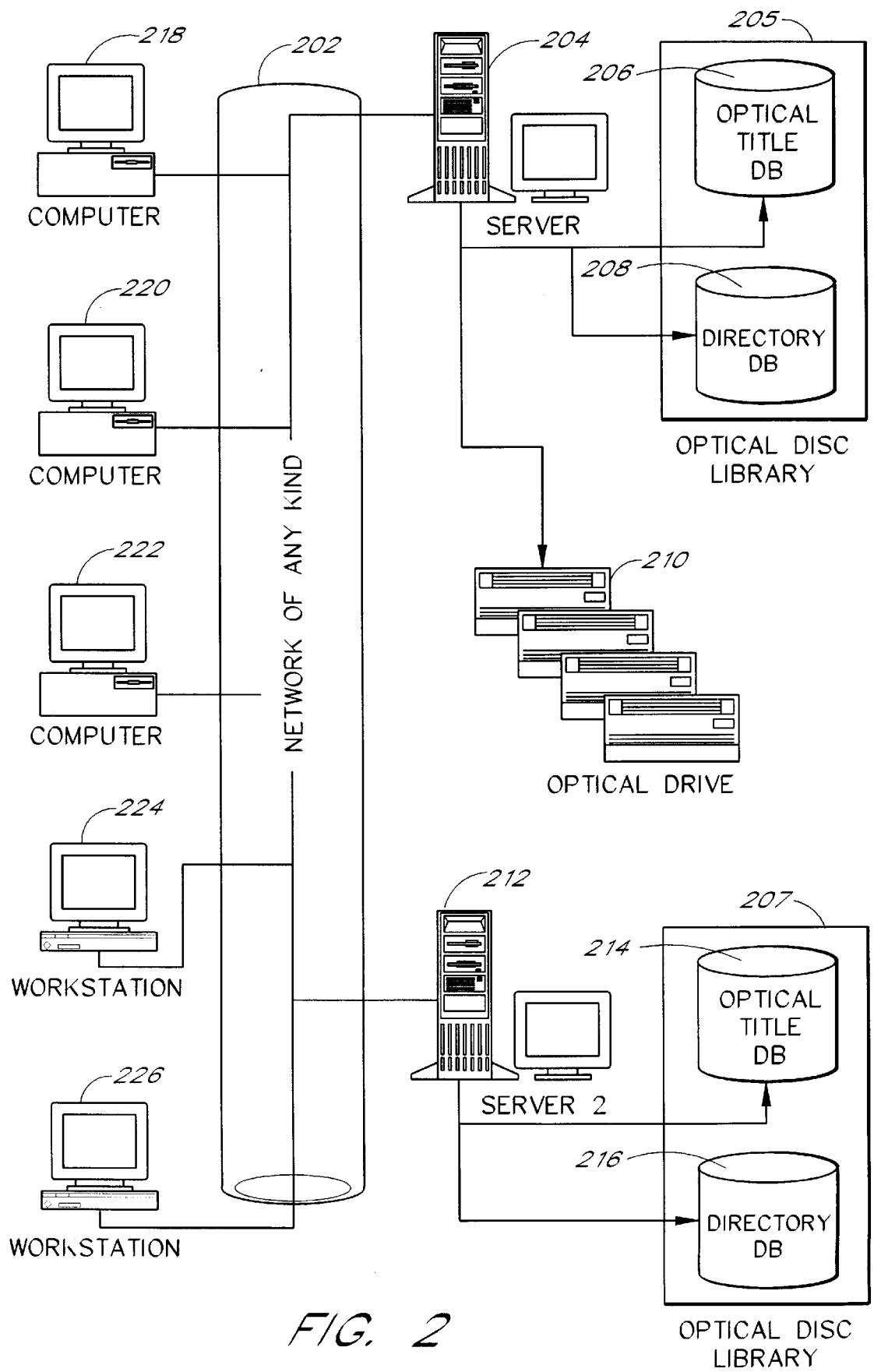
FIG. 2 illustrates a computer network comprising computers executing optical disc management server software and computers executing optical disc management client software.

FIG. 2 illustrates a computer network 202 hosting optical disc management system components embodying the present invention. Many distinct methods for networking computers are known in the art, and the present invention is not limited by any particular networking method. A computer 204 is attached directly to and communicates directly with storage media which comprises a first optical disc library 205. The first optical disc library, which maintains information pertaining to one collection of optical discs, contains, but is not limited to, a title database 206 (or optical title database) which maintains one data record for each optical disc of the first optical disc library 205, and a directory database 208 which contains one record for each cataloged optical disc of the first optical disc library 205. The computer 204 is also attached directly to and communicates directly with four optical disc drives (devices capable of reading from or writing to optical discs) 210. Although FIG. 2 illustrates the use of four optical disc drives, the present invention is not limited thereby and can provide access to any device which, in response to computer-generated instructions, can store, load from storage, unload to storage, read from and write to optical discs (load being defined as placing an optical disc into an optical disc drive).

In a preferred embodiment, the invention uses a robotic optical disc jukebox 108 with one or more optical disc drives and multiple optical disc storage locations which may be physically grouped in one or more optical disc magazines. Another computer 212 is attached directly to and communicates directly with storage media comprising a second optical disc library 207, itself composed of a title database 214 and a directory database 216.

Although FIG. 2 illustrates the use of optical disc drives connected to a server computer, the present invention is not limited thereby and can provide access to any device capable of manipulating storage of optical discs, or capable of reading from or writing to optical discs, whether connected to a network directly or to a computer.

It is important to note that an optical disc library 205, 207 may manage information pertaining to optical discs which may or may not be represented in another library database. Thus, a first collection of optical discs managed by the first optical disc library 205 may be identical to, or have some or no discs in common with a second collection of optical discs managed by the second optical disc library 207.

As in FIG. 2, one embodiment of the present invention comprises multiple optical disc libraries 205, 207, each accessible to users via a computer network, and each comprising data which reference different sets of optical discs residing in one or more robotic optical disc jukeboxes. The present invention is not limited by optical media, but applies to removable, computer-readable media stored in robotic media transport devices. An optical disc management system embodying the present invention can be directed by a user to store optical disc data in one or more selected optical disc libraries accessible via a computer network In another embodiment of the present invention, an optical disc library is maintained in storage media attached directly to one computer on a network, while storage of multiple optical discs and utilization of one or more optical disc drives are physically controlled by a robotic optical disc jukebox which is directly attached to a second computer. In this alternative embodiment, no optical disc library is stored in storage media directly attached to the computer to which the robotic jukebox is also attached. Thus, access to and dissemination of optical disc data is controlled by the first computer (e.g., the first computer issues commands to storage devices containing optical disc catalog data), while the second computer manipulates the jukebox and arbitrates access to the optical discs and optical disc drives.

FIG. 2 illustrates additional computers 218–226 which execute the client software of the present invention. Client software communicates with the server software operating on the computers 204, 212. The server software of the present invention performs transactions on optical disc libraries 205, 207, controls and directs operations on physical optical disc media, and communicates with the client software of the present invention.

It will be understood by those of ordinary skill in the art that client software executing on the computer 218 which is connected to the computer network 202 can communicate with server software running on the computer 204, thereby allowing a user of the computer 218 to access data stored in storage media 205 which is directly attached to the computer 204. Accordingly, a user working on one computer can read from or write to an optical disc that is loaded in an optical disc drive directly attached to a different computer.

Figures 3, 3A:
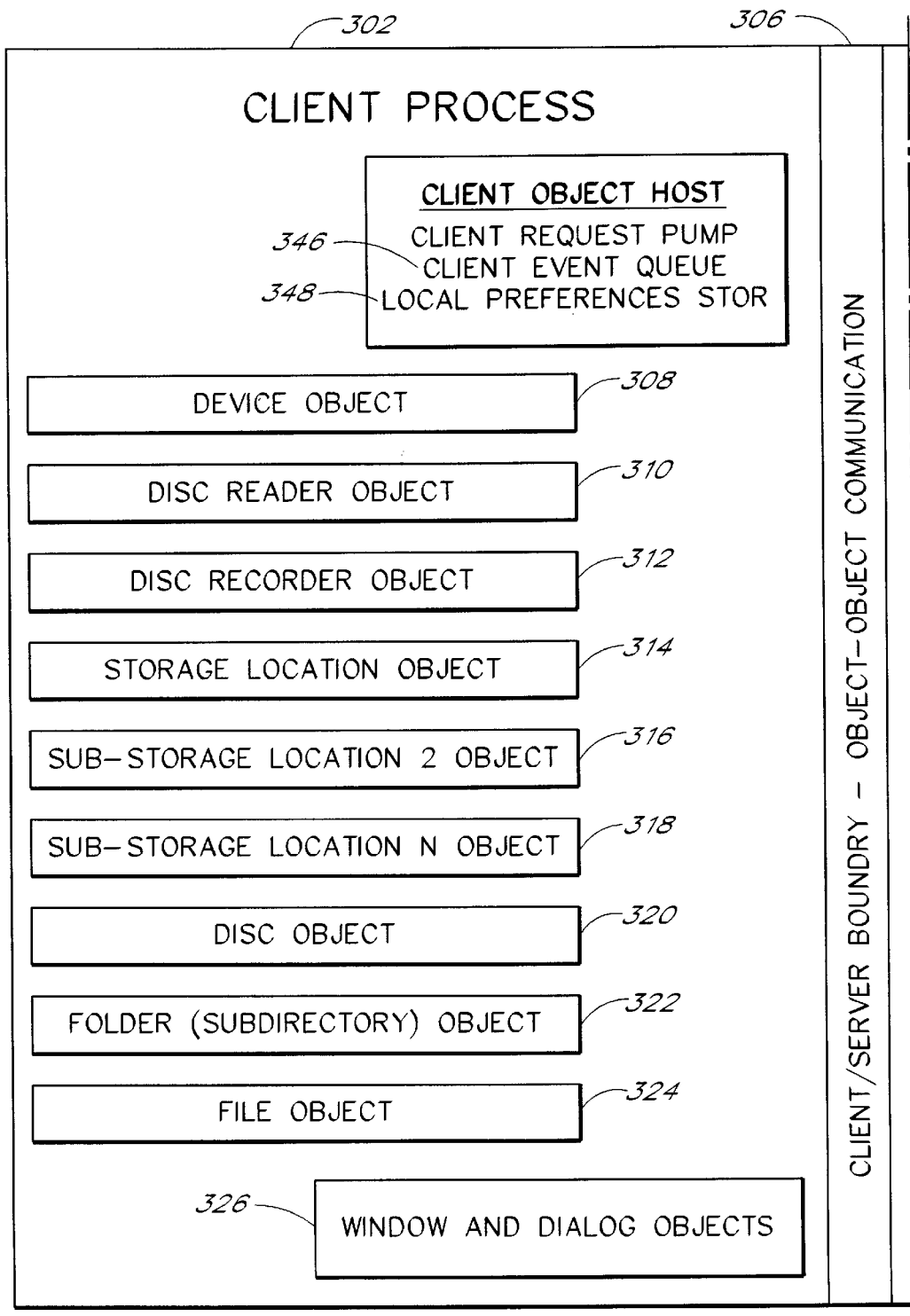
FIG. 3A illustrates components of a client process of an optical disc management system.
Figure 3B:
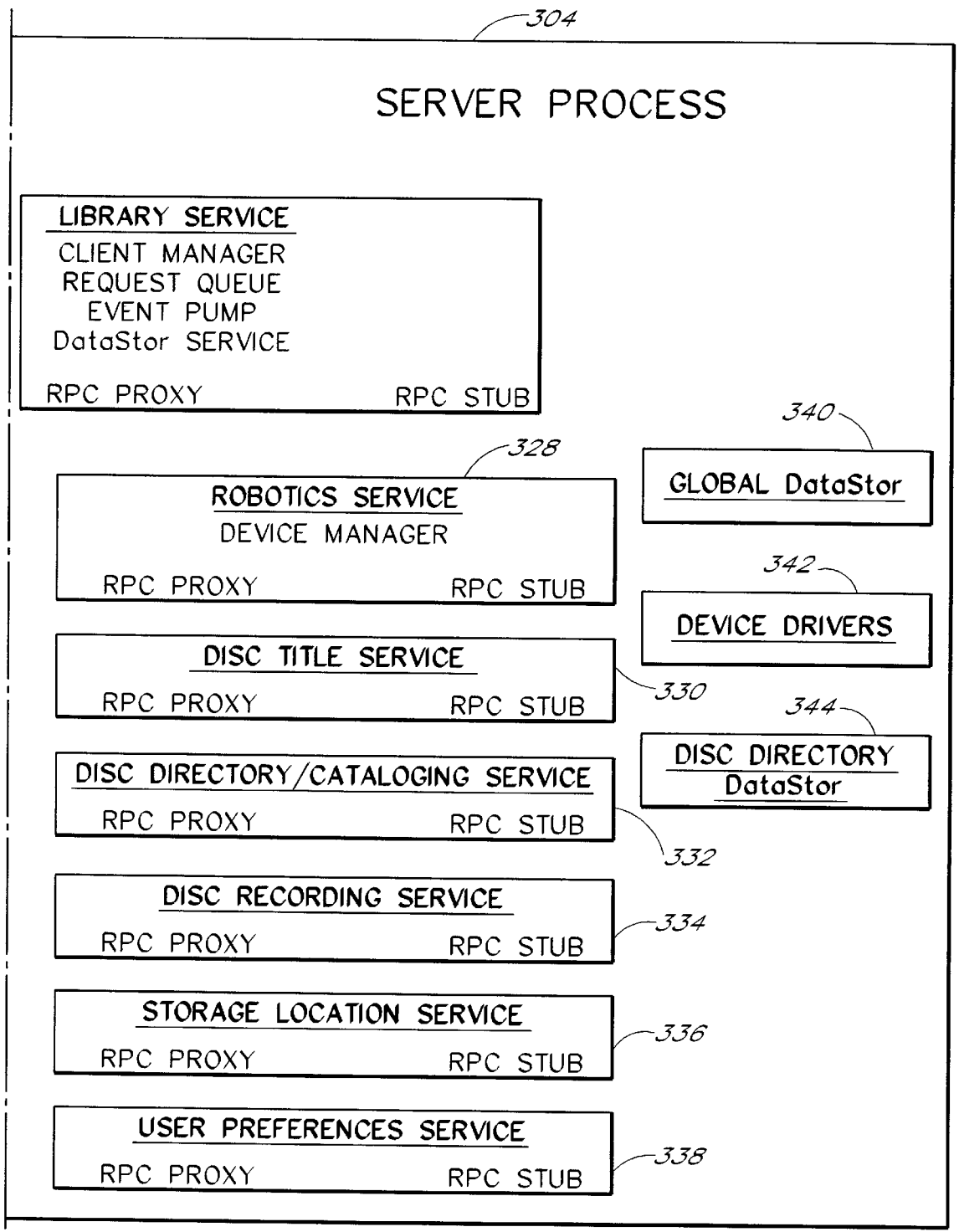
FIG. 3B illustrates components of a server process of an optical disc management system.

The components of a client process and a server process are illustrated by FIGS. 3A and 3B. One instance of a client process 302 is illustrated in FIG. 3A, and one instance of a server process 304 is illustrated in FIG. 3B. The client process communicates with the server process using an object-to-object communication scheme 306. Other communication methods allowing one computer program to exchange information with another computer program are known, and the present invention is not limited by an inter-program communication method or protocol.

Client objects 308–326 are also illustrated, each of which comprises a template for information relating to an optical disc device, an optical disc storage location, or optical disc data. Each object 308–326 is associated with a collection of public methods (functions) and attributes. Object-oriented programming is known in the art and will not be described herein except to note, importantly, that the present invention is not limited by object-oriented programming techniques or models. Server-based methods 328–344 are illustrated in FIG. 3B, each of which is capable of interpreting data or instructions received from the client objects 308–326.

The client process 302 performs transactions with the server process 304 by transmitting data (commands, requests, etc.) to the server process 304 causing server-based methods to be invoked across the process boundary. The results of a synchronous transaction (i.e., a transaction which must complete before execution of the requesting process resumes) are returned to the client upon completion of the request by the server. For an asynchronous transaction (i.e., one which does not block the client from continuing program execution after initially posting the request), the server process 304 communicates the results to the client by placing a completion event notification in the client's event queue 346. The client process 302 periodically monitors the status of its event queue, removing and processing each server notification as appropriate.

Also, a local preferences store 348 (as used herein, a "store" is a persistent data repository) is provided for the client process 302 to store user-preferred and user-defined options, such as data viewing parameters, command behavior preferences, etc., which are associated with a specific optical disc library.

One skilled in the art will appreciate that both the client process 302 and the server process 304 can execute on the same computer and even within the same process.

Figure 4:
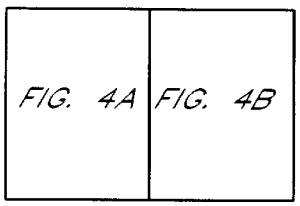
FIGS. 4A and 4B comprise a flowchart illustrating the steps of producing an optical disc Fingerprint Identifier and of cataloging an optical disc.
Figure 4A:
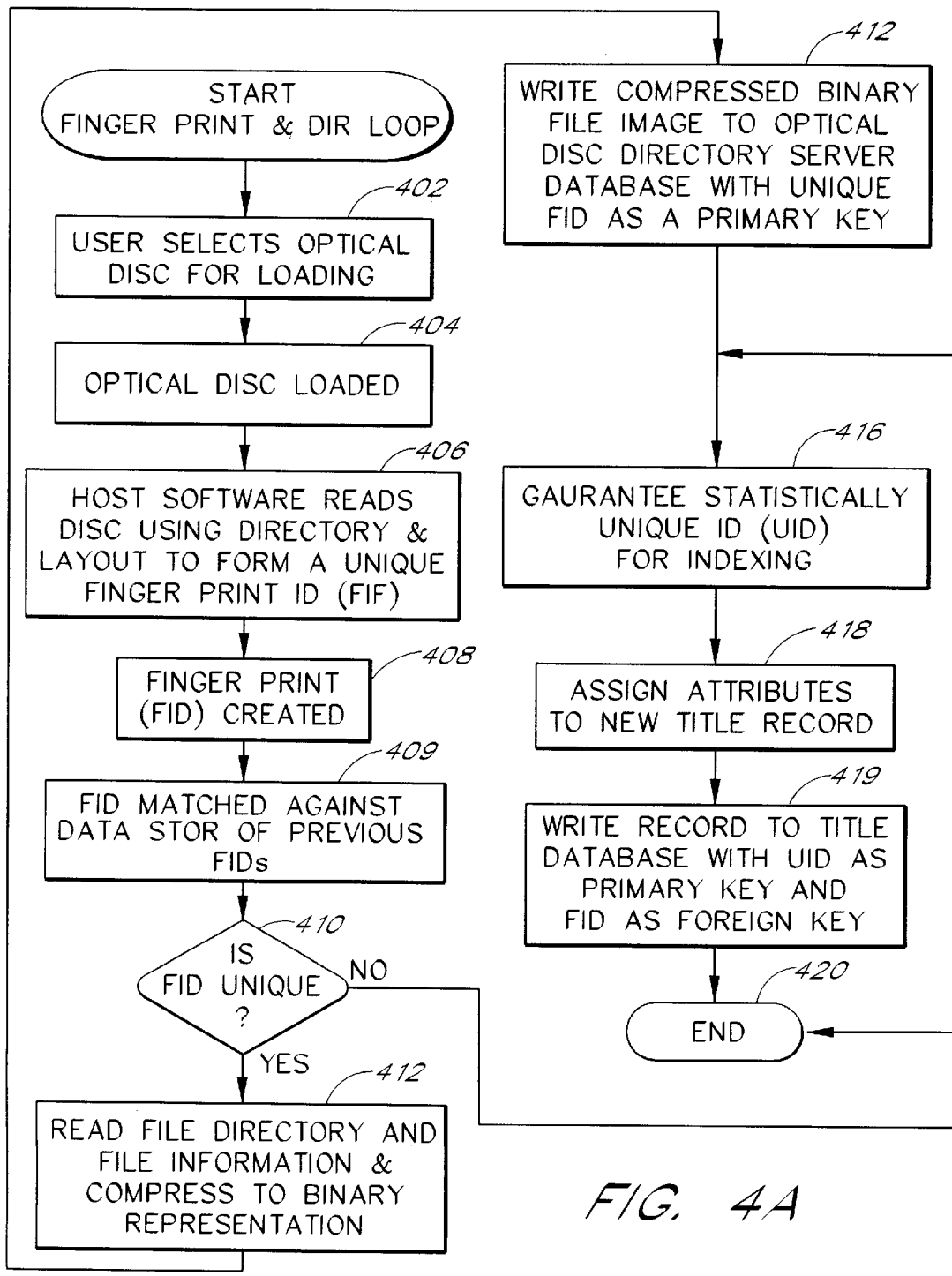
Figure 4B:
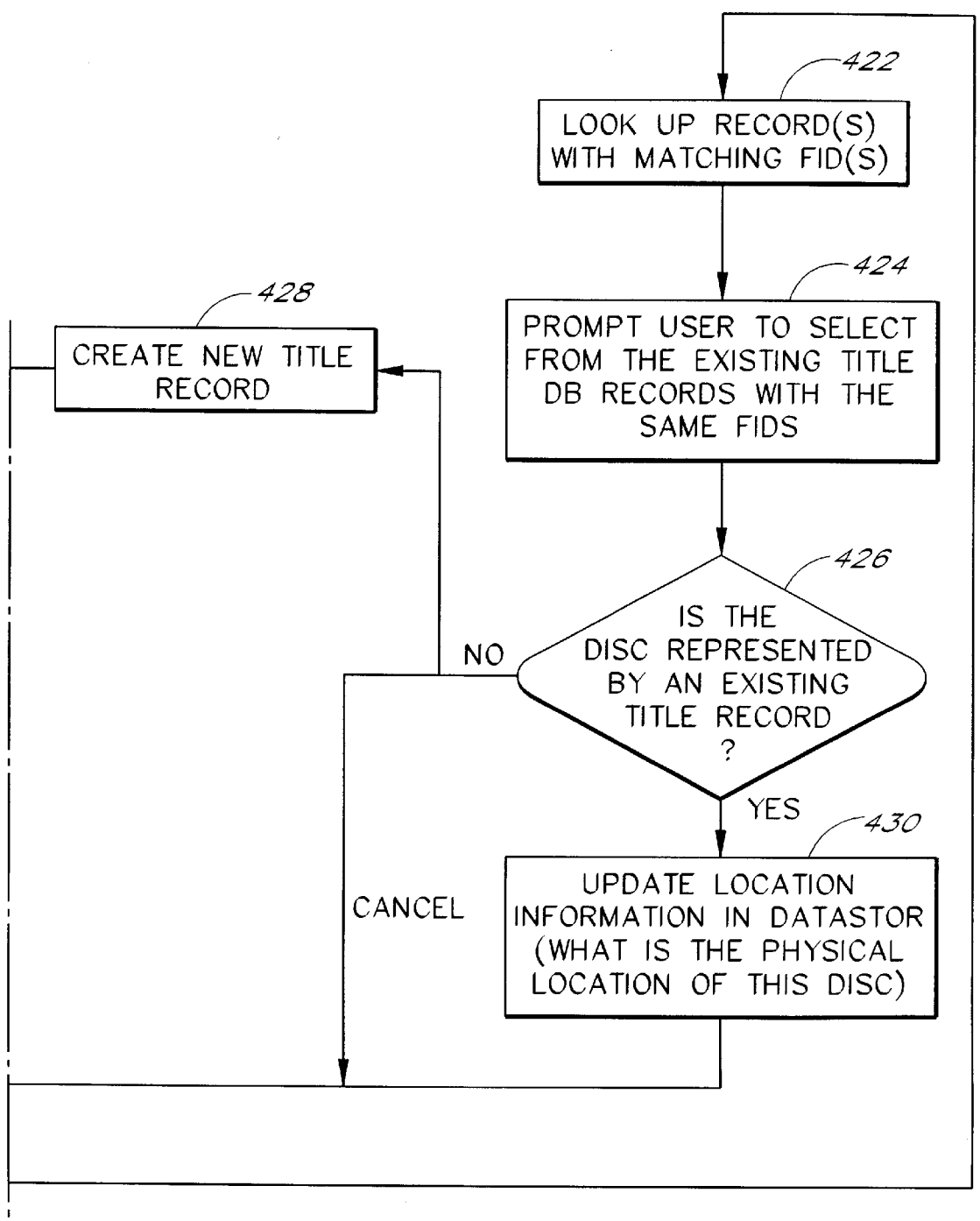

FIGS. 4A and 4B comprise a flowchart illustrating the steps of cataloging an optical disc by first generating a unique identifier for an optical disc, and subsequently acquiring and storing that disc's file and subdirectory descriptor blocks (collections of data which describe attributes of files and subdirectories such as size in bytes, creation data, and creation time). The unique identifier or Fingerprint Identifier (FID), serves as the primary index key to a set of cataloged file and directory descriptors of an optical disc stored in the optical disc directory database (or "directory database"). A second, statistically unique identifier (UID) is generated by the computer operating system and serves as the primary key for indexing records in the optical disc title database (or "title database"). FID values are also recorded in records of the title database, and in this context, act as foreign keys indexing records of the title database. A Directory Server accesses and updates records in the directory database, and a Title Server accesses and updates records in the title database.

As shown in FIG. 4A, in a first step 402 of the cataloging sequence, the user identifies a storage location containing an optical disc to be cataloged. This selection preferably occurs by the user issuing commands from the optical disc management system software user interface. The user interface presents the user with the ability to select a source storage location (e.g., magazine tray) or optical disc drive containing the optical disc to be cataloged. The storage location or drive containing the optical disc may be directly attached to the user's computer, or may be attached to a remote computer accessible via a network. If the present location of the optical disc to be cataloged is a storage element rather than an optical disc drive—as in the case of a robotic jukebox— the disc must be physically transferred, or loaded, to a selectable drive. An optical disc need not be in an optical disc jukebox to be cataloged, but rather in any optical disc drive accessible to the client and server software of the present invention.

In the jukebox embodiment, however, the optical disc may be held in a storage location at the time of cataloging, and the jukebox, as instructed by an embodiment of the present invention, removes the optical disc from its storage location and places the optical disc in an optical disc drive. FIGS. 18–22 describe a robotic optical disc jukebox. One of ordinary skill in the art will appreciate that the present invention is not limited to optical disc jukeboxes and applies to other embodiments including media transport devices which, under control of a computer, transport removable, computer-readable media from storage locations to reading or writing devices and vice versa.

After confirming that an optical disc has been loaded from the storage location to an optical disc drive, illustrated in a step 404, a Directory Server generates a FID from data on the optical disc, as shown in a step 406. The Directory Server accesses and updates records in directory databases. An optical disc management system embodying the present invention utilizes directory databases, one directory database for each optical disc in an optical disc library.

Each directory database comprises two data streams which, together, describe the information (e.g., the directories and files) stored on an optical disc. The first stream comprises a series of fixed length data blocks, each data block providing information about a single file or directory. The series of fixed-length data blocks is ordered by directory. Thus, the series begins with fixed-length data blocks representing files and directories at the first (outermost or highest) level. The subdirectories and files occurring at the second (next) level follow. The series then continues with subdirectories and files comprising the third level, and so on.

Each directory or subdirectory has a parent-to-child relationship with a group of files and subdirectories at the next subordinate level. Accordingly, each fixed-length data block representing a parent directory or a parent subdirectory has an offset pointer to another fixed-length data block representing the first of the group of child files and subdirectories subordinate to the parent. The group of fixed-length fields comprising a fixed-length data block is described in Table 1.

TABLE 1

| | | |
|---|---|---|
| dwOffset | DWORD | Offset of first directory entry |
| dwFileAttributes | DWORD | File attributes |
| ftCreationTime | FILETIME | Creation Time/Date of File |
| ftLastAccessTime | FILETIME | Last Time/Date File was Accessed |
| ftLastWriteTime | FILETIME | Time/Date of Last Write to File |
| nFileSizeHigh | DWORD | High order word of file size |
| nFileSizeLow | DWORD | Low Order word of file size |
| cbName | WORD | Length of File Name |
| dwNameOffset | DWORD | Pointer to File Name in Name Stream |

The second stream comprises a series of textual names corresponding to the names assigned to the files and directories on an optical disc. Each fixed-length data block comprising the first stream has an offset pointer into the second stream marking the point at which a corresponding name begins. Each fixed-length data block also has a name length value establishing the number of characters in the name. One of ordinary skill in the art will appreciate that a pointer into a text stream and a value corresponding to a number of characters are sufficient to determine a text string—in this case, a name.

To create a new record for the directory database, the Directory Server first creates a Fingerprint Identifier (FID or TitleID) that identifies the optical disc associated with data in the new record.

The Fingerprint Identifier (FID) advantageously provides a compact, rapidly generated, binary tag uniquely distinguishing optical discs in an optical disc library. A 32-bit (4-byte) hash value which results from calculating a checksum of disc volume label and operating system-independent attributes of all files in the root (highest level) subdirectory is preferably generated in the following manner: (1) The characters of the disc volume name, in groups of 4, are accumulated across the corresponding four bytes in the checksum value until the volume name is exhausted; (2) For each file or subdirectory present in the root directory of the disc, the least significant four bytes of the file size are accumulated in the corresponding four bytes in the checksum value; (3) The characters of the file or subdirectory name, in groups of 4, are accumulated across the corresponding four bytes in the checksum value until the name is exhausted; and (4) The four bytes of the file modification date and time (in a standardized 32-bit representation described below) are accumulated in the corresponding four bytes in the checksum value. Accumulation is a process where numbers are added to each other and the sum is rendered using a fixed number of least significant digits, discarding the most significant digits.

Importantly, because a FID is generated directly from physical data on the optical disc (i.e., is content-based), it can be advantageously used to resolve ambiguities related to disc identity or location. Other permutations of the FID generation method are presently possible, and as optical disc data formatting standards evolve in the future, the FID generation method is easily adapted to new formatting standards and, thus, is not limited by a formatting standard. Nor is the FID generation method limited to the specific checksum method described above: differing selections of optical disc content may be incorporated into this or some other FID generation method.

Because FID values uniquely identify optical discs, they are advantageously used to detect the presence of duplicate optical discs residing in the same library. An optical disc management system is made more efficient by taking advantage of duplicate optical discs. For example, a single catalog data structure is used to satisfy catalog inquiries performed on different but duplicate discs. Also, when a user requests access to an optical disc which is unavailable, a duplicate of the requested disc is loaded automatically.

Once a FID has been created in a step 408, FIG. 4A illustrates a next step 409 wherein the Directory Server scans records in the directory database to determine whether a newly created FID matches any previously recorded FID (i.e., whether the optical disc being introduced into the optical disc management system may have already been introduced at a prior time). One skilled in the art will understand that, because FIDs are numeric values, many different methods exist to determine whether one FID exists among a database of FID values, particularly when, as in the preferred embodiment, the FID is used as a key to index records in the directory database.

If, in a step 410, a newly created FID is found to be unique (e.g., does not exist in the directory database of previously stored FID values), the Directory Server then, in a step 412 acquires file and subdirectory descriptor blocks directly from the optical disc and, before storing the file and subdirectory information from the optical disc into the directory database, the Directory Server performs transformations on the file and subdirectory data.

The Directory Server compacts the data representing file and directory information into the two-stream format (described above) which can be efficiently searched (e.g., by scanning the name entries without scanning other file information). As illustrated in FIG. 4A, once the data representing file directory and file information has been compressed into a directory database representation (the two-stream format), the Directory Server in a step 414 stores the two streams in a record in the optical directory database and indexes the compressed binary file image using the unique FID as a primary key. Key-based indexing of data within databases (including indexing data by multiple keys) is common in the art and will not be described further herein.

In another embodiment of the optical disc management system embodying the present invention, a file is created having a filename generated using the FID, and the two streams comprising a directory database are stored in the file. Thus, a single representation exists for each optical disc in an optical disc library, each representation comprising directory information for a single optical disc.

Control next transfers to the optical disc Title Server. The Title Server creates and updates records in the title database. The fields comprising each data record of the title database are described in Table 2.

TABLE 2

| FIELD | TYPE | DESCRIPTION |
| --- | --- | --- |
| TitleID | Character(28) | Unique Identifier for Optical Disc |
| Name | Character(128) | Description of Optical Disc |
| VolName | Character(11) | Volume Name |
| VolSerial | Numeric(11,0) | Volume Serial Number |
| Format | Numeric(2,0) | Digital Format Identifier |
| FileSys | Character(12) | File System Name |
| DirID | Character(8,0) | Directory Fingerprint Identifier |
| LoadedID | Character(28) | Last Loaded ID |
| LoadedTS | Character(14) | Last Loaded Time |
| LoadCnt | Numeric(11,0) | Load Count |
| OwnerID | Character(28) | Owner ID |
| Code | Character(10) | Password |
| CodeID | Character(28) | Password ID |
| COutID | Character(28) | Check Out ID |
| COutTS | Character(14) | Check Out Time |
| CInTS | Character(14) | Check In Time |
| Category | Character(64) | Subject Category |
| AutoLoad | Numeric(1,0) | Autorun Enabled |
| RunCmd | Character(254) | Default Run Command |
| User0 | Character(25) | User Field 0 |
| User1 | Character(25) | User Field 1 |
| User2 | Character(25) | User Field 2 |
| User3 | Character(25) | User Field 3 |
| User4 | Character(25) | User Field 4 |
| User5 | Character(25) | User Field 5 |
| MagTray | Character(30) | Magazine ID + Tray Number |
| ExchrRdr | Character(28) | Exchanger and Optical Drive Number |
| CreateTS | Character(14) | Creation Timestamp |
| ModifyTS | Character(14) | Modification Timestamp |
| CatTS | Character(14) | Catalog Timestamp |
| CatDepth | Character(4) | Catalog Depth |
| CatFlags | Character(4) | Reserved |
| CreateID | Character(28) | Created by ID |
| ModifyID | Character(28) | Modified by ID |

The Title Server, in a step 416, issues a request to the computer operating system to return a 128-bit statistically unique identifier (UID) in preparation of creating a new record in the title database. Other methods of obtaining statistically unique values are known in the art, and no part of this invention is limited by any particular computer operating system. The Title Server verifies the UID is unique in the title database by checking whether the UID already exists in the title database, and, if necessary, repeatedly requests new UIDs from the computer operating system until a unique UID (one not in the title database) is generated.

Next, the Title Server, in a step 418, assigns attributes to (fills in the various fields of) the title record. In a next step 419, the title record is indexed by the UID as primary key and the FID as foreign key, and the new record is committed to the title database. Upon the completion of the step 419, the optical disc is uniquely identified and its physical attributes and contents are represented in the title and directory databases, respectively. The cataloging function performed by the Directory Server and Title Server terminates in a step 420.

If, in the step 410, a newly created FID is found to exist already in a record of the directory database and is therefore not unique, then the Title Server, in a step 422 as illustrated in FIG. 4B, gathers all title database records with a matching FID value and presents to the user, in a step 424, a list of the optical discs already present in the library having a FID identical to the newly created FID (a "disc duplicate" list). At this point, in a step 426, the user may (1) cancel the cataloging function (e.g., in the case where, for example, the user determines that the newly loaded optical disc has already been cataloged); (2) proceed with the creation of a new title record; or (3) manually assign the identity of the optical disc to be cataloged by selecting a preexisting record from the title database (selecting one of the optical discs shown in the disc duplicate list) and thereby reassign the location of the optical disc represented by the chosen record.

If the user cancels the cataloging operation in the step 426, then in a next step 420, the fingerprint and directory cataloging function of the Directory Server terminates.

If, however, in the step 426, the user intends to create a new title record to associate with the optical disc to be cataloged, then the Title Server, in a step 428, assembles and adds a new title record to the title database according to the steps 416–420.

If, in the step 426, the user informs the optical disc management system software that the optical disc to be cataloged is already represented by an existing title record, the location of the existing optical disc may be verified and/or updated. Because a storage location (the location containing the optical disc immediately before it was transferred by hand or by jukebox into an optical disc drive) is known for the optical disc, that location can be recorded in association with information identifying the optical disc. Thus, in a step 430, the existing record in the title database for the optical disc is updated to associate a physical storage location with other information about the optical disc. The cataloging function provided by the Directory Server and the Title Server then terminates in a step 420.

Figure 5A:
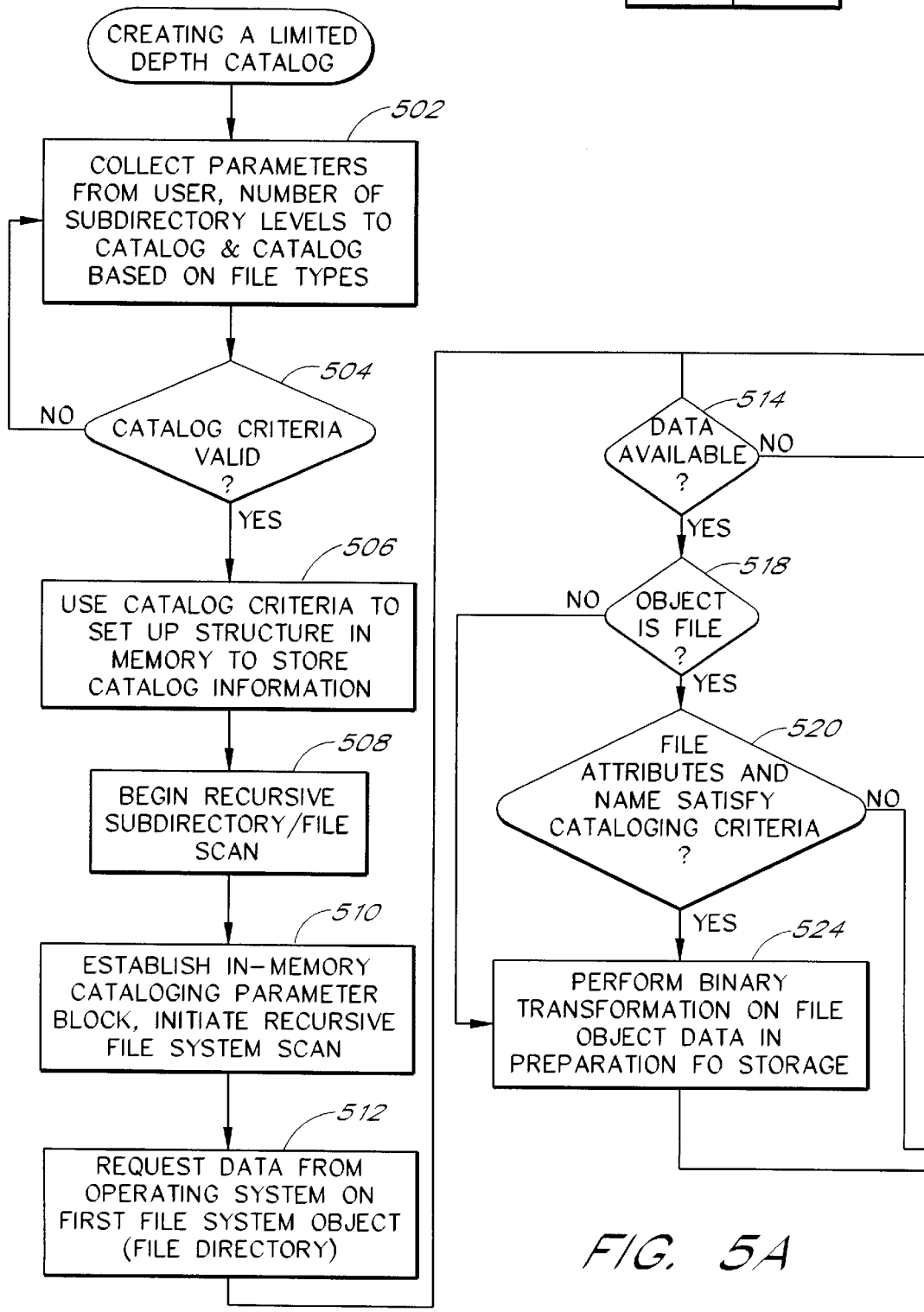
FIGS. 5A and 5B comprise a flowchart illustrating the steps of creating a limited catalog for an optical disc.
Figure 5B:
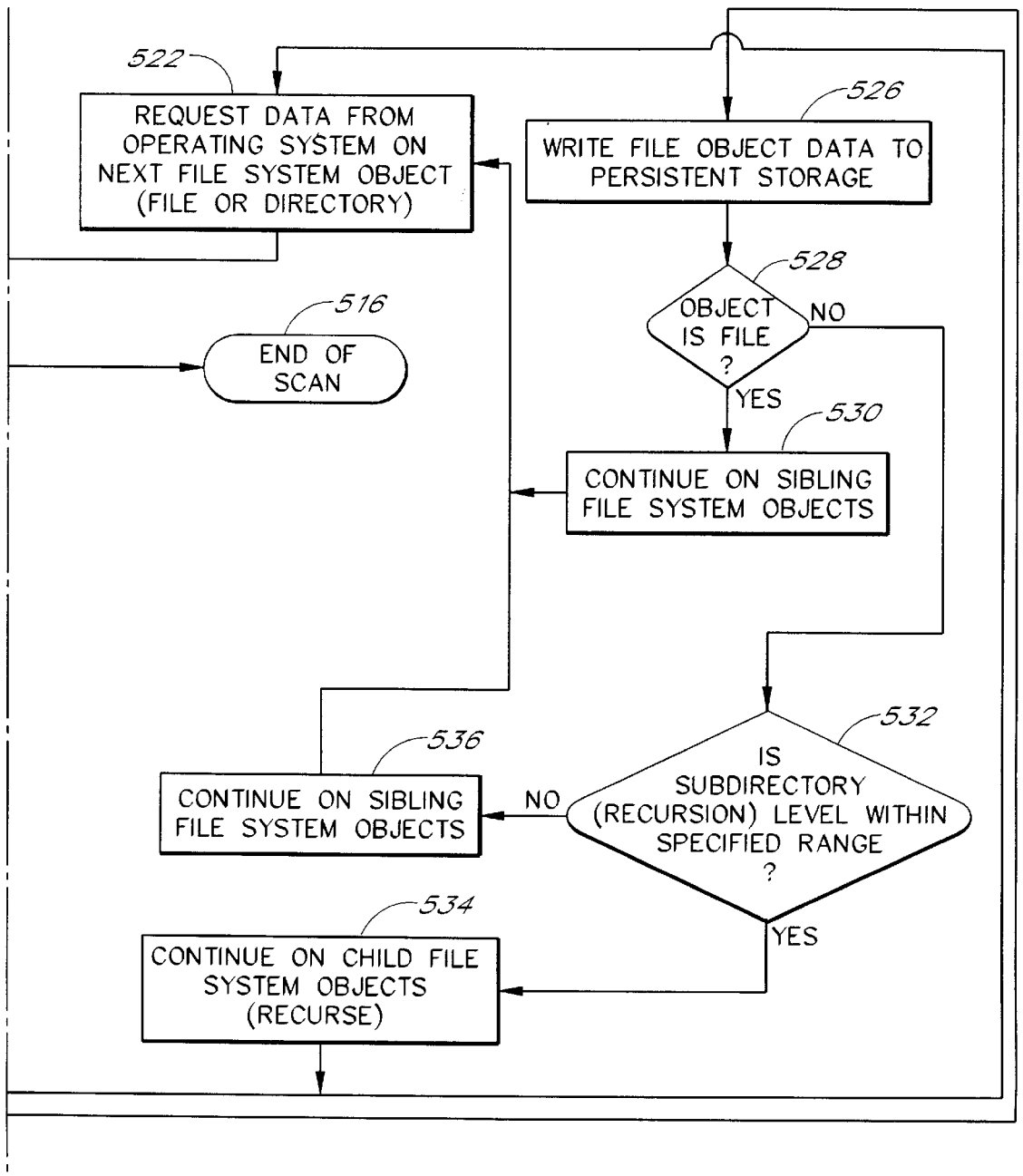

FIGS. 5A and 5B comprise a flowchart illustrating the steps of creating a limited-depth optical disc catalog in the directory database. The limited-depth catalog represents files and directories of an optical disc and is browsed by users to determine the contents of the target optical disc. In a first step 502 illustrated by FIG. 5A, the user is prompted by the Directory Server specify cataloging parameters, such as maximum number of subdirectory levels, file types and a list of file names (including wild card-based filename patterns, such as where a filename of "od*.*" indicates every file whose name begins with the string "od"). It will be appreciated by one skilled in the art that other criteria could be specified to identify directories or files such as, for example, size range, date range, etc.

Once the catalog criteria have been specified by the user, the Directory Server determines, in a step 504, whether the specified criteria are valid by determining whether at least one file or directory entry is indicated by the specified catalog criteria. If, in the step 504, no directory or file entries on the optical disc are indicated by the specified criteria, the Directory Server repeats the step 502 of prompting the user to specify catalog criteria (note that the re-prompt on zero files may be activated or deactivated by the user). Other cases where catalog criteria are invalid, include, for example, the case in which the user specifies a maximum subdirectory depth of less than one or greater than the maximum allowed by the file system. Because such criteria are treated as invalid, the user, in the step 502, is again asked to enter catalog criteria.

If, in the step 504, the catalog criteria are determined to be valid, the Directory Server, in a next step 506, uses those criteria to assemble an in-memory binary structure which represents those criteria and against which each acquired file or subdirectory descriptor block is tested. In a step 508, the Directory Server begins to recursively scan file and subdirectory descriptor blocks on the target optical disc. The Directory Server, in a step 510, creates a memory buffer sufficient to store incoming file and subdirectory descriptor blocks according to specified catalog criteria.

In a step 512, the Directory Server, using a standard operating system service, requests the descriptor (a group of data associated with a file or directory which describes attributes of the file or directory) for the first file system object matching the user-specified catalog criteria. Next, in a step 514, the Directory Server determines whether the computer operating system successfully provided data about a file or a subdirectory on the target optical disc. If not, the recursive scan ends in a step 516 as shown by FIG. 5B.

If the computer operating system successfully provided data about the first file or subdirectory on the target optical disc in the step 514, then, in a step 518, the Directory Server examines the descriptor block to determine whether the descriptor describes a file or a subdirectory. If the descriptor describes a file, then, in a step 520, the Directory Server determines whether the file attributes and name satisfy the cataloging criteria. If the criteria are not satisfied, the information about that file is not cataloged, and the Directory Server, in a next step 522, issues a request to the operating system to return a descriptor block representing the next file system object at the current directory level.

If, in the step 520, the catalog criteria are satisfied by the file descriptor information, or if, in the step 518, the file descriptor information was determined to represent a subdirectory, the Directory Server, in a next step 524, performs a binary transformation (as discussed in relation to FIG. 4) on the file descriptor information provided by the operating system to produce a compressed binary image of the descriptor.

In a step 526, the Directory Server stores the data comprising a binary transformation of file information in the directory database. Next, in a step 528, if the binary transformed data represent information about a file, then, in a step 530, the Directory Server proceeds to obtain information about the next file or directory at the same directory level by proceeding to the step 522. If in the step 528, the binary transformed data represent a directory, then, in a step 532, the Directory Server checks whether a lower subdirectory exists. If a lower subdirectory exists, then, in the step 534, the Directory Server moves to the indicated subdirectory level and recurses to step 522 to request from the operating system the next file or subdirectory descriptor of the next lower directory. If no lower subdirectories exist, however, in the step 532, then the Directory Server, in a step 536, proceeds to obtain the descriptor for the next sibling file or directory at the same directory. The Directory Server then, in the step 522, requests additional information from the operating system about the next sibling file or subdirectory in the current directory level. Thus, a limited catalog is created which represents the files and directories on an optical disc.

The Directory Server permits a user to modify the cataloging criteria, and in addition, replace the directory catalog record for any optical disc with a new catalog record if the cataloging criteria on which the original catalog record was based is different from the new catalog criteria. In the case when available storage media is limited, replacement of directory catalog records with new directory catalog records representing fewer subdirectory levels results in the use of less storage media. Also, alternatively, if available storage capacity increases (e.g., additional or larger hard disk drives are connected and made available), then subsequent creation of catalogs could be performed to produce catalogs having greater numbers of levels, offering users more complete views of the directory and file information for each cataloged optical disc.

A graphical user interface embodying elements of the present invention presents both a hierarchical display and a tabular display of information in an optical disc library. The physical components of an optical disc library have a subordinate relationship: Optical disc jukeboxes hold magazines, magazines hold optical discs, optical discs hold files and directories, directories hold files and subdirectories, and subdirectories hold files and additional subdirectories. This subordinate relationship is represented by icons comprising a hierarchical presentation of the physical components of an optical disc library.

FIGS. 6, 7A, 7B, 8A, and 8B illustrate a graphical user interface embodying elements of the present invention. The graphical user interface provides views of the optical disc directory information and associates the views with icons (pictorial bit map images) which represent the various elements comprising the optical disc management system.

Figure 6:
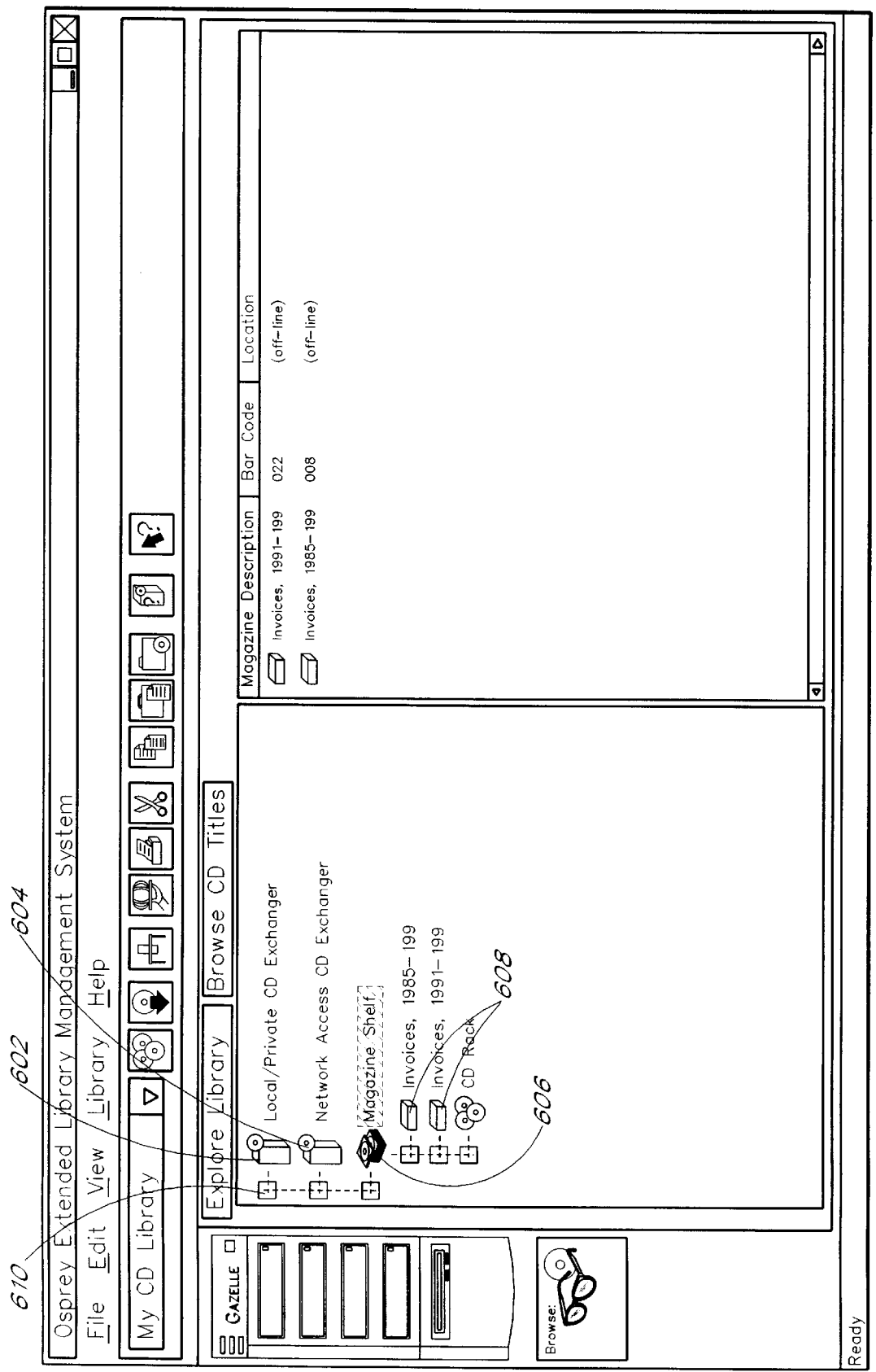
FIG. 6 illustrates icons of a graphical user interface representing a hierarchical view of the contents of an optical disc library.

FIG. 6 illustrates icons representing physical components of an optical disc library system. A first optical disc jukebox (a local or private jukebox) to which a single computer has exclusive access is represented by an icon 602. A second optical disc jukebox which is accessible to multiple computers on a network is represented by an icon 604. An icon 606 also represents an off-line magazine shelf. The off-line magazine shelf represents a collection of optical disc magazines which are not presently loaded into optical disc jukeboxes, but which are indexed by the optical disc management system.

To examine the contents of a jukebox or a magazine shelf, a users clicks on an expand/collapse icon 610 located immediately to the left of the jukebox icon 602, 604 or magazine shelf icon 606. The hierarchical display is then updated to show the magazines associated with a jukebox or magazine shelf. If, for example, the magazine shelf is expanded, the magazines associated with it are illustrated by magazine icons 608 appearing immediately below the magazine shelf icon 606 and indented slightly to the left of the magazine shelf icon 606 to show the subordinate relationship. By clicking the same expand/collapse icon, the user causes the magazine icons associated with the magazine shelf to be removed from the display (i.e., collapsed back into the magazine shelf). Note that when the magazine shelf is in a collapsed state, the expand/collapse icon preferably presents a plus "+" sign to the user indicating that the magazine shelf can be expanded. However, when the magazine shelf is illustrated in an expanded state as illustrated in FIG. 6, then the expand/collapse icon presents a minus "–" sign to the user indicating that the magazine shelf can be collapsed.

A user examines the contents of a magazine represented in the hierarchical display by the magazine icon 608 by clicking on an expand/collapse icon located immediately to the left of the magazine icon 608. Clicking the expand/collapse icon to the left of the magazine icon 608 causes the display to change such that icons representing each individual optical disc associated with the magazine will appear immediately below the magazine icon, but indented to the right to show the subordinate relationship between the optical discs and the magazine. Clicking the expand/collapse icon again will cause the icons representing the optical discs to be removed from the display.

The hierarchical display represents multiple levels of subordinate information. Files and directories comprising an individual optical disc are browsed by clicking an expand/collapse icon to the left of an icon representing an optical disc, and directories and subdirectories on an optical disc are similarly browsed by clicking on representative icons to reveal or expose subordinate files and directories.

Those of ordinary skill in the art will understand that an embodiment of the present invention may include any media transport device storing removable, computer-readable media, and that information stored on the computer-readable media could be similarly cataloged and browsed in an hierarchical fashion.

Figure 7A:
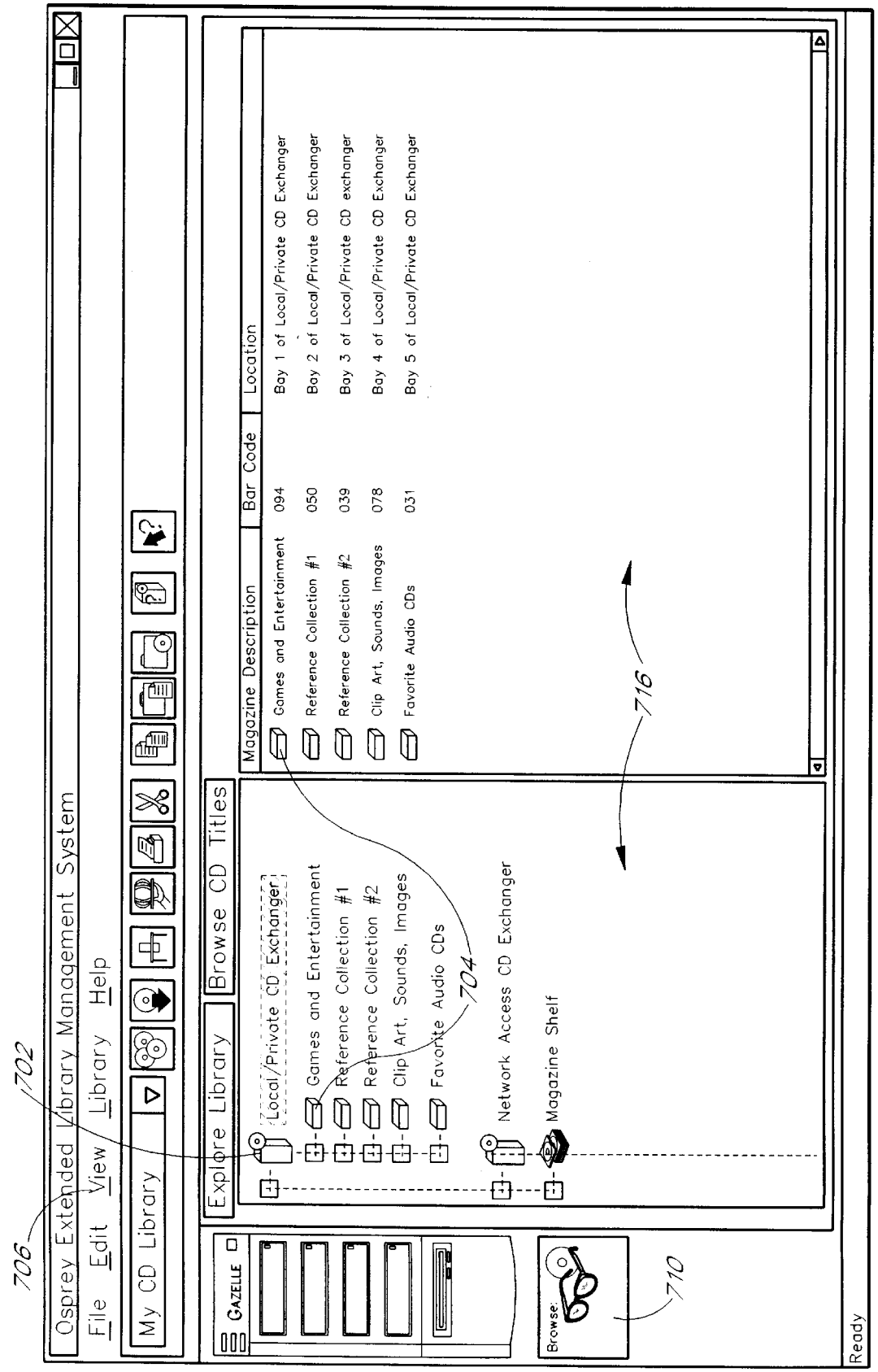

FIG. 7A illustrates a graphical user interface comprising icons which represent components of an optical disc library. An icon 702 represents a robotic optical disc jukebox and an icon 704 represents an optical disc storage magazine. FIG. 7A, through the arrangement of representative icons, shows the hierarchical relationship of an optical disc jukebox and the optical disc storage magazines which are located inside the jukebox. The jukebox icon 702 is located above and to the left of the magazine icon 704, indicating that the magazine represented by the magazine icon 704 is subordinate to the jukebox represented by the jukebox icon 702. Each icon having the same horizontal displacement from the left edge of the computer screen (at the same indent level) thus represents a physical component of an optical disc library which is subordinate to another physical component represented by the nearest icon positioned above and to the left of the respective icon.

Figure 7B:
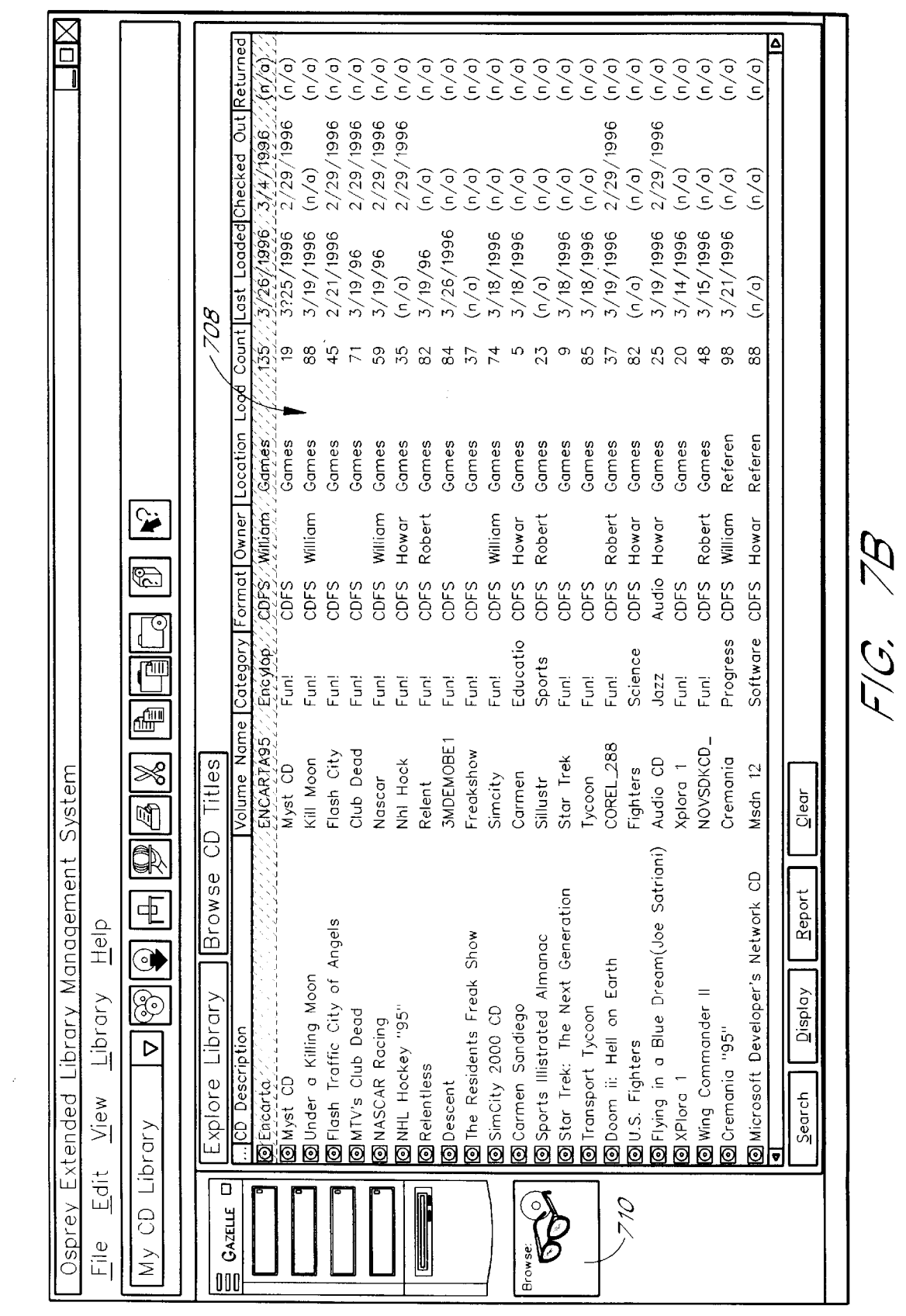

FIG. 7B illustrates a tabular view 708 of information describing the contents of optical discs stored in a single optical disc storage magazine. A user obtains a tabular view of optical disc library contents by selecting a VIEW option 706 illustrated in FIG. 7A, and then selecting, for example, a TABULAR VIEW suboption from a drop-down menu. Alternatively, a user obtains a tabular view of the contents of a directory, optical disc, magazine, or a jukebox by using a mouse to position the on-screen pointer on top of the icon representing the physical device, clicking and holding down one of the mouse buttons, and moving the mouse to drag the icon underneath the mouse pointer such that it rests on top of a second icon 710 representing a browsing dock. The function of the browsing dock is discussed in more detail below.

Both the hierarchical and tabular views illustrated in FIGS. 7A and 7B are created by accessing data from the directory database and the title database. The directory database comprises information describing files and directories on optical discs, and the title database comprises information describing the location of an optical disc (e.g., the tray of a magazine occupied by the optical disc, the magazine bay in a jukebox occupied by the magazine). Those of ordinary skill in the art will appreciate that extracting data from a database and presenting the extracted data in a manner formatted to fit within a window of a graphical user interface is known in the art and thus will not be further described.

FIG. 8 illustrates a drag and drop method for manipulating various physical components of a removable media management system, including but not limited to, optical discs, optical disc drives, and robotic optical disc jukeboxes. This drag and drop method is provided by the graphical software user interface. Drag and drop user interface controls are known in the art. However, an important advantage and novel feature of the present invention is the manipulation of physical components of an optical disc library resulting directly from user drag and drop operations. This includes, but is not limited to, physically retrieving the optical disc medium from a storage location by a medium transport element, loading the medium into a data I/O device, unloading the medium to the transport element, and depositing the medium into a storage location.

Other operations are also provided which may not directly result in robotics activity, such as selected rendering of data, including data describing locations of library components as well as data comprising indexes of optical media or content of optical media. These operations may also be initiated using the drag and drop technique. For example, positioning an on-screen computer pointing device (preferably with a mouse) over a magazine icon 802, then holding down a mouse button while positioning the pointer over a browse dock icon 804 (visual feedback shows an icon representation of the magazine moving or dragging along with the mouse pointer), and then releasing the mouse button causes the display to change from a hierarchical display 806 to an expanded hierarchical display 808 describing the optical discs located in the magazine represented by the icon 802. In effect, the contents of the magazine represented by the moveable icon 802 are expanded to a detail view using the drag-and-drop process. These techniques are novel in the art in relation to the data associated with removable media.

Figure 8A:
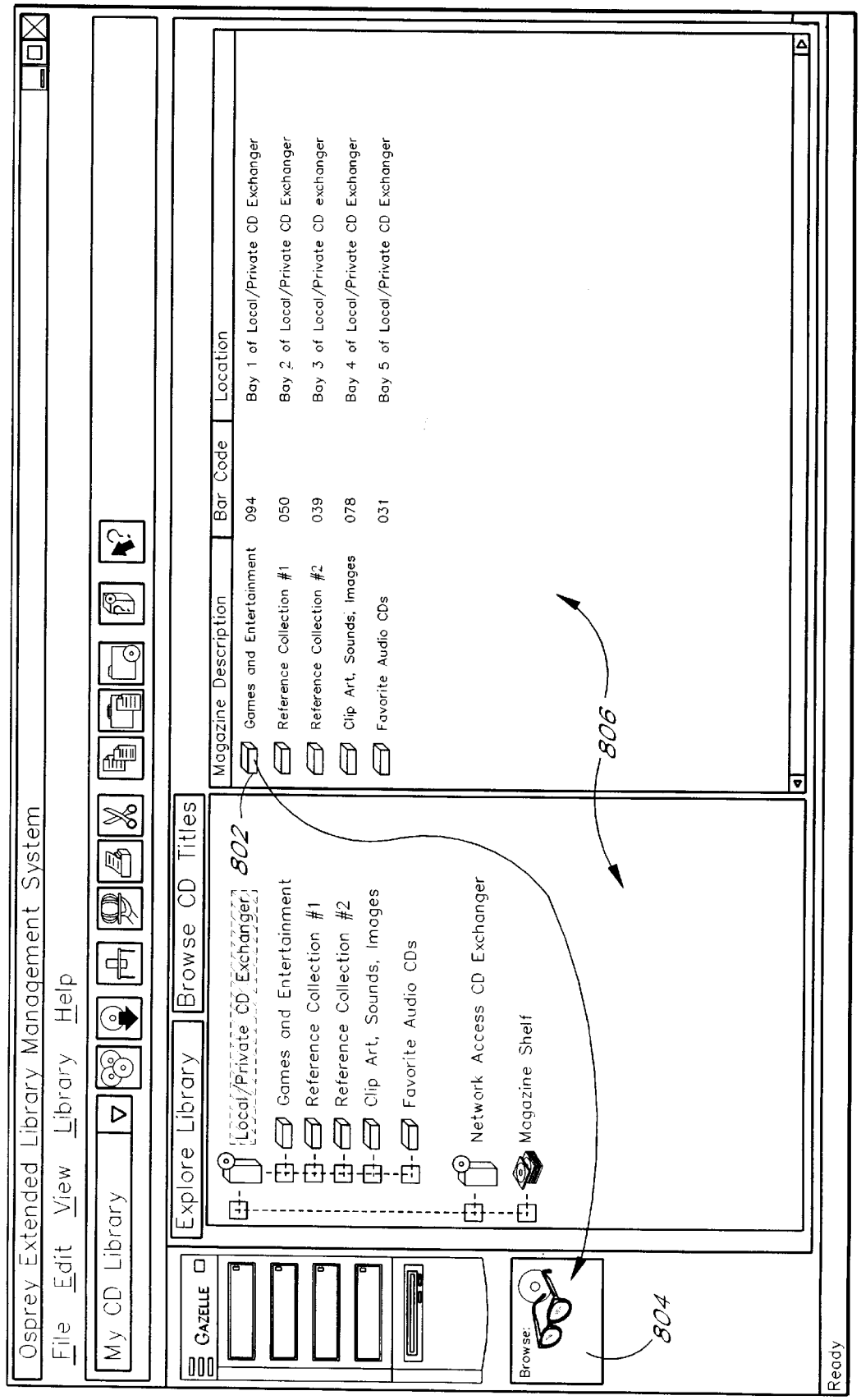
FIGS. 8A and 8B illustrate a drag and drop operation in the graphical user interface of an optical disc management system which causes physical manipulation of optical disc media under robotics control.
Figure 8B:
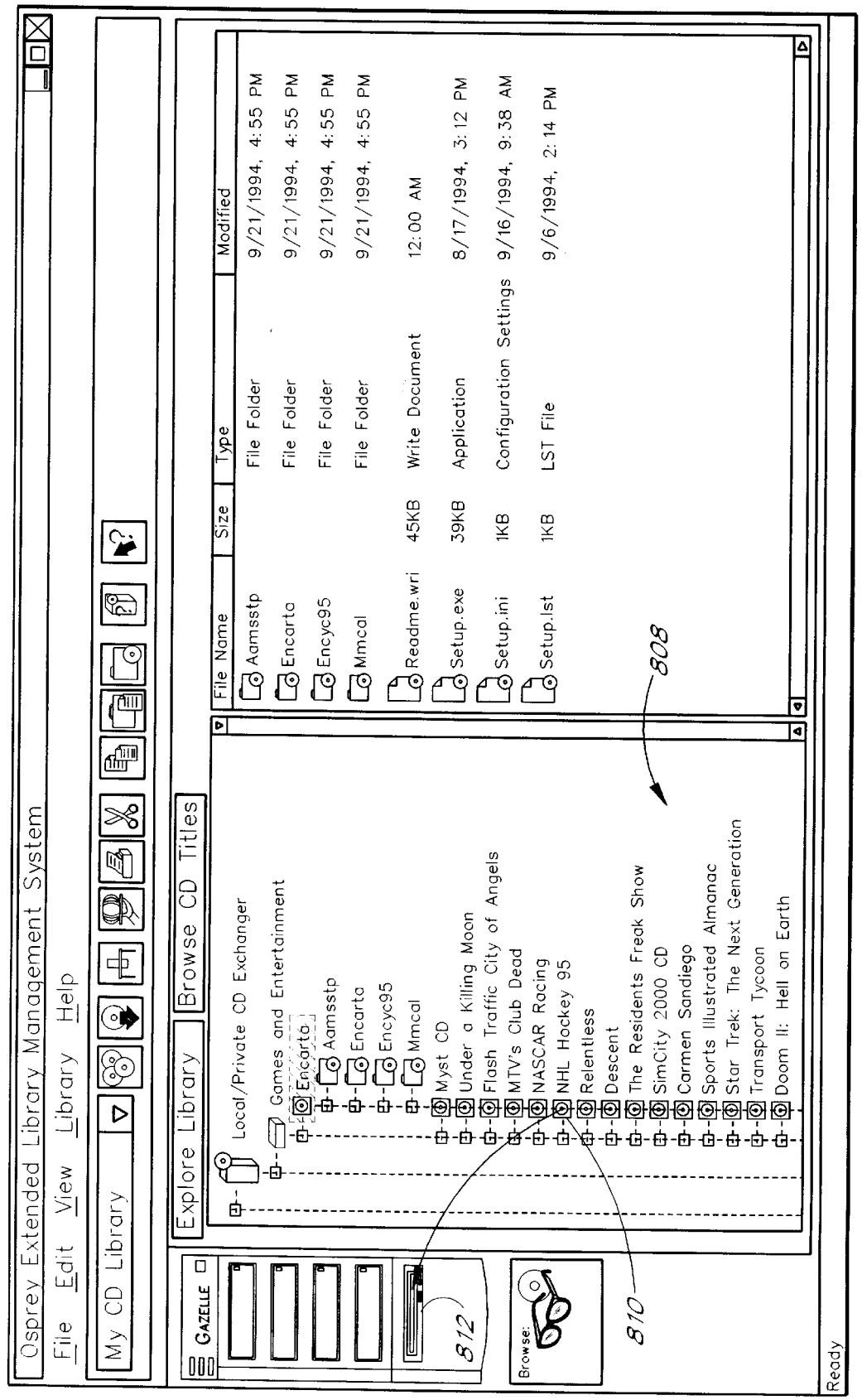

FIG. 8B illustrates a drag and drop operation which directly results in robotics activity. The mouse pointer is positioned over an optical disc icon 810, the mouse button is depressed, the mouse pointer is moved, thus dragging the icon 810 so that it is positioned over an icon 812 representing an optical disc drive. One of ordinary skill in the art will appreciate that a proximity of two icons creates a determinable event when the distance between the two icons changes from greater than the trigger distance (a specified threshold distance from a drop target icon) to less than or equal to the trigger distance. In a preferred embodiment of the present invention, a trigger distance of zero creates a determinable event when the two dimensional space of a drag source icon touches the two-dimensional space of a drop target icon. Releasing the mouse button while the optical disc icon 810 is positioned over the optical disc drive icon 812 causes media transport commands to be issued to a robotic optical disc jukebox.

The media transport commands cause a medium transport element of the robotic optical disc jukebox to physically retrieve the optical disc represented by the icon 810 from a physical magazine represented by the magazine icon 802, and to deposit the optical disc into the optical disc drive represented by the icon 812. Further, if an optical disc is occupying the targeted optical disc drive but is idle (not in use), the idle disc is transferred to a storage location by the medium transport element, prior to the retrieval, transportation, and loading of the newly selected optical disc represented by the icon 810. Thus, physical retrieval, transportation, loading, unloading, and storage of removable media is accomplished by the drag and drop control of the present invention as embodied by the described graphical user interface.

One embodiment of the present invention employs two-dimensional truth tables to describe every valid drag and drop icon interaction. The object-oriented design of the client application software is particularly amenable to reconciling drag source/drop target communication and ensuing program behavior. Physical components of an optical disc library are each represented by an object (a variable comprising both functions and data). Each object is capable of rendering an icon to represent itself (according to state attributes) in the graphical software user interface. If an object is endowed with drag source behavior, it renders an icon which moves on screen as it is being dragged, and differentially renders the on screen image to indicate acceptance or rejection by a potential drop target object.

Similarly, if an object is endowed with drop target properties, it monitors and detects queries originating from drag source objects whose icons share screen pixels with its own icon, and according to the specific software application design rules, determines which objects may be accepted in existing operational state(s) and/or context(s), and which objects may be rejected. Note that an object with drag source behavior may or may not also possess drop target behavior, and that an object with drop target behavior may or may not also possess drag source behavior.

A drag and drop interaction, or conversation, occurs when an icon rendered by an object having drag source behavior, is moved to a position on the screen also occupied by an icon rendered by an object having drop target behavior. In a given drag and drop conversation, the drag source object queries the drop target object for drop acceptance. A potential drop target object discovers the nature and operational state and context of the querying drag source object by examining various data comprising a query packet transmitted to the drop target object by the drag source object. The potential drop target object responds to the drag source object's query with a result indicating acceptance, rejection or a conditional rejection at the current location of the pointing device. If the response is acceptance and the mouse button is released, both the drag object and the drop target receive a 'drop' event. The drag source object responds to a drop event by transmitting data necessary to perform an associated operation. The drop target object responds to the drop event by invoking methods of the drag source object or by invoking its own methods, or both, as needed to perform an associated operation.

Many combinations of valid drag and drop operations result in a series of commands being communicated to a robotic optical disc jukebox such as that described below (see FIGS. 18–22). One skilled in the art will understand that the present invention is not limited by a robotic optical disc jukebox, but applies also to any media transport device capable of transporting computer-readable media from storage locations to a reading or writing device or vice versa.

Data records store associations between individual optical discs and physical storage locations. Thus, for any optical disc in an optical disc library embodying the present invention, there is an assigned storage location (e.g., tray #3 of magazine #2). The commands generated by dragging an optical disc icon over an icon representing an optical disc drive comprise high level GET and PUT commands which utilize assigned storage locations. For example, if an optical disc icon represents an optical disc stored in tray #3 of magazine #2, and such icon is dragged over an icon representing an optical disc drive, then the commands generated would resemble (1) GET Disc from Tray 3 of Magazine 2 (whereupon the optical disc jukebox retrieves the disc occupying tray #3 of magazine #2); followed by (2) PUT Disc in Optical Disc Drive (whereupon the robotic optical disc jukebox loads the optical disc into an optical disc drive). If the user performs an unload operation by dragging the icon representing the optical disc off the icon representing the optical disc drive, the commands generated would be (1) GET Disc from Optical Disc Drive (whereupon the robotic optical disc jukebox removes the disc from the Optical Disc Drive); and (2) PUT Disc in Tray 3 of Magazine 2 (whereupon the robotic optical disc jukebox stores the disc in tray 3 of magazine 2). One of ordinary skill in the art will appreciate that each of these high-level commands is interpreted into a series of low-level commands to which a robotic optical disc jukebox (or some other media transport device capable of robotically transporting computer readable media) responds. Such interpretation advantageously permits the present invention to control a wide variety of media transport devices.

The present invention is not limited to causing physical operations to be performed by robotic optical disc jukeboxes, but can also map valid drag and drop operations into other high-level commands which are, in turn, interpreted into low-level command sequences for transmission to other devices.

An optical disc management system embodying the present invention provides a method for caching data on an optical disc to a hard disk. Traditional caches work by storing recently or frequently used disk sectors (of hard disks or floppy disks) in RAM (random access memory). When a process executing on a computer requests data from recently used disk sectors (i.e., sectors that are still cached in RAM), the requested data is delivered to the process directly from RAM, avoiding the need to read from a hard disk or floppy disk. Because seek and transfer operations on RAM are much faster than seek and transfer operations on hard disk or floppy disks, a traditional cache improves system performance.

The caching method of the present invention differs from traditional caching in important ways. First, rather than being cached in RAM, data from optical discs is cached on a hard disk. Second, because the hard disk cache medium is non-volatile, cached optical disc information is retained in the cache even when the machine is powered down. Third, instead of caching simple disk sectors, the caching method of the present invention is capable of three different caching modes, which differ in the type and quantity of cached data.

In a first caching mode, the entire contents of an optical disc are cached. It is understood in the art that data on a hard disk accessible by a computer network can be accessed by multiple users simultaneously (subsecond differences in access time). Accordingly, this caching mode provides simultaneous, high-speed access to all data of an optical disc for multiple network users. Although this method consumes relatively large quantities of hard disk space, it is the best solution for frequently used optical discs. It also avoids the need to intercept operating system file I/O operations—only the original disc-load operation needs to be redirected to the cached disc image.

In another caching mode, frequently-used files or data items are cached from an optical disc to a hard disk. In this caching mode, the caching method intercepts operating-system open-file requests, directs these requests to either an on-line optical disc or to cached files as necessary. This caching mode requires less hard disk storage, but requires the intercepting and redirection of more operating system functions.

In still another caching mode, directory information from an optical disc is cached to a hard disk. This caching mode is facilitated by the catalog creation method of the present invention described herein. As such, all directory information (the files and subdirectories) on each cataloged optical disc is cached, and users need not establish specialized caching rules or configure the caching method in any way. By intercepting operating system directory operations (e.g., FindFirstFile, FindNextFile, etc), the caching method redirects these requests to the directory database (described above), enabling much quicker access (especially when multiple network users are accessing the same optical disc). This caching mode avoids optical disc load operations otherwise required to satisfy requests for directory information.

Traditional caching methods simply store into a cache the most-recently-used data, and eliminate from the cache the least-recently-used data. The caching method of the present invention utilizes a more sophisticated caching strategy based on usage statistics recorded over time. Using these statistics, caching features of the present invention either automatically decide which optical discs (or portions thereof) to commit to the hard disk cache or present these statistics to a user to facilitate manual selection of optical disc data for caching.

Figure 9:
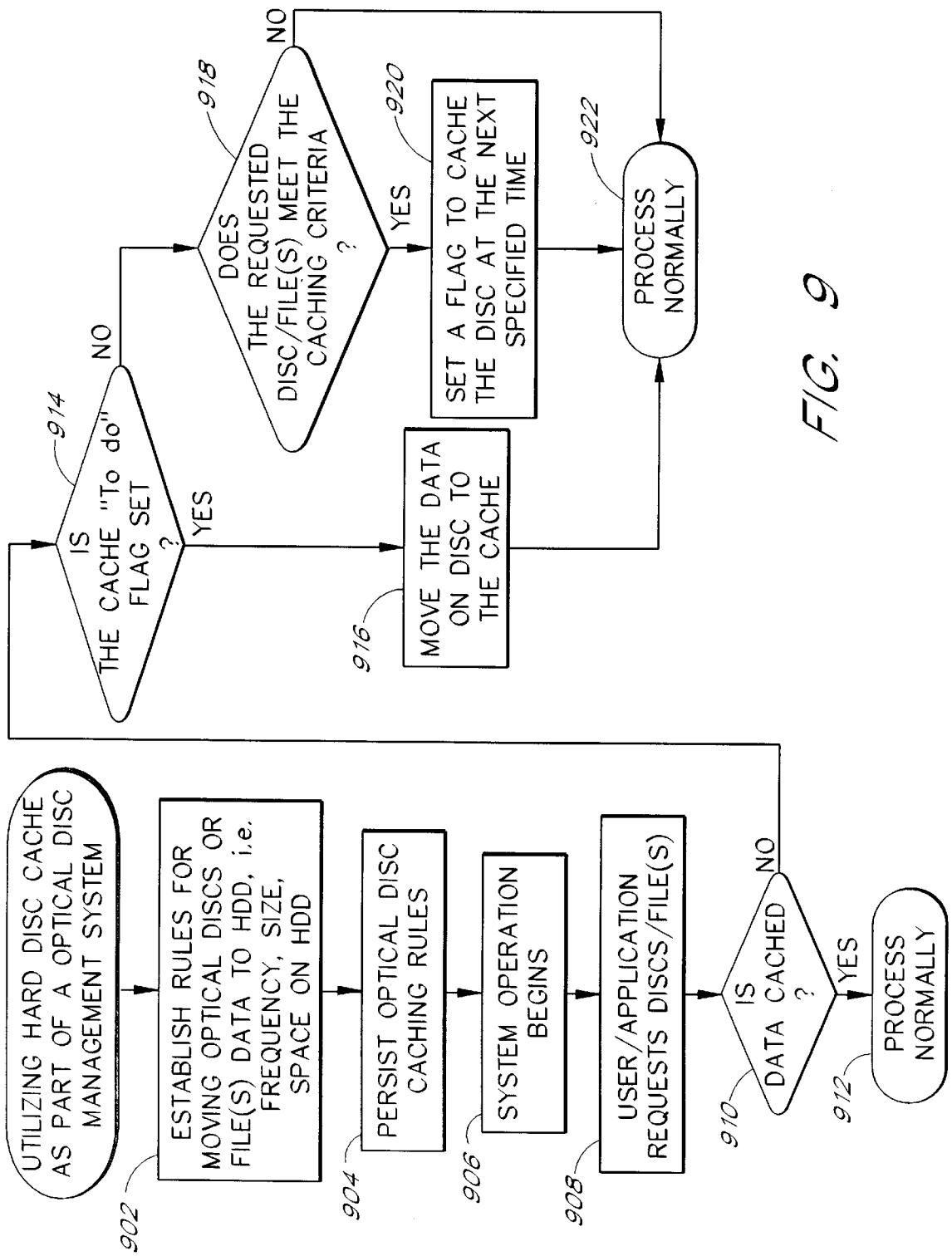
FIG. 9 is a flowchart illustrating the steps of a hard disk-based data cache in an optical disc management system.

FIG. 9 illustrates the steps performed by a caching system to cache optical disc data or portions thereof (including file and directory information) to a hard disk drive. In a step 902, caching rules are established which indicate when information from an optical disc is stored in a hard disk cache. Data comprising optical disc usage information such as, for example, the number of requests received for an optical disc or a portion thereof over a certain time period, are stored in relation to each optical disc. When recorded optical disc usage information meets threshold requirements for caching, then optical disc data is cached. Many different caching rules can be formulated to indicate when optical disc data should be cached. Such caching rules might include, for example, "NEVER CACHE 'SETUP.EXE'," "NEVER CACHE COMPRESSED FILES," "CACHE OPTICAL DISC IF REQUESTED MORE THAN 10 TIMES IN 5 DAYS," or "ONLY CACHE INDEX FILES."

In a preferred embodiment, information from an optical disc is cached when such information is requested often enough to satisfy threshold frequency-of-use criteria. Once optical disc caching rules are determined, the rules are persisted in a step 904 by writing the optical disc caching rules to non-volatile, computer readable storage media, such as a hard disk.

In a step 906, the caching system begins executing. When, in a next step 908, a user or an executing program requests optical disc data, the caching system, in a step 910, determines whether the data requested is already cached. If so, there is no need to cache the data, and in a step 912, normal processing continues by providing the user with data from the cache. If the requested optical disc data is not already cached in the step 910, then, in a step 914, the caching system determines whether a cache "To Do" flag (indicating that optical disc data is to be cached) associated with the requested optical disc data has been set. If so, then the optical disc data is cached in a step 916 (the caching process is described in more detail below), and the caching process terminates in a step 922.

If, in the step 914, it is determined that the "To Do" flag is not set, then, in a step 918, the caching system determines whether the frequency-of-use information for the requested optical disc data satisfies the threshold caching rules. If so, then the caching system, in a step 920, sets the "To Do" flag associated with the requested optical disc data indicating that caching is to be performed the next time the optical disc data is requested. Normal processing then follows in a step 922 wherein the data requested by the user is retrieved from the optical disc. If the recorded usage information for the requested optical disc data does not satisfy the threshold caching rules, then normal processing results in a step 922 in which data requested by the user is retrieved from the optical disc rather than a cache. It is important to note that all caching flags indicating the cache status of each optical disc are stored in the optical title database.

Figure 10:
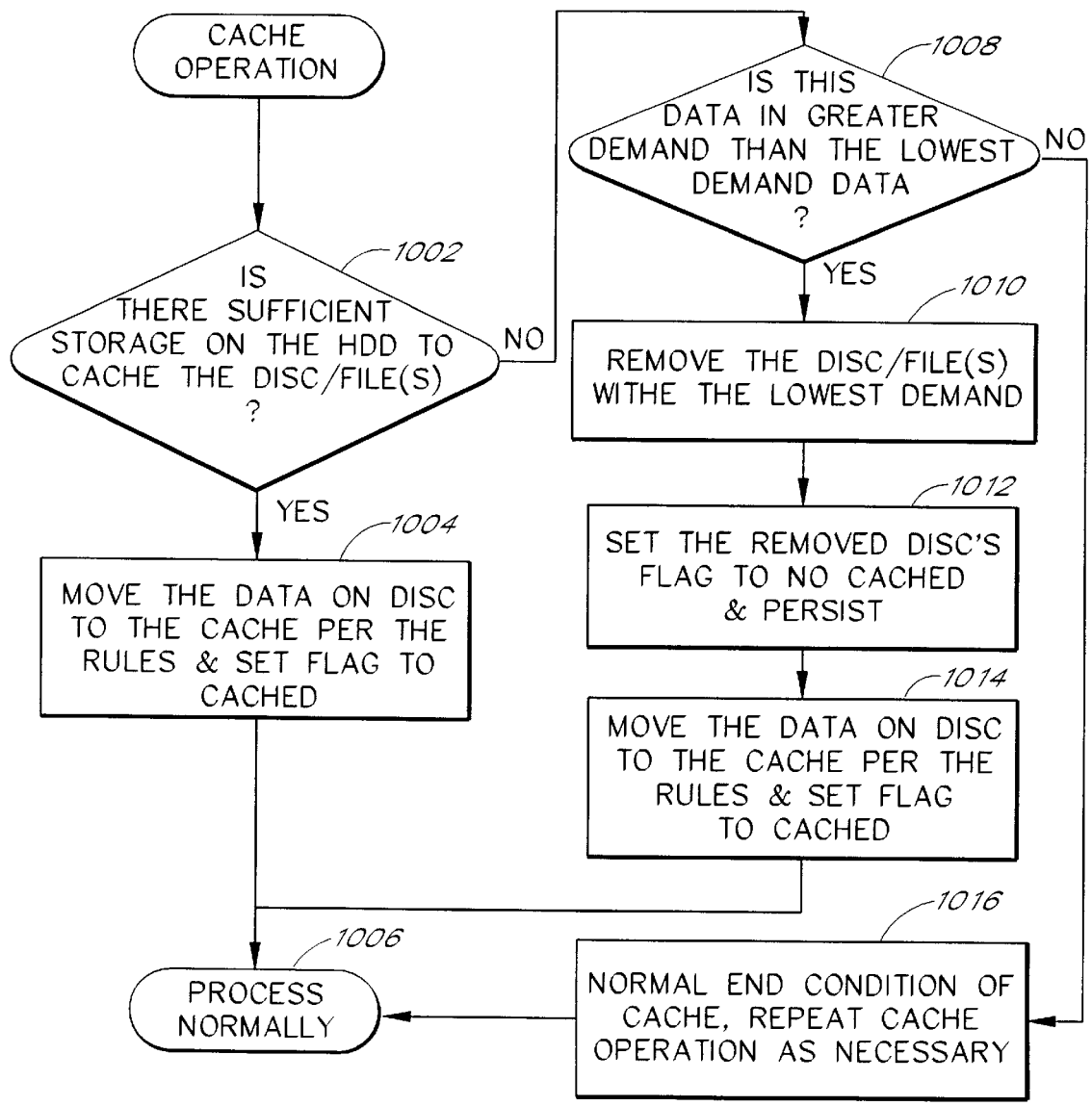
FIG. 10 is a flowchart illustrating the steps of caching optical disc data to a hard disk.

FIG. 10 is a flowchart illustrating the steps of caching data from an optical disc to a cache on a hard disk drive. In a step 1002, the caching system determines if sufficient free space (unallocated capacity) exists on the hard disk containing the cache to accommodate the optical disc data to be cached. If so, then, in a step 1004, the caching system copies the data from the optical disc to the cache and also sets a flag associated with the optical disc data indicating that the data has been cached. In a next step 1006, normal processing resumes by supplying the data requested from the cache.

If there is insufficient storage capacity available on the hard disk to accommodate the data to be cached, then, in a step 1008, the usage information of the requested optical disc data is compared to the usage information associated with each individual cached data item. If the requested data item is determined to be in greater demand than at least one of the cached data items (or, in other embodiments, the requested disc better satisfies the caching rules than a cached disc), then, in a step 1010 the caching system removes from the cache the data item having the lowest demand and also, in a step 1012, sets a flag associated with the removed data item to indicate that the removed data item is not cached. The caching system then, in a step 1014, copies data from the optical disc to the cache and sets a flag associated with the requested optical disc data indicating that the data have been cached. Normal processing then resumes in the step 1006 by retrieving data requested by the user from the cache.

If a requested optical disc data item (the entire optical disc or a portion thereof) is not in greater demand than any cached data item, the caching system does not change any flag associated with the requested data item, and thus, the requested optical disc data item, in a step 1016, is a candidate for caching upon the next request for that data item, and, in a step 1006, normal processing resumes by retrieving the data item requested by the user from the optical disc.

It is important to note that user-selectable caching of information from optical discs is also provided. A first step in user-selectable caching is that the user issues a command indicating that user-selectable caching is to be performed, to which the user-selectable cache system responds by waiting for the user to select information to be cached from browsable catalog information presented to the user. The user then selects which optical disc or which data from an optical disc is to be cached. At this point, the steps 1002–1016 are performed with one difference. If in the step 1008, the information that the user has selected to cache has a lower demand than any information currently cached, the user will be prompted to select information to be removed from the cache. If the user selects no information to be removed, then the step 1016 is performed. If, however, the user selects information to be removed from the cache, then, in the next step, the selected information is removed and the title database is modified to show that the removed data is not cached. The step 1014 is then performed to copy into the cache the information the user selected to cache.

Figure 11:
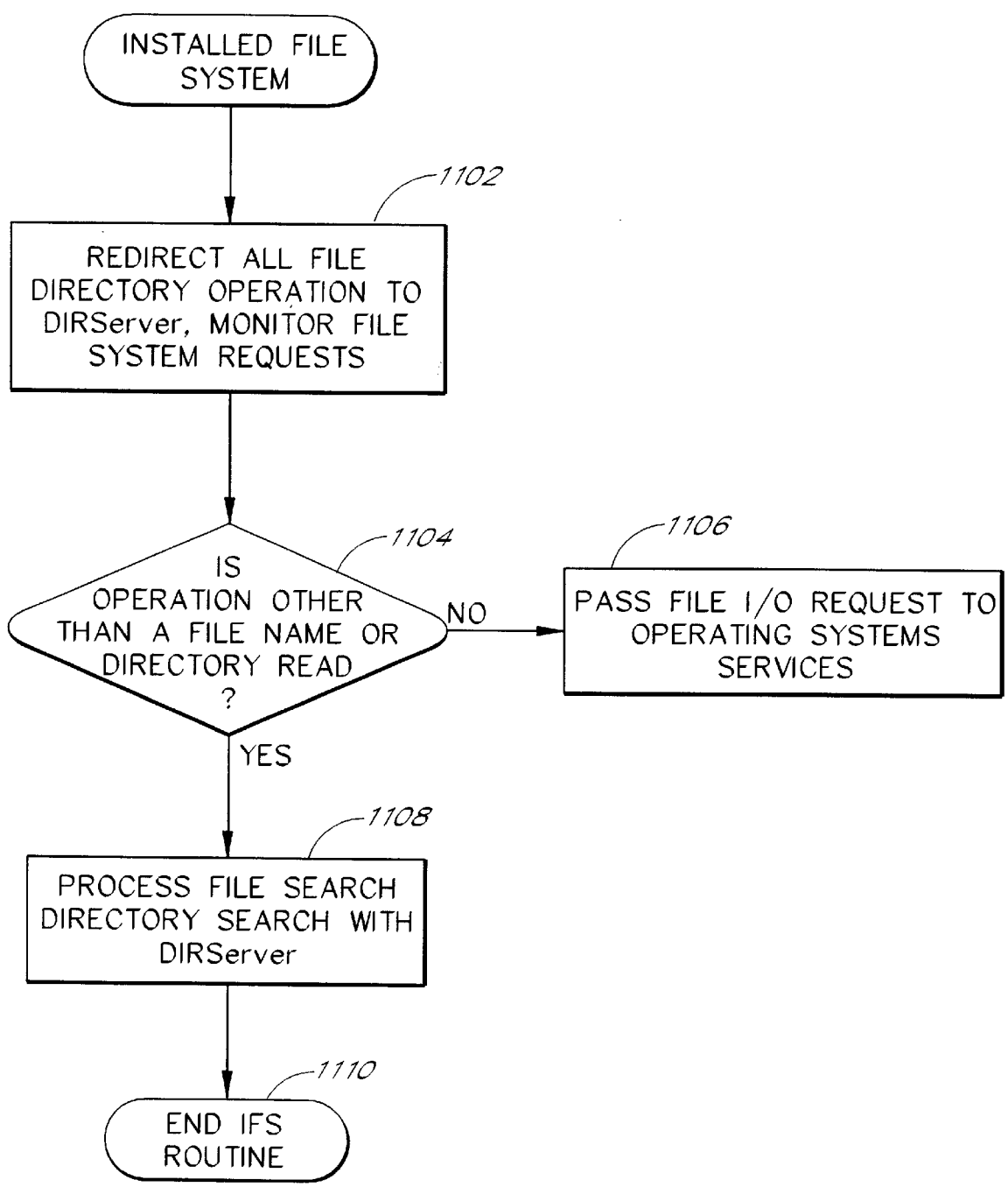
FIG. 11 is a flowchart illustrating the steps performed by an optical disc caching file system.

To optimize performance of the optical disc management system by caching information from optical discs, a caching file system is provided which includes a cache-aware Directory Server. FIG. 11 is a flowchart illustrating the steps performed by the caching file system. In a step 1102, all file system requests are monitored including file directory read operations and other file I/O requests. In a next step 1104, the cache-aware Directory Server determines whether the request is a file directory read. If not, then in a step 1106, the file I/O request is passed to the operating system's file I/O services and no further processing is done by the caching file system which then terminates in a step 1110.

If, however, the request is a file directory read, then it will be processed by the cache-aware Directory Server in a step 1108. The cache-aware Directory Server then determines whether the information requested resides in the cache, and, if so, locates the information within the cache and transmits that information to the user. Processing by the caching file system then terminates in a step 1110.

As described herein, an optical disc management system (ODMS) embodying the present invention maintains databases of information to track the physical location of the optical discs which compose a library. To resolve situations in which the information in the databases is not accurate (e.g., one or more optical discs have been somehow manually relocated by the user within the library hardware), the ODMS includes a reconciliation process. The reconciliation process, described in detail below, is initiated either by a user who knows or suspects that an optical disc in the optical disc library has been somehow misplaced, or by the ODMS whenever an error is encountered wherein an optical disc cannot be found in its assigned location, or wherein a disc is unloaded from an optical disc drive but cannot be stored correctly because its assigned storage location is occupied by a second optical disc.

One embodiment of the present invention provides a reconciliation process comprising a Robotics Server and a Datastor Service which collaborate in resolving ambiguities in optical disc identities and locations in a robotic optical disc jukebox or other physical storage system. The Robotics Server communicates directly with optical disc hardware, such as a robotic optical disc jukebox, which is capable of indicating whether storage locations (for either optical discs, or magazines capable of holding multiple optical discs) are occupied or unoccupied. The Datastor Service performs indexing, read, and write operations on database tables of an optical disc library. Other services, such as the Robotics Server, Title Server and Magazine Server communicate with the Datastor Service to request various data transactions to the various database tables in the optical disc library management system. Among the data stored in these tables are the associations between identified media and the physical locations to which the media have been assigned (e.g., an association between an identified optical disc and a particular tray of a particular optical disc magazine).

To maintain high integrity and reliability of the optical disc management system, a reconciliation and synchronization process is preferably performed each time a user accesses magazine information or optical disc information. The reconciliation and synchronization process is performed, for example, to render a user's screen representation of an optical disc library when the user issues a command to show the contents of a magazine or an optical disc. Thus, the reconciliation process is activated not only when optical discs are believed misplaced, but also whenever any optical disc or magazine is accessed, such as when a user adds one or more optical discs to a magazine. Accordingly, the present invention advantageously provides early detection of any inconsistency between expected locations of optical discs and actual locations of optical discs. Not only does the reconciliation process of the present invention detect inconsistencies, but also it facilitates their resolution.

Figure 12B:
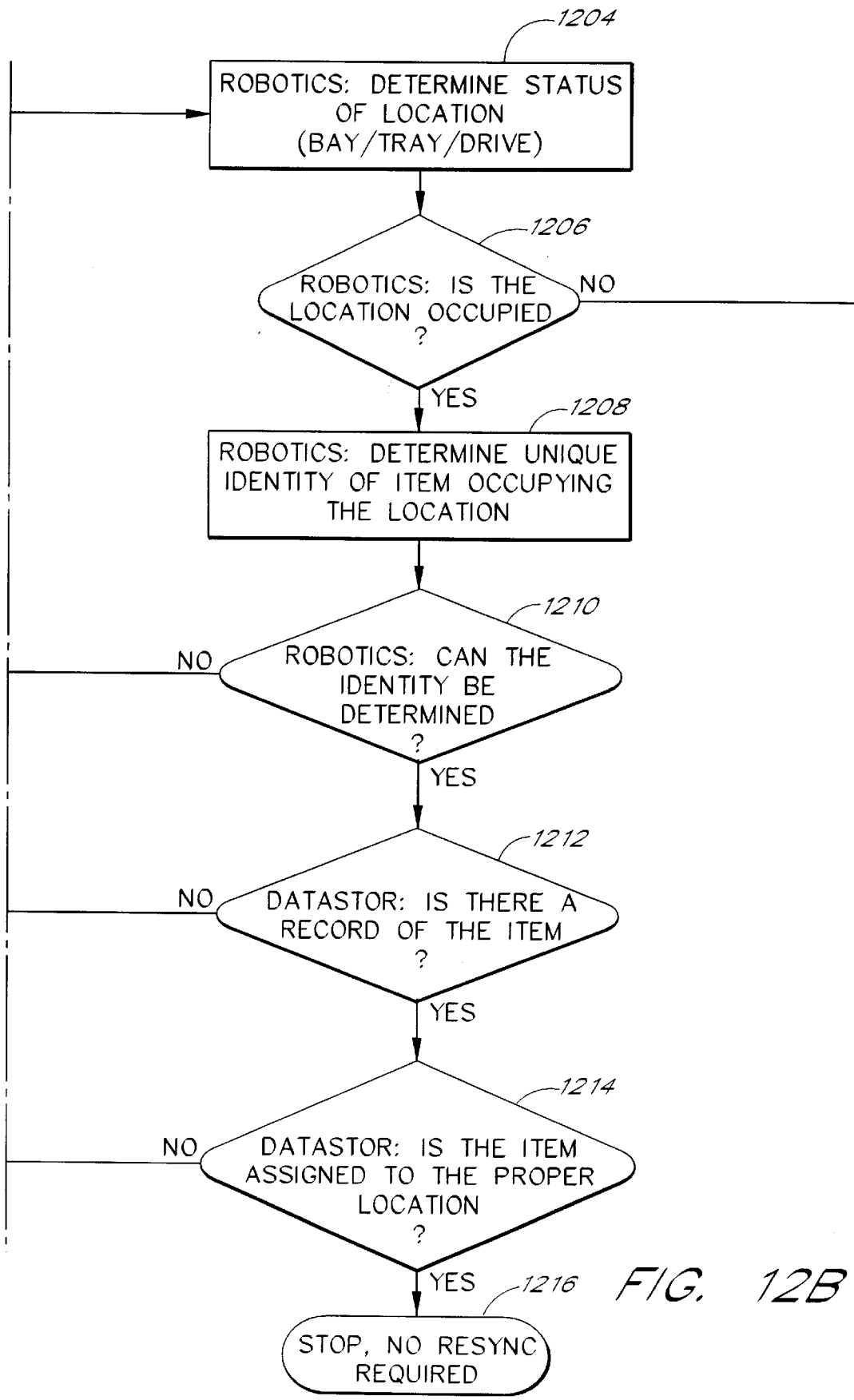
Figure 12C:
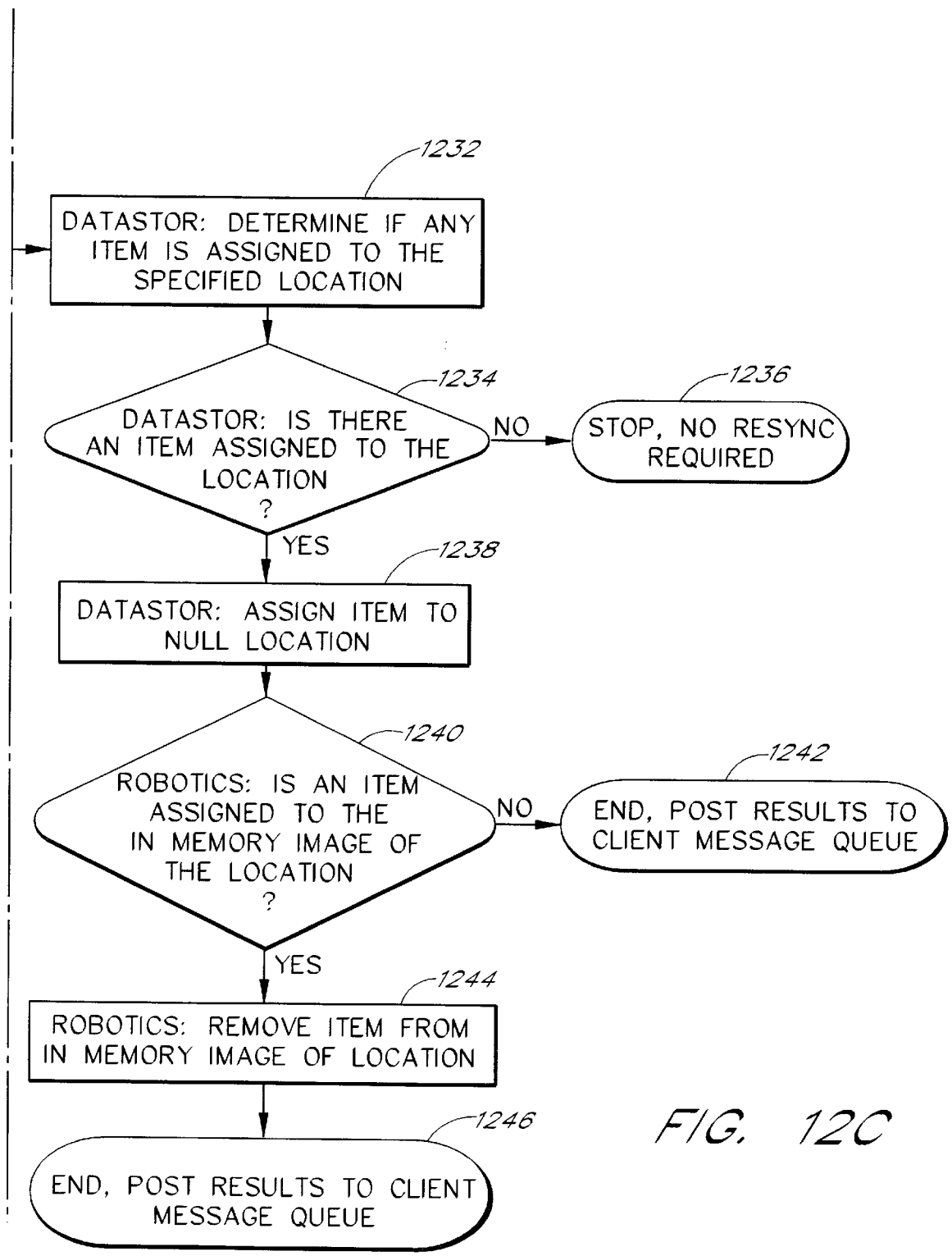

FIGS. 12A, 12B, and 12C comprise a flowchart illustrating the steps performed to reconcile and synchronize assigned or expected disc locations with actual disc locations. In a first step 1202 (FIG. 12A), a user operating client software requests information about a selected magazine (or other holding unit) which the client software expects to exist in a particular storage location (or magazine bay). In a second step 1204 (FIG. 12B), the Robotics Server determines the status (occupied or not occupied) of the location in a robotic optical disc jukebox in which the client software expects the magazine to reside.

If, in a next step 1206, the location is found to be empty (unoccupied), then in a step 1232 (FIG. 12C) the Datastor service determines whether any magazine is assigned to the location in the database. This is accomplished by searching records in a magazine database table for the location identifier (e.g., jukebox identifier and magazine bay index). If, in a step 1234, there is no magazine assigned to the location (i.e., the location identifier is not associated with any magazine) then the Datastor Service and the Robotics Server are synchronized (i.e., the magazine database does not expect a magazine in the location and no magazine occupies the location) and the synchronization steps terminate in a step 1236. If, however, in the step 1234, the Datastor Service determines that a magazine is erroneously assigned to the location (which, as determined by the robotics, is physically empty), the reference in the magazine database associating the location with a particular magazine is updated, in a step 1238, to indicate that no magazine is now assigned to the location.

The optical disc management system maintains, in volatile computer memory, associations between magazine identification information and magazine location (i.e., in-memory images of locations). These in-memory images of magazine locations track which magazines are in which locations (e.g., which magazines are assigned to which bays of an optical disc jukebox). In a step 1240, the Robotics Server determines whether, in volatile memory, a magazine is associated with the location, and, if not, no further synchronization is necessary, and, in a step 1242, updated magazine location information is transmitted (or posted) to a client event queue. The client software retrieves and interprets the event and updates user displays accordingly. If, in the step 1240, the computer memory shows a magazine assigned to the location, then, in a step 1244, the volatile computer memory is altered to indicate that no magazine is assigned to the location, and, in a next step 1246 updated magazine location information is transmitted (or posted) to the client event queue.

When, in the step 1206, there is a magazine in the location in which a magazine is expected, the Robotics Server, in a step 1208 determines an identity of the magazine by issuing a command to a robotic optical disc jukebox to cause it to examine a physical indicator (e.g., a bar code affixed to a magazine) which uniquely identifies each magazine in the optical disc management system. In a next step 1210, the Robotics Server determines whether a unique magazine indicator was successfully read, and, if so, the Datastor Service, in a step 1212, uses the value of the unique magazine indicator as a search key and searches records of the magazine database to determine whether the magazine database holds any information about the identified magazine. If one or more records in the magazine database hold references to the unique magazine indicator, then in a step 1214, the Datastor Service determines whether the magazine database holds an association indicating that the identified magazine is assigned to the location (e.g., determines whether the identified magazine occupies a location already assigned to it). If the identified magazine is assigned to the location, no further synchronization is necessary, and, in a step 1216, the synchronization steps terminate.

If, in the step 1214, the identified magazine is mapped to a location different than the one in which it physically resides, then, in a step 1218, the magazine database is altered so that any magazines also mapped to that location are mapped to no location (i.e., NULL). In a next step 1220, the magazine database is altered such that the identified magazine is assigned to the location in which it was found. Next, in a step 1222, the in-memory image of the location is updated to indicate that the identified magazine is assigned to the location, and, in a step 1224, an event is posted to the client event queue indicating that the identified magazine has been assigned to the location.

If, in the step 1212, the magazine database does not have a reference to the identified magazine, then, in a step 1226, a new record is added to the magazine database. The steps of 1218–1224 are then repeated to ensure the referential integrity of the database and to update the in-memory image of magazine locations.

If, in the step 1210, the physical indicator (e.g., magazine barcode) uniquely identifying the magazine was not successfully read, then, in a step 1228, new information is added to volatile memory indicating that the magazine is identified as "untitled." The steps 1222 and 1224 for ensuring the referential integrity of the database and updating the in-memory image of the location are then carried out.

The above steps, while relating to synchronizing actual and expected locations of optical disc magazines, also are useful to synchronize actual and expected locations of optical discs. Thus, when a client requests information from an optical disc expected to reside in a particular location, the above steps can be performed to ensure that the actual location of an optical disc matches the expected location of the optical disc. Although in general the steps to synchronize optical disc locations are similar to the steps to synchronize magazine locations, the detailed actions of some steps differ. To synchronize the location of an optical disc, step 1204 checks whether a particular tray expected to hold the optical disc is occupied or not. The step 1208 reads the FID (described elsewhere herein) of an optical disc, rather than the bar code of a magazine (although, in a preferred embodiment, this step is not performed in relation to optical discs due to performance considerations). Further, the optical disc title database (rather than the magazine database) is searched to determine expected locations of optical discs.

One skilled in the art will appreciate that steps 1212–1228, rather than accessing a magazine database for associations with locations (bays), can be performed alternatively, in the case of synchronizing optical discs, by accessing an optical disc database for associations between optical discs and magazine (or optical disc drive) trays. It will further be appreciated with respect to steps 1228 and 1222 that, whereas magazine synchronization may require modifications to the in-memory image of magazine bay locations and their contents, synchronizing optical discs may require modifications to in-memory representations of disc storage trays and their contents. Those of ordinary skill will also understand that the differences just described with respect to the steps 1212–1228 also apply to the steps 1232–1244 in the case of synchronizing the locations of optical discs rather than magazines.

The steps 1204–1228 and 1232–1244 are also used in the present invention to validate requests by client software to identify magazines or optical discs in selected locations. For example, when a user issues a command to reassign an optical disc in a third tray of a magazine to an eighth tray of the magazine, the corresponding steps to accomplish the user's request include the reconciliation and synchronization process (in this case performed with respect to the status of both the third tray which is expected to hold an optical disc, and to the eighth tray which may be expected to be empty). As another example, when a user issues a command to associate a different title (a user-selected textual name) with an optical disc, the reconciliation and synchronization process ensures that the expected disc occupies the expected location before the new title is associated with the optical disc. It will be appreciated that many combinations of moving the locations of optical discs and magazines exist, and also that reconciliation and synchronization steps will be included to validate such moves as well as to validate changes to identities of optical discs or magazines.

In addition to automatically checking and recording the location of optical disc magazines and individual optical discs, an optical disc management system embodying the present invention allows users to manually assign the location of optical disc magazines and individual optical discs. When required, a user can remove an optical disc magazine from an optical disc jukebox and issue a request to reassign the location of that magazine, indicating that it no longer resides in an optical disc jukebox. A user may also remove an optical disc from a magazine and issue a request to reassign the location of that optical disc in the library. Alternatively, a user may introduce a magazine into an available bay of a jukebox and issue a request for the system to assign that bay location to the introduced magazine. Likewise, a user can introduce an optical disc into a magazine occupying a bay in a jukebox and issue a request to assign that new location to the newly introduced optical disc.

Figure 13:
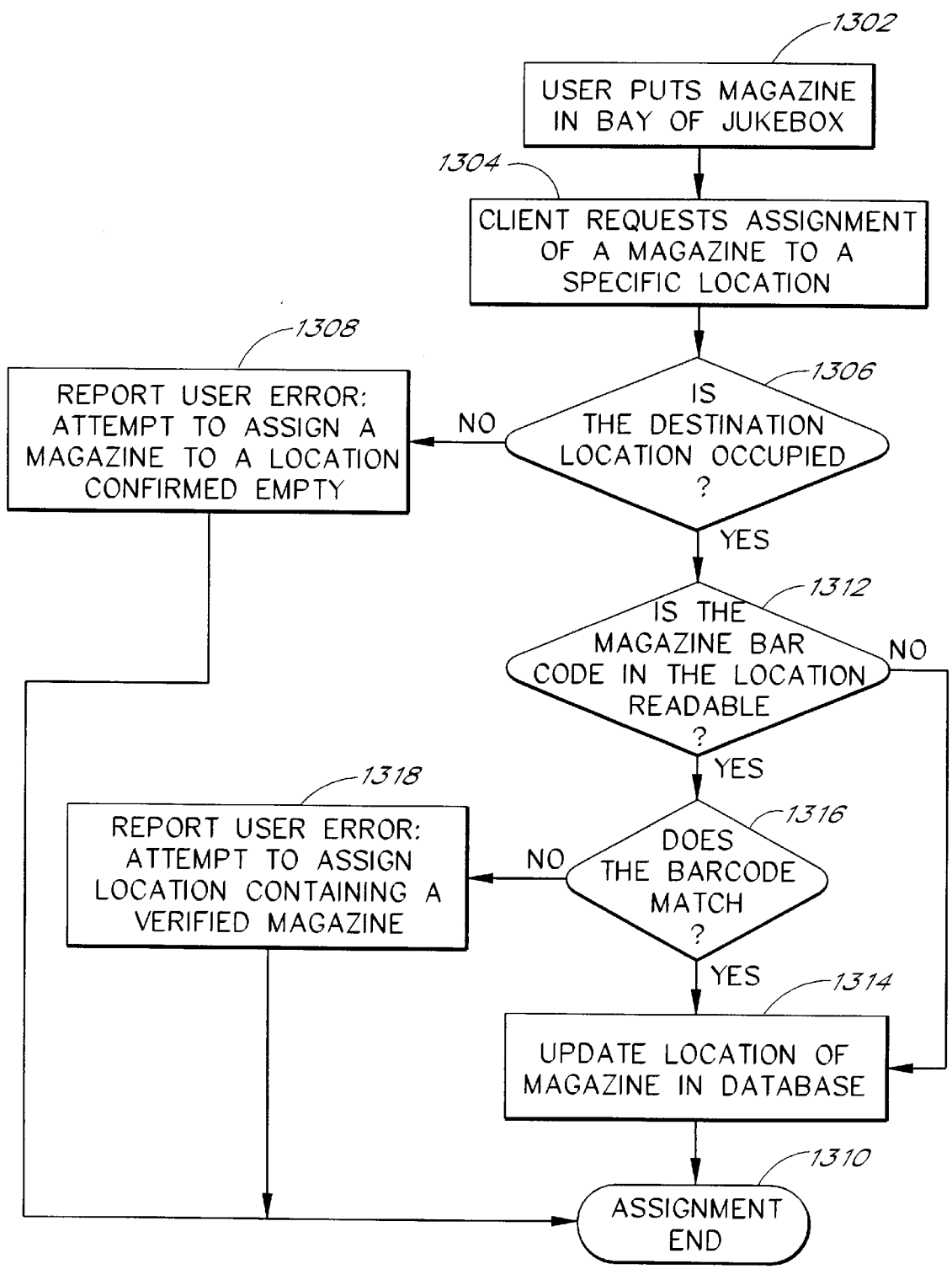
FIG. 13 is a flowchart illustrating the steps involved in manually assigning a magazine location.

FIG. 13 is a flowchart illustrating the steps involved in manually assigning a magazine location. In a first step 1302, a user places an optical disc magazine in a bay of an optical disc jukebox. In the next step 1304, the user issues a request to assign the introduced magazine to the bay of the jukebox in which the magazine was placed. In a step 1306, the present invention determines whether there is a magazine in that bay. If not, then in a step 1308, the system reports an error condition, indicating an attempt to assign a magazine to a location in which there is no magazine. The process then terminates in a step 1310 without having assigned any locations to the magazine identified by the user.

If, in the step 1306, it is determined that there is a magazine in the bay identified by the user, the system then determines in a step 1312 whether a barcode on the magazine is readable by a barcode reader located in the jukebox holding the magazine. If the barcode cannot be read, then in a step 1314, the location of the optical disc magazine in the database is updated to indicate that the magazine resides in the bay selected by the user. The process then terminates in the step 1310. If, however, in the step 1312, the barcode on the magazine is readable, then, in a next step 1316, it is determined whether the barcode read from the magazine matches a known barcode for the magazine identified by the user. If the two barcodes match, then the database is updated in the step 1314, and the process terminates in the step 1310. If the barcodes do not match, then in a step 1318, an error report is generated describing the error condition of attempting to assign to the selected magazine a location that contains a different magazine. The process then ends in the step 1310.

A distinct advantage of the present invention is that it permits an optical disc magazine to be represented in a magazine database even though the magazine does not occupy a physical bay of an optical disc jukebox. Therefore, there is no maximum number of magazines that can be represented in a magazine database.

A graphical user interface presents to users a catalog including any number of optical disc magazines which comprise the off-line magazine shelf. The magazine shelf is represented by a single icon. By clicking and expanding on the magazine shelf icon, the graphical user interface presents the hierarchical display of each magazine in the off-line magazine shelf. By next clicking on any of the magazines exposed, the system will then graphically depict each of the optical discs stored in the magazine. Next, by clicking on any of the icons representing each of the optical discs in an exposed magazine, the system displays to the user the hierarchical list of all of the files and subdirectories located on an optical disc. Thus, in the case where an optical disc library contains a very large number of optical discs far exceeding the physical capacity of all optical disc jukeboxes on a network, the off-line magazine shelf extends the capacity of the optical disc library by making available to users an arbitrarily large index of the contents of all of the optical discs in the library, whether on-line or off-line.

Figure 14:
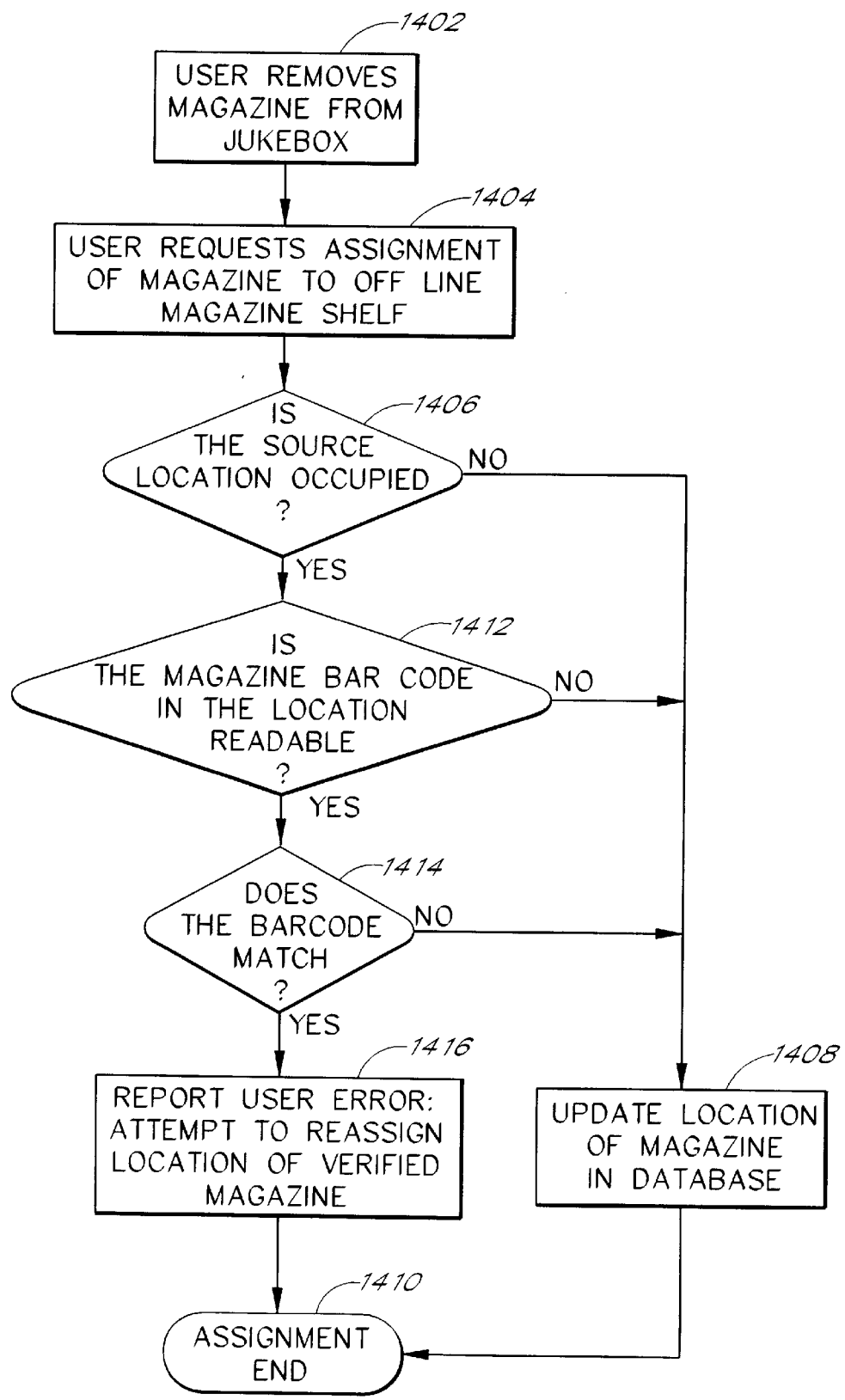
FIG. 14 illustrates the steps of removing a magazine from an optical disc jukebox and associating it with an off-line magazine shelf.

FIG. 14 illustrates the steps of removing a magazine from an optical disc jukebox and associating it with an off-line magazine shelf. In a first step 1402, a user removes an optical disc magazine from an optical disc jukebox. In a next step 1404, the user issues a request to assign the removed magazine to the off-line magazine shelf. The request issued in the step 1404 is preferably performed by a user clicking on an icon representing the magazine removed from the jukebox. Each magazine in each optical disc jukebox is uniquely identified by a magazine UID. The graphical user interface illustrates icons representing each magazine located in an optical disc jukebox. Thus, each icon representing a magazine also represents a magazine UID.

In a step 1406, it is determined whether there is a magazine in the bay of an optical disc jukebox from which the user removed the magazine in the step 1402. If the bay is empty, then in a step 1408 the location of the removed magazine is updated by indicating in the magazine database that the magazine is now off-line (i.e., the magazine is now part of the off-line magazine shelf). The process then terminates in a step 1410.

If, however, in the step 1406, it is determined that a magazine occupies the bay (from which the user supposedly removed the magazine), then, in a step 1412, it is determined whether the barcode of the magazine in the bay is readable. If the barcode of the magazine in the bay is not readable, then the step 1408 is performed to update the location of the magazine requested to be assigned to the off-line magazine shelf. The process terminates in the step 1410. If in the step 1412 the barcode is determined to be readable, then in a next step 1414, it is determined whether the barcode of the magazine in the bay matches the barcode associated with the magazine identified by the user in the request to assign a magazine to off-line status. If the barcodes do not match, then the steps 1408 and 1410 are performed. If the barcodes do match, then in the step 1416, an error report is generated indicating an attempt to assign to off-line status a magazine that currently resides in a bay of a jukebox. The system then terminates in the step 1410.

Figure 15:
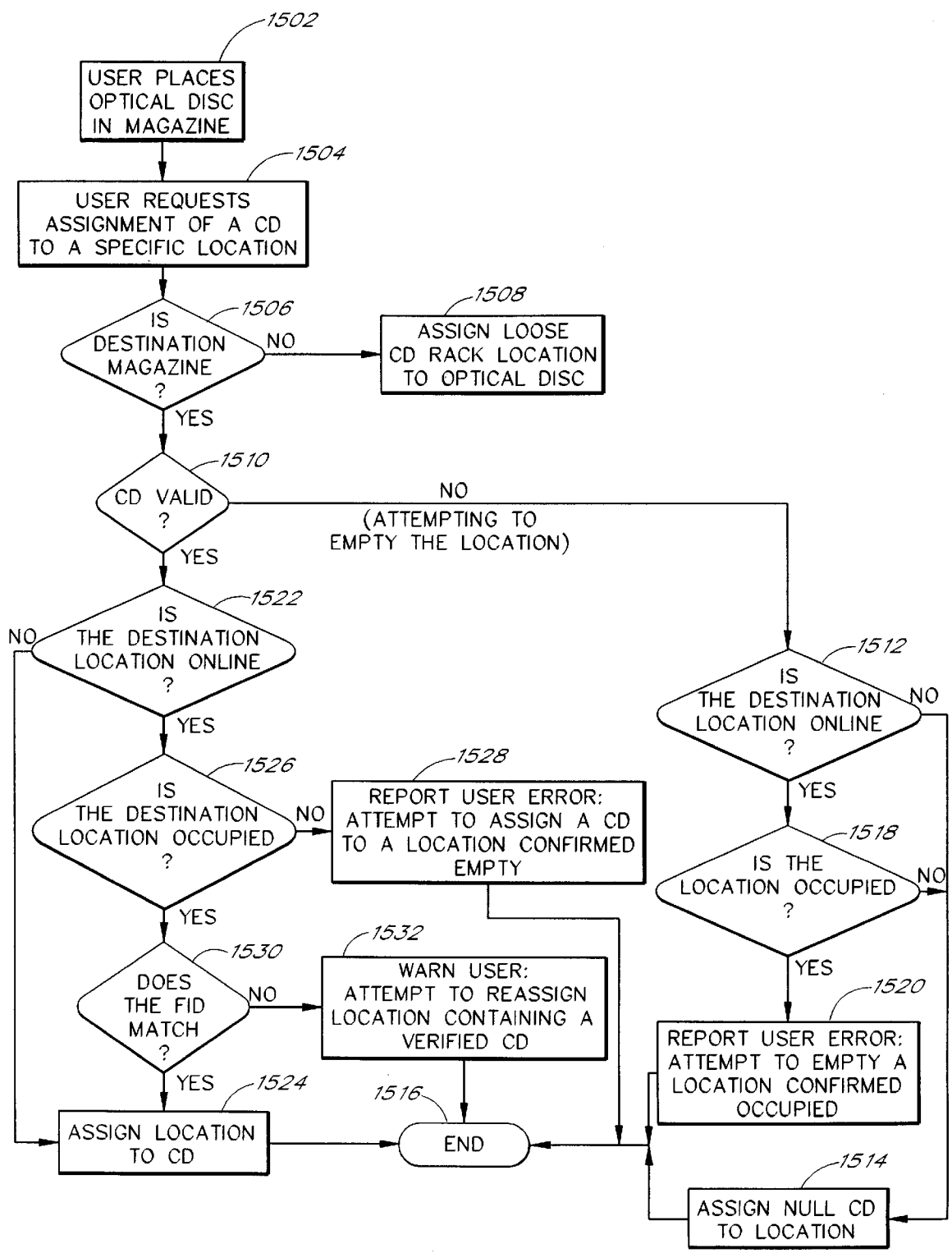
FIG. 15 illustrates the steps of manually assigning a storage location to an individual optical disc.

FIG. 15 illustrates the steps of manually assigning a storage location to a selected optical disc. In a first step 1502, the user places an optical disc in a magazine. In a next step 1504, the user selects the newly loaded optical disc and issues a request to assign a specific location to the selected optical disc. Then, in a step 1506, it is determined whether the location to be assigned to the selected optical disc is not a null location. A location to be assigned to a disc may be a null location when, for example, the user specifies a loose CD rack as the location to be assigned to a disc. If the user has requested to assign a null location to the optical disc, then, in a step 1508, a loose CD rack location is assigned to the optical disc (if the optical disc is already catalogued).

The loose CD rack represents all optical discs catalogued by the system but not assigned to any magazine, whether the magazine is presently loaded in an optical jukebox or is a member of the off-line magazine storage. Thus, the present invention allows individual optical discs to be catalogued and managed in an optical disc library without even being assigned to a physical magazine. A user accesses and browses the loose CD rack by accessing the off-line magazine shelf. Accessing the off-line magazine shelf is accomplished by clicking the icon representing the off-line magazine shelf in the graphical user interface. Clicking the icon which represents the off-line magazine shelf exposes subordinate icons which include a magazine icon for each magazine catalogue to the off-line magazine shelf and also a single icon representing a loose CD rack. Clicking the icon representing the loose CD rack will expose an icon for each individual optical disc catalogued to the loose CD rack. Thus, if an optical disc has been cataloged, as described above, and assigned to the loose CD rack, then its contents are accessed and browsed via the off-line magazine shelf. If an optical disc has not been cataloged, but has been assigned to the loose CD rack, then its title can be accessed via the off-line magazine shelf but not its contents.

If, in the step 1506, the destination location is not null, then in a next step 1510, it is determined whether the selected optical disc (to which a location is being assigned) is not null. An optical disc might be null when a user has issued a request to empty a specific optical disc storage location (i.e., the logic of the steps of FIG. 15 empties a location by assigning a null disc or NULL value to the location). If a specific location is being assigned to a null optical disc, then, in a step 1512, it is determined whether the location to be assigned is on-line, that is, whether the identified tray is assigned to a magazine that is currently loaded into an optical jukebox. If the magazine containing the tray to be assigned is not on-line (not loaded into an optical jukebox) then, in a step 1514, a null disc is assigned to the specific location. The process then terminates in a step 1516.

If the magazine having the specified tray to be assigned to the selected optical disc is currently loaded in an optical jukebox, then in a step 1518, it is determined whether an optical disc is already loaded in the tray specified. If the tray is empty, then a null disc is assigned to the tray in the step 1514, and the process terminates in the step 1516. If there is an optical disc in the identified tray, then in the step 1520, an error report is generated to report the error condition of attempting to empty a location that is confirmed to be occupied.

If, in the step 1510, it is determined that the selected optical disc is not null, then, in a step 1522, it is determined whether the magazine containing the specified tray to be assigned to the optical disc is loaded in an optical jukebox. If the magazine is not loaded in an optical jukebox, then, in a step 1524, the specified tray is assigned to the selected optical disc. The process then terminates in the step 1516. If the magazine containing the identified tray is loaded into an optical disc jukebox, then in a step 1526, it is determined whether the identified tray in the magazine is already occupied by an optical disc. If the tray is not occupied, then, in a step 1528, an error report is generated describing the error condition of attempting to assign an optical disc to a location confirmed empty. In one embodiment, the user is prompted to override the error and continue the operation. If the user selects the override option, the disc changer physically retrieves the optical disc from its present tray location and stores it in the tray which was confirmed to be empty. The process terminates in the step 1516.

If, however, in the step 1526, it is determined that an optical disc resides in the identified tray, then, in a step 1530, the system determines whether the fingerprint ID of the optical disc residing in the tray matches the fingerprint ID of the optical disc to which a location is to be assigned. If the two fingerprint IDs match, then the step 1524 is performed, assigning the identified tray to the specified optical disc, and the process terminates in the step 1516. If, however, the two fingerprint IDs do not match, or if one of the fingerprint IDs is not known or catalogued in the system, then, in a step 1532, a warning is issued to the user for attempting to reassign a location which contains a verified optical disc. Preferably, in the case where the user manually loads the optical disc in a magazine tray other than the one to be assigned to the optical disc, the user is presented with an option to override the warning and to assign the specified magazine tray location to the selected optical disc even though a different optical disc is found in the specified tray. An advantage of the present invention is to load the selected optical disc into the specified tray and to move the different optical disc into the tray which initially held the selected optical disc (i.e., to swap the locations of the selected optical disc and the different optical disc). Thus, if the user selects to override the warning, the disc changer is advantageously instructed to open a tray of an unoccupied disc drive, to then retrieve the different optical disc from the specified location and to drop the different disc temporarily into the open tray of the disc drive. Next, the disc changer is instructed to retrieve the selected optical disc from its tray and to store it in the selected tray. The disc changer is further instructed to retrieve the different optical disc from the open disc drive tray and to store it in the location which held the selected optical disc. The respective new locations (magazine trays) are then assigned to the different optical disc and the selected optical disc. The process then terminates in the step 1516.

An optical disc management system embodying the present invention performs a verification session. The verification session confirms the identity and location of all on-line optical discs (all optical discs capable of being retrieved and loaded by a robotic optical disc jukebox or robotic disc changer).

In one embodiment of the present invention, each tray of each magazine in a disc changer is examined in sequence to determine first whether the respective tray is empty, and second, if not empty, the Fingerprint ID of the optical disc occupying the respective tray. If a first tray of a first magazine is empty, the next tray of the magazine is examined, and so on. If the first tray of the first magazine is not empty, the Fingerprint ID of the optical disc occupying the first tray is determined. To determine the Fingerprint ID of an optical disc occupying a magazine storage tray, a disc changer is instructed to retrieve the optical disc and load the optical disc in an available optical disc drive. Derivation of the Fingerprint ID is performed as discussed above.

Once the Fingerprint ID of the retrieved optical disc is determined, in-memory magazine data and persistent (hard disk-based) data are queried to determine a Fingerprint ID of an optical disc expected to occupy the first tray. If the two Fingerprint ID's match, the process continues with the next tray. If the two Fingerprint ID's do not match, all memory and persistent magazine records are searched to determine an expected tray location for the optical disc (which occupies the first tray though the first tray was never assigned to it). If an expected tray location is found, then the disc changer is instructed to retrieve the optical disc from the first tray location and to store the optical disc in the destination tray it is expected to occupy. If a different disc is in the destination tray then the disc changer is instructed to swap their locations (as described above). Following such a swap, the verification session continues by again examining the first tray to determine the FID of the different disc which has been swapped into the first tray. If the FID of the different disc matches the FID of the disc expected to occupy the first tray, then the verification process continues with the second tray. If the FID of the different disc is expected to occupy a different tray, then the disc changer is instructed (as described above) to relocate the optical disc. If the FID of the optical disc in the first tray has no other tray location associated with it in the memory or persistent magazine records, then the first tray location is associated with that FID. The verification session thus progresses until all magazine trays have been verified.

Figure 16:
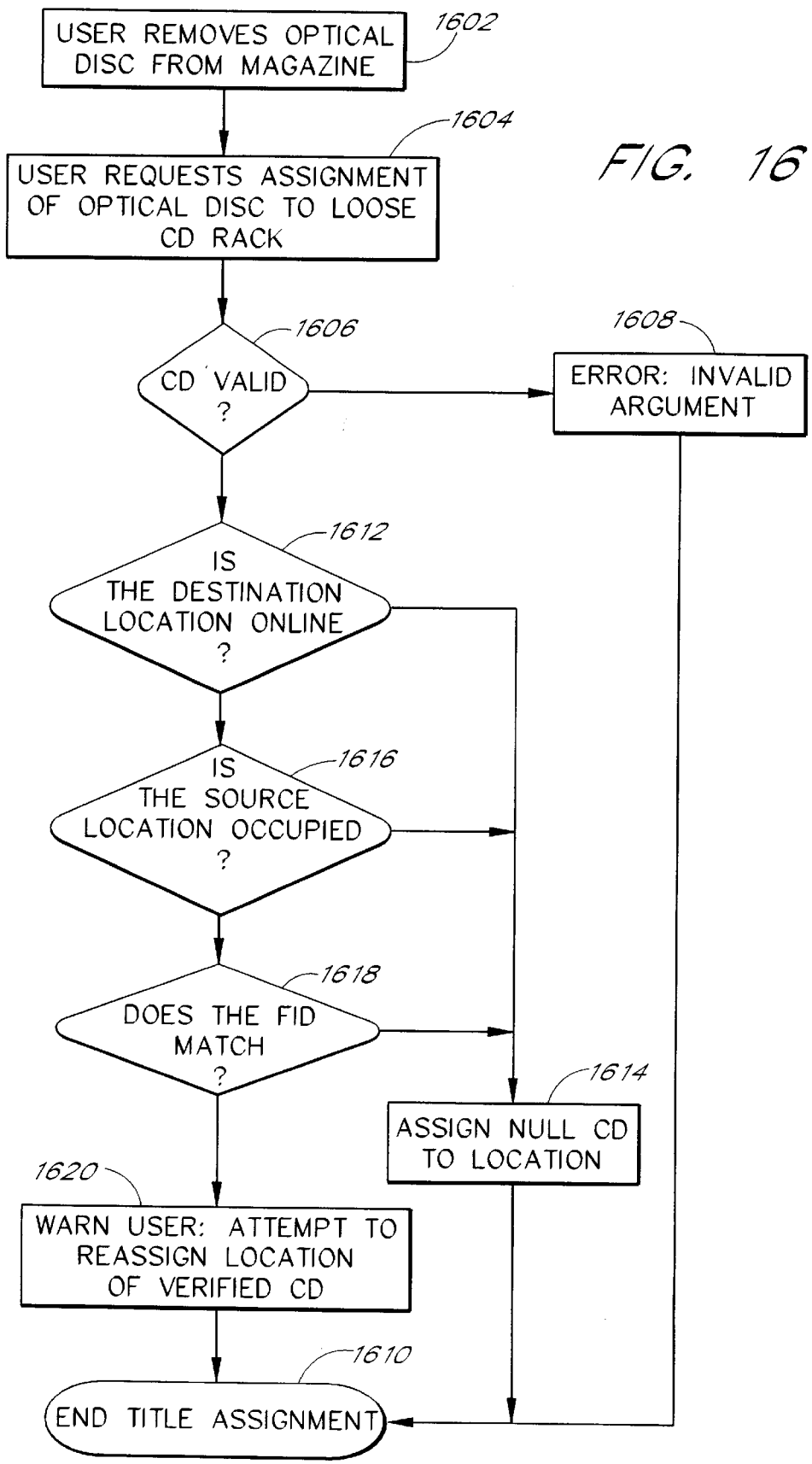
FIG. 16 illustrates the steps of manually assigning an optical disc to a loose CD rack.

FIG. 16 illustrates the steps of manually assigning an optical disc to a loose CD rack. In a step 1602, a user physically removes an optical disc from a magazine. In a next step 1604, the user issues a request to assign the optical disc to the loose CD rack. Then, in a step 1606, it is determined whether the optical disc to be assigned to the loose CD rack is not a null optical disc. If the disc is a null optical disc then, in a step 1608, an error report is generated indicating an attempt to assign a null disc to the loose CD rack, and the process then terminates in a step 1610. If, however, in the step 1606, it is determined that the optical disc to assign to the loose CD rack is not a null disc, then, in a step 1612, it is determined whether the tray which contained the optical disc to be assigned belongs to a magazine currently loaded in an optical jukebox. If the magazine is not currently loaded into an optical jukebox, then, in a step 1614, the identified optical disc is assigned to the loose CD rack. The process then terminates in the step 1610.

If, in the step 1612, it is determined that the magazine is currently loaded into an optical disc jukebox, then, in a step 1616, it is determined whether the tray which contained the identified optical disc is occupied by an optical disc. If the tray is empty, then the step 1614 is performed assigning the identified optical disc to the loose CD rack. The process then terminates in the step 1610. If, however, in the step 1616, the tray is found to be occupied by an optical disc, then in a step 1618, it is determined whether the fingerprint identification of the optical disc occupying the tray matches the fingerprint identification of the disc to be assigned to the loose CD rack. If the two fingerprint IDs do not match, then the step 1614 is performed assigning the identified optical disc to the loose CD rack. The process then ends in the step 1610. If, in the step 1618, the two fingerprint IDs do match, then in a step 1620, a warning is issued for attempting to assign to the loose CD rack an optical disc which is currently loaded into an optical disc jukebox. The process then ends in the step 1610.

Figure 17:
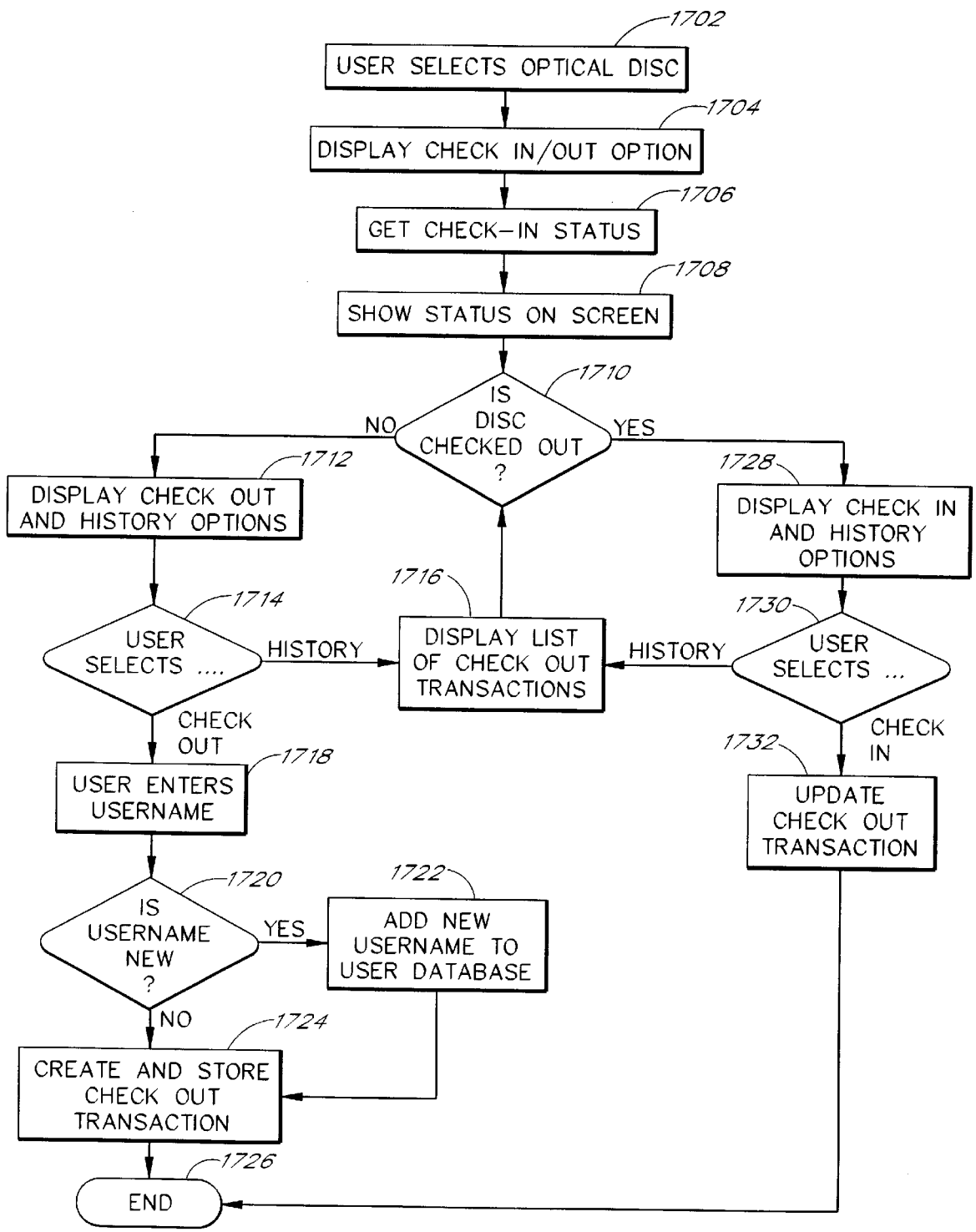
FIG. 17 illustrates the steps of checking out an optical disc from an optical disc library and checking in an optical disc into the optical disc library.

The present invention permits users of an optical disc library to check out and check in optical discs or optical disc magazines. FIG. 17 illustrates steps performed in checking in or checking out an optical disc from an optical disc management system. In a first step, 1702, a user selects an optical disc, for example, by using a pointer such as a mouse to click on an optical disc icon as described above. In a next step, 1704, a check in/check out option is displayed to the user. The status of the selected optical disc is then determined in a next step 1706 (i.e., a determination is made as to whether the disc is currently available for check out or is unavailable due to having been checked. This determination is made by searching a list of check out transaction records for the selected optical disc. Each check out transaction record includes a user identity and the time and date of a prior check out operation as well as the time and date of a corresponding check in operation. The current check out status of an optical disc is determined by accessing the most recent check out transaction record (one having the latest date and time associated with a check out operation) and scanning the record to establish whether a check in time and date exists. If no check in date and time exists in the transaction record, then the optical disc is currently checked out and, hence, is not available for check out. If a check in date and time does exist, then the optical disc is available to be checked out.

In one embodiment, the check out transaction records are stored in a database and are indexed by an identifier uniquely identifying an optical disc. One skilled in the art will appreciate that these transaction records could be stored in alternate formats such as individual computer files or as records in a larger computer file.

Only optical discs that are represented in the off-line magazine shelf or the loose CD rack may be selected for check-out. Optical discs that are on-line (available for access by an optical disc exchanger or optical disc jukebox) are removed from the exchanger or jukebox prior to check out operations. In an alternate embodiment, a user requests a check out of an on-line optical disc, and related software instructions generate commands to a robotic optical disc jukebox (or optical disc exchanger) which responds by removing the optical disc from its storage location or from an optical disc drive and then indicates (e.g., by a message displayed on a computer screen to a user) that the optical disc may be removed from the jukebox by the user.

After determining, in step 1706, whether an optical disc selected by the user is checked in or is checked out, the status of the optical disc is displayed on the screen in a step 1708 (e.g., the computer screen displays a message such as "available for check out" or "unavailable for check out"). If, in a step 1710, an optical disc is not already checked out (i.e., is available), two options are displayed to the user in a step 1712: a check out option and a history option. If, in a step 1714, the user selects the history option, then in a step 1716, a list of check out transactions performed on the selected optical disc is displayed to the user on a computer screen. The list is generated by scanning through the list of check out transaction records for the selected optical disc and extracting information that is included in a displayed list. The displayed list includes information for each prior check out operation, including the identity of a user and the date and time upon which the optical disc was checked out and subsequently checked in (returned).

If, in the step 1714, the user selects the check out option, then in a step 1718, the user enters a user name. If the user name is not in a user database in a step 1720, then the user name is added to the user database in a step 1722. In the step 1722, the user is prompted to enter a first name, a last name and an organization. Those of ordinary skill in the art will appreciate that other information identifying the user may be entered and stored in a user database. It will be further appreciated that alternative methods exist for storing information describing users such as individual computer files (one for each user) or a single computer file containing multiple records where each record corresponds to a user.

If, in the step 1720, it is determined that the user name is already in the user database, or after a new user name is added to the user database, then, in a step 1724, a check out transaction is created and stored in a database of check out transactions. Processing ends in a step 1726.

If in the step 1710 the selected optical disc is checked out, then in a step 1728, both a check in option and a history option are displayed to the user. If in a next step 1730 the user selects history, then a list of check out transactions performed on the selected optical disc is displayed to the user in the step 1716 as described above. Processing then resumes in the step 1710.

If, however, in the step 1730, the user selects the check in option, then in a next step 1732, a check out transaction recording the most recent check out of the optical disc is updated to show that the optical disc has been checked back into the optical disc library. Processing then ends in the step 1726.

Those of ordinary skill in the art will understand that check in and check out of magazines is provided for in like manner. In one embodiment of the present invention, only magazines assigned to the off-line magazine shelf are available for check out. Any magazines which are on-line (available for access by a robotic media transport element) are not available for check out and should first be removed and assigned to the off-line magazine shelf before being checked out. In another embodiment, a check out performed on an on-line magazine shelf causes a robotic media transport element to remove the selected magazine and generate a message to the user on a computer screen explaining that the magazine is now removable from the media transport device.

The present invention also provides a flexible method for resolving conflicts created by two or more users requesting use of a single optical disc drive. One of ordinary skill in the art will understand that a simple first-come, first-served method could be used to resolve competing requests for a single optical disc drive. Such a method comprises arbitration logic which would compare the time whereupon one user's request was made against the time of another user's request and allocate the optical disc drive to the user having the earliest request time.

A first-come, first-served method, however, does not consider any priority factor beyond earliest request time. Advantageously, an optical disc management system embodying the present invention arbitrates competing requests for a single optical disc drive by incorporating additional priority factors into the arbitration decision. Such factors include: privilege levels assigned to users of the system, usage patterns, operating system privilege levels assigned to individual users or groups of users, preferred-drive mappings, and also earliest request time.

A user of the optical disc management system is assigned a privilege level, such privilege level being, for example, a numeric value associated with a username and held in a record of a user database. The higher the numeric value, the greater is the privilege of the user and the greater is the weight given to the user's requests for optical disc management system resources. The numeric value representing a user's privilege level is compared against the numeric value of another user, and the optical disc drive is allocated to the user with the highest privilege level if the conflict resolution logic is configured to give highest priority to user privilege level. This user privilege level is separate from operating system privilege levels discussed below.

Usage patterns of users (i.e., frequency of requests for various optical disc management system resources, and time duration of prior uses of optical disc management system resources) are stored in user database records. When two or more users issue competing requests for an optical disc drive, the arbitration logic, considering usage patterns of users, allocates the drive to the user who has had least prior use of an optical disc drive—if the conflict resolution logic is configured to give highest priority to the usage patterns. One of ordinary skill will appreciate that, alternatively, the arbitration logic could allocate the requested disc drive to the user having the most prior usage time, or to the user who has most frequently been denied allocation in prior arbitrations.

The arbitration logic also compares the operating system privilege levels assigned to users who have issued competing requests to use a single optical disc drive. Those of ordinary skill in the art will appreciate that many computer operating systems are designed to accommodate multiple users and designed as well to resolve competing requests by multiple users for a single computer system resource. One factor considered by such operating systems is a system privilege level assigned to each user either individually or to a group with respect to which the user is a member. The conflict resolution method of the present invention compares operating system privilege levels of two or more users who have issued competing requests for a single optical disc drive and allocates the optical disc drive to the user with the highest operating system privilege level; that is, if the conflict resolution logic is configured to give highest priority to the operating system privilege level.

Preferred-drive mappings are associations between an optical disc, an optical disc drive, and a user. Thus, given a particular user and a particular optical disc, the preferred-drive mapping indicates which optical disc drive of potentially many available is the preferred optical disc drive to use when reading from or writing to the optical disc. Preferred-drive mappings are stored in user database records and each preferred-drive mapping indicates which optical disc drive to use depending on the optical disc selected. One of ordinary skill in the art will appreciate that preferred-drive mappings could also be stored in optical disc records (e.g., each mapping indicates which optical disc drive to use depending on the identity of the requesting user).

When an optical disc jukebox is accessible to a user and includes, for example, three optical disc drives, and when the user requests access to a particular optical disc, a preferred-drive mapping stored in the user database includes a reference to the particular optical and an associated reference to disc drive number 2 (for example). Thus, when this user requests this optical disc, disc drive number 2 is the preferred drive. When two or more users issue competing requests for an optical disc drive, one factor considered by the conflict resolution logic is the preferred-drive mapping. Accordingly, if the optical disc drive requested is the preferred drive of one user and not the preferred drive of the other competing users, then, if the configuration logic gives high enough priority to preferred-drive mappings, the optical disc drive is allocated to the user having the requested optical disc drive as a preferred drive.

The conflict resolution method is flexible, and the factors discussed are assigned differing weights to implement a particular conflict resolution scheme that best suits the needs of an optical disc management system. One of ordinary skill in the art will appreciate that the conflict resolution method is not limited by optical disc drives and applies equally well to any resource of a system which manages removable, computer-readable media.

FIGS. 18–22 illustrate a robotic optical disc jukebox (or disc changer). The present invention is not limited by any disc changer, including the one illustrated in FIGS. 18–22. The present invention operates with any device capable of responding to computer-generated commands to transport or exchange computer-readable media from storage locations to media reading or media writing devices.

Figure 18:
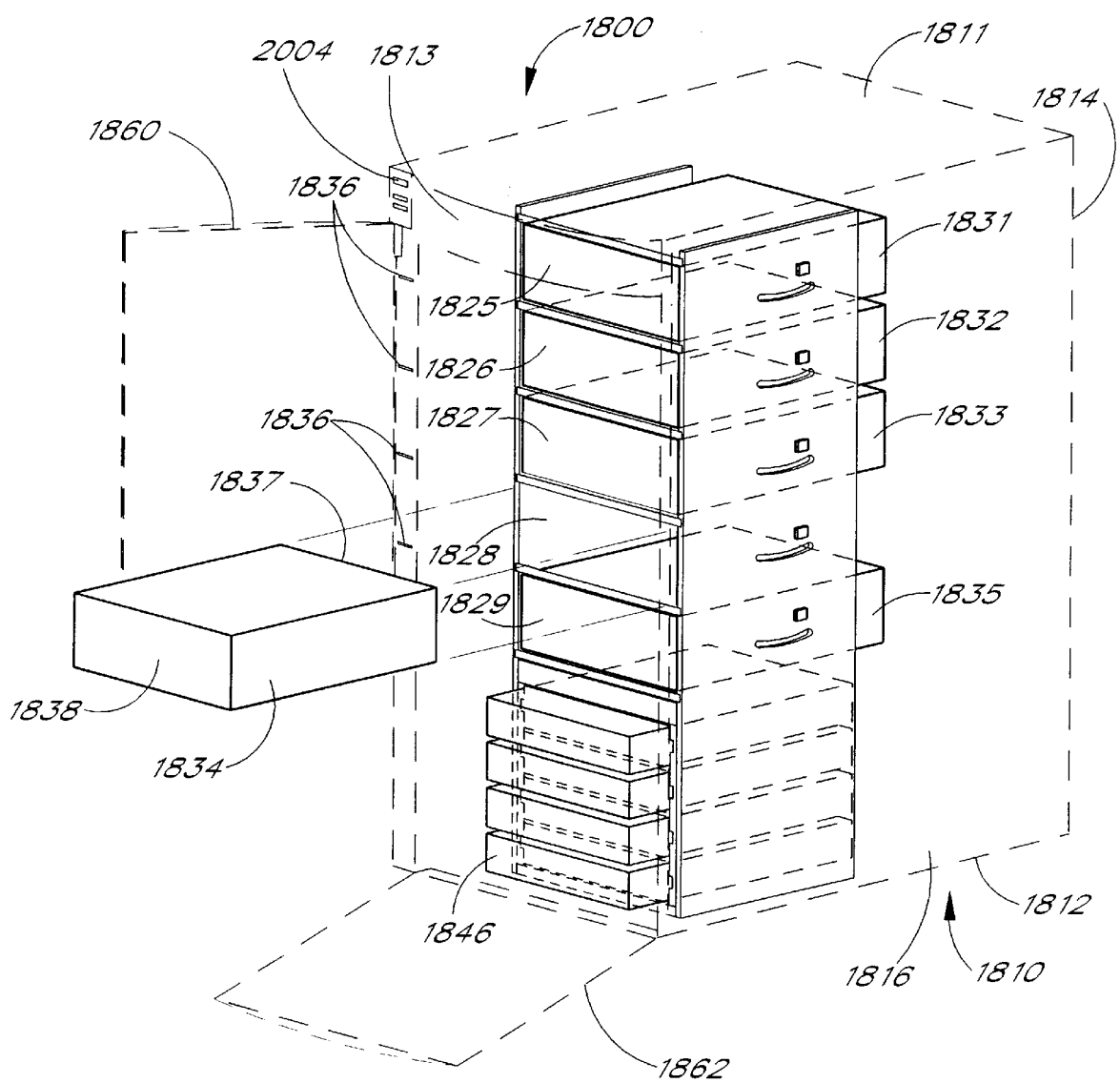
FIGS. 18 and 19 are perspective views of a disc changer with an outer enclosure shown in phantom to better illustrate the inner assemblies.
Figure 19:
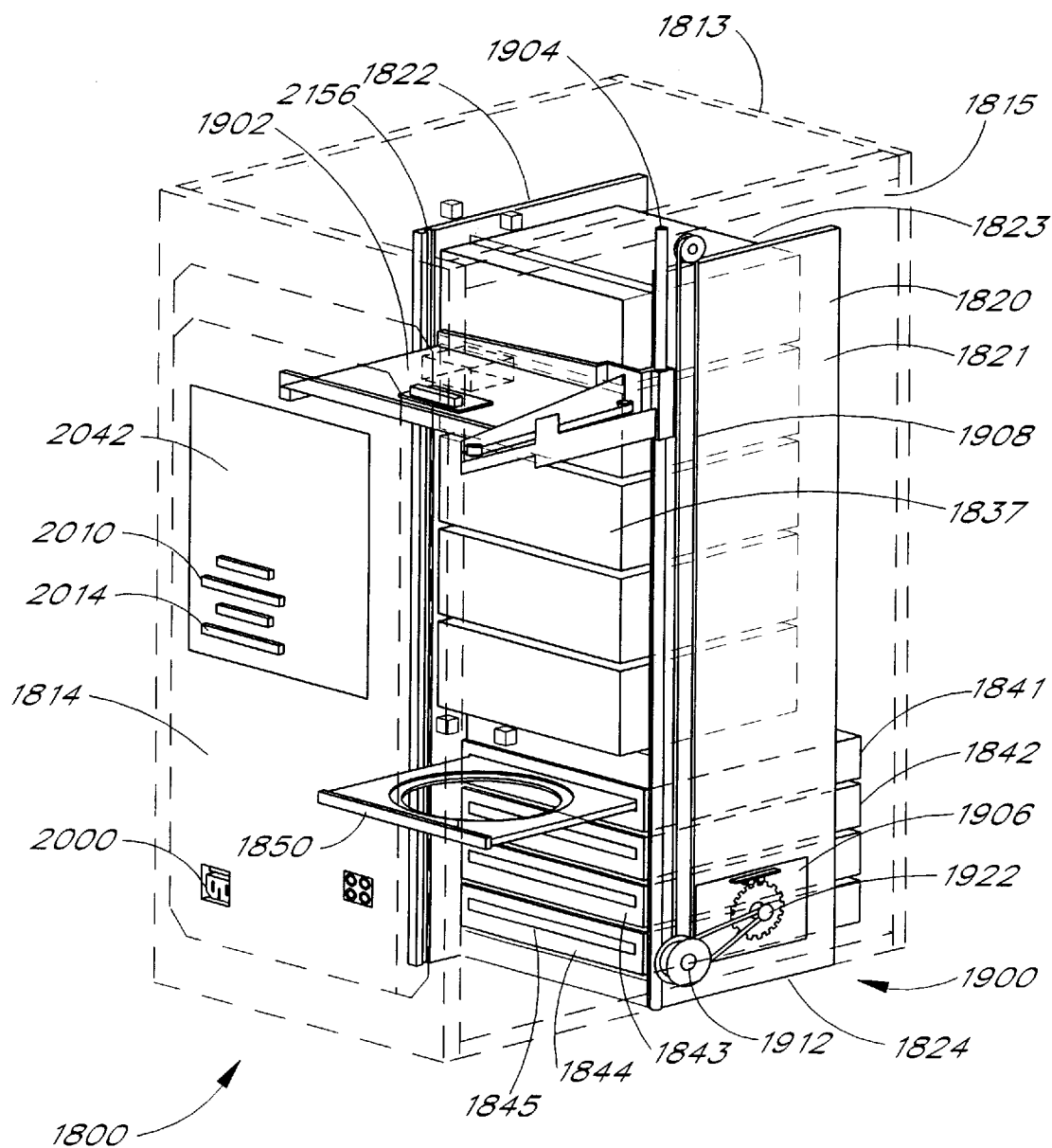
Figure 20:
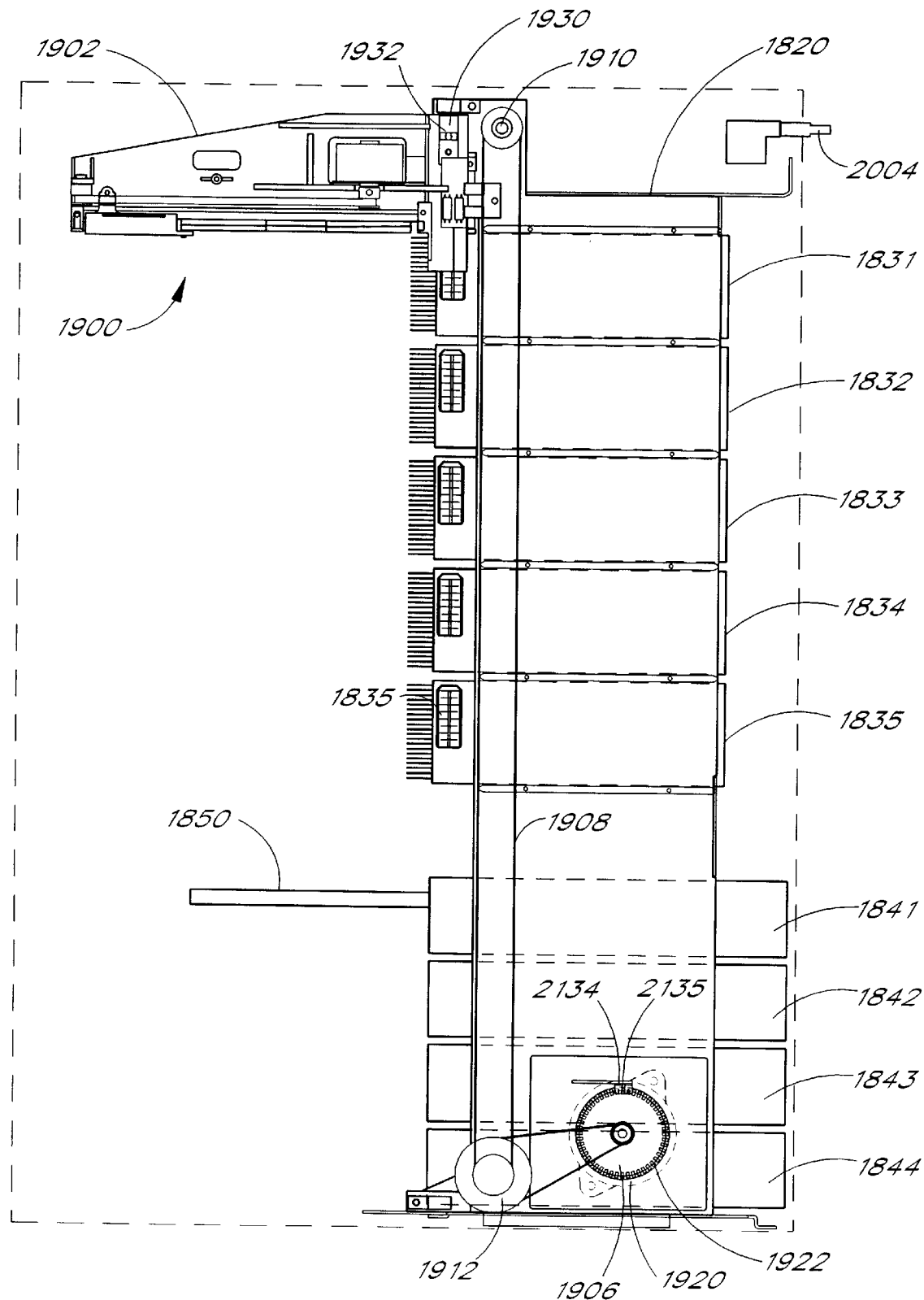
FIG. 20 is a left elevational view of the tower of a disc changer.
Figure 21A:
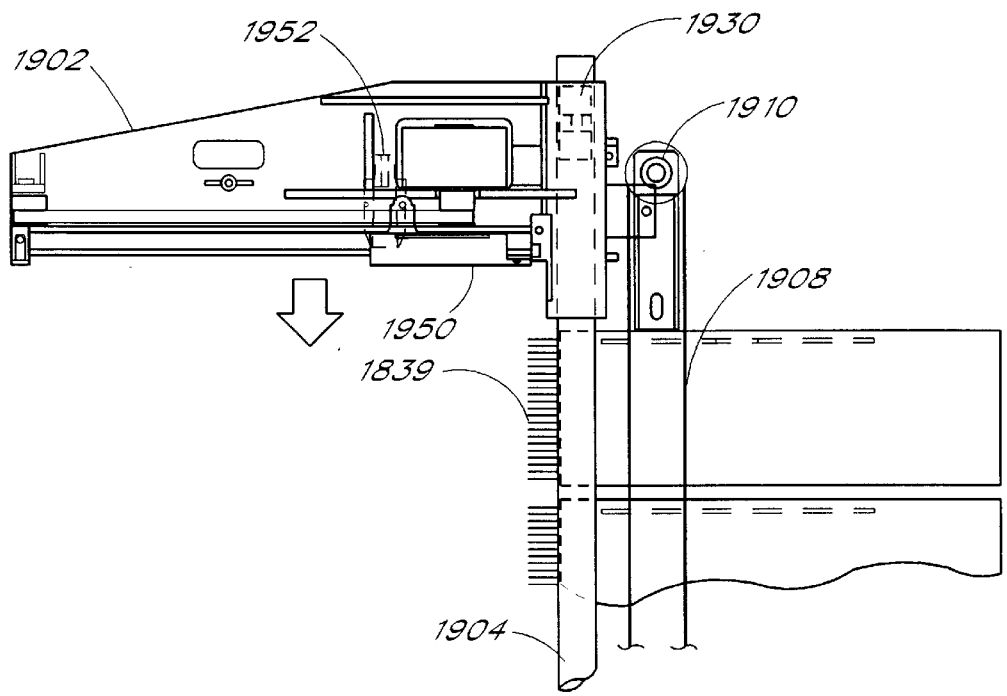
FIGS. 21A–21G are partially enlarged views of the disc transport mechanism shown in FIG. 20, illustrating the elevator moving from a home position, picking a magazine tray, lifting a disc from the tray, pushing in the magazine tray, lowering to an open disc drive tray, dropping the disc into the disc drive drawer, and returning to the home position.
Figure 21A:
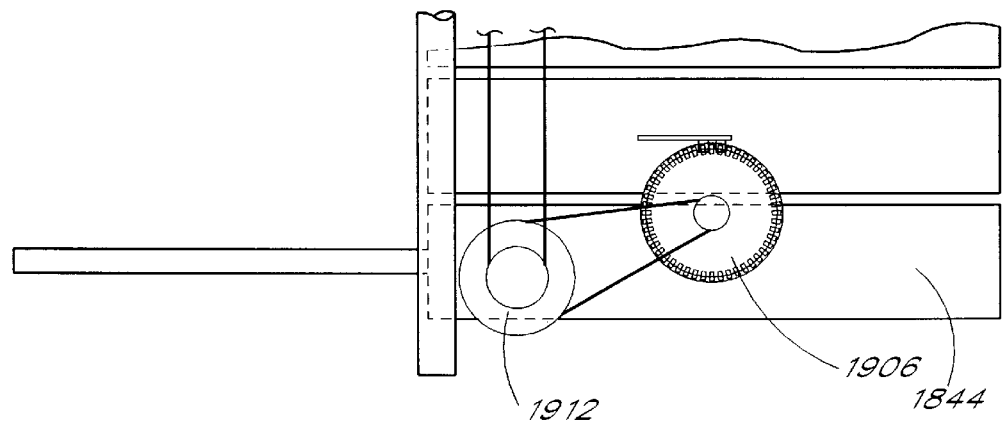
Figure 21B:
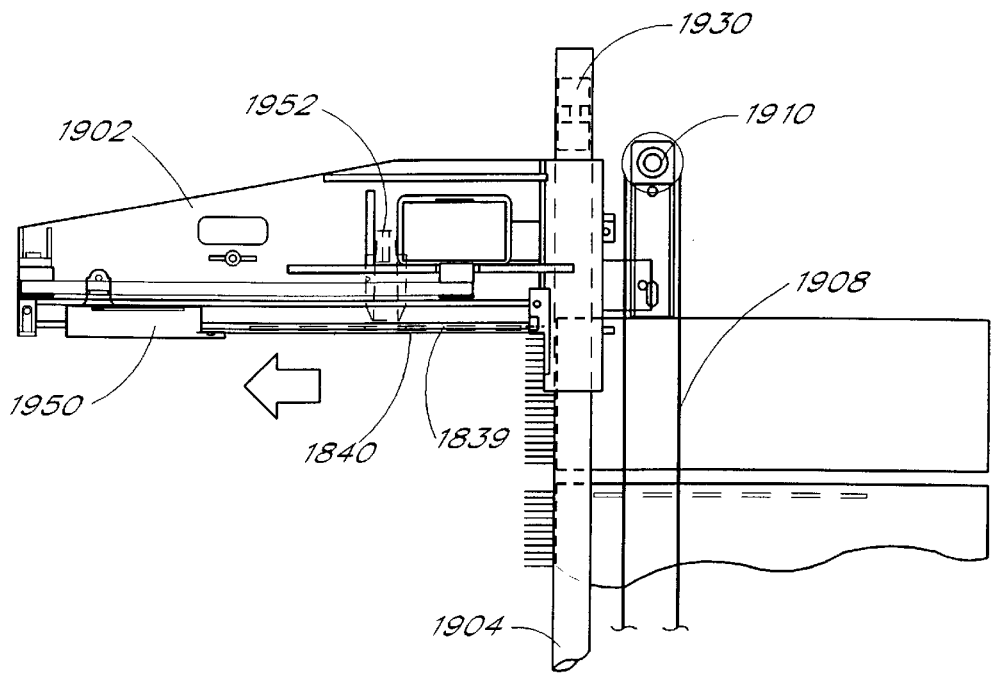
Figure 21B:
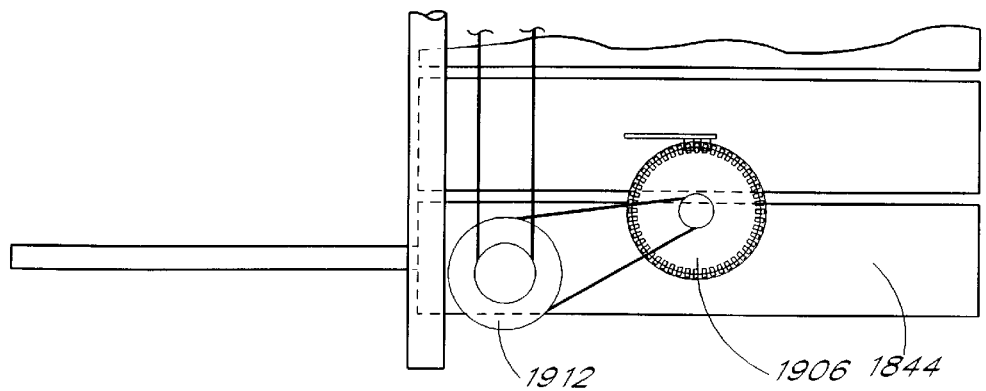
Figure 21C:
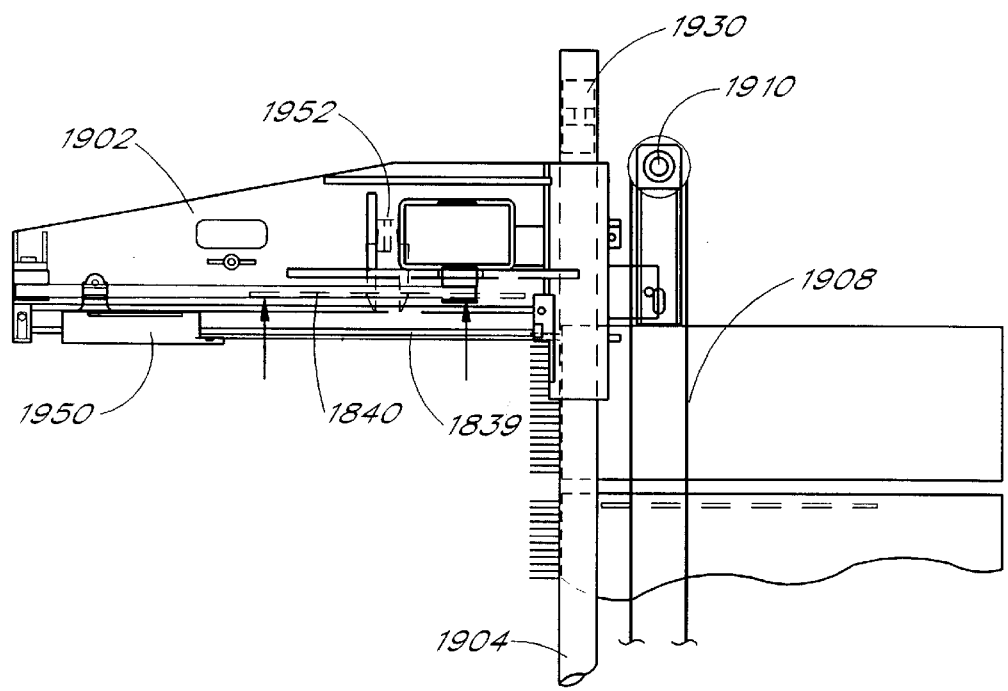
Figure 21C:
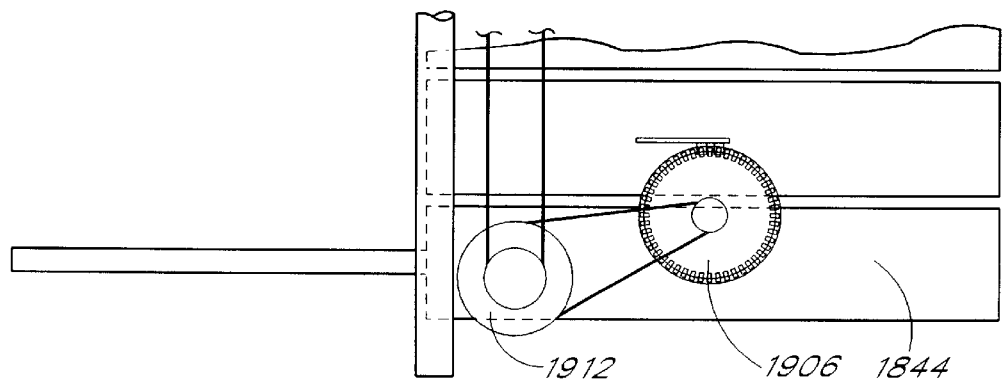
Figure 21D:
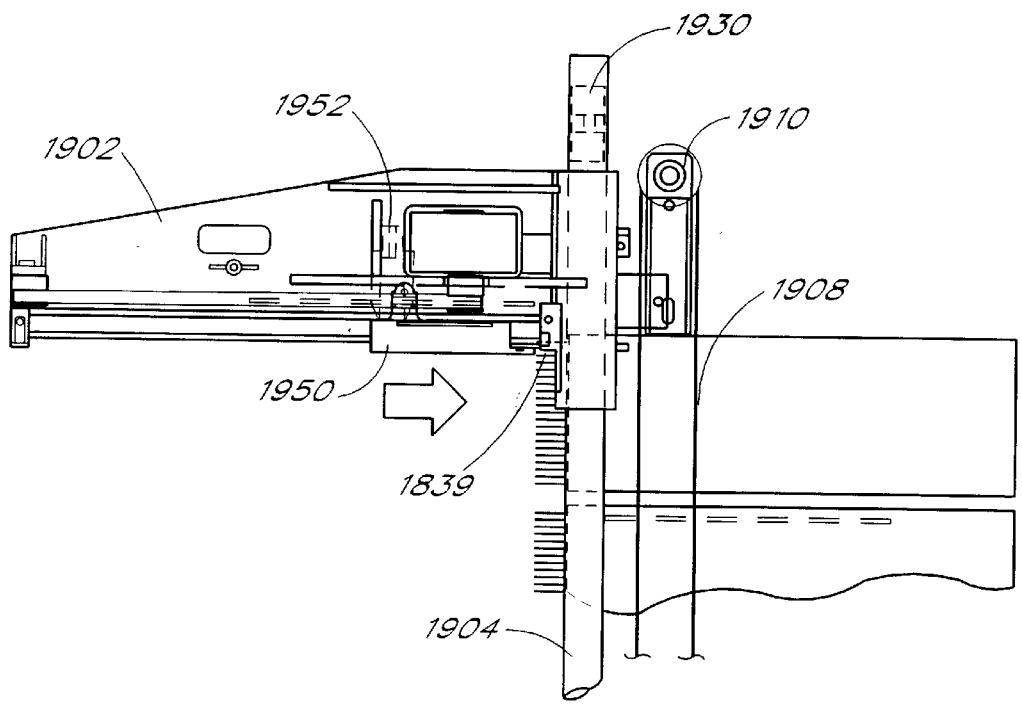
Figure 21D:
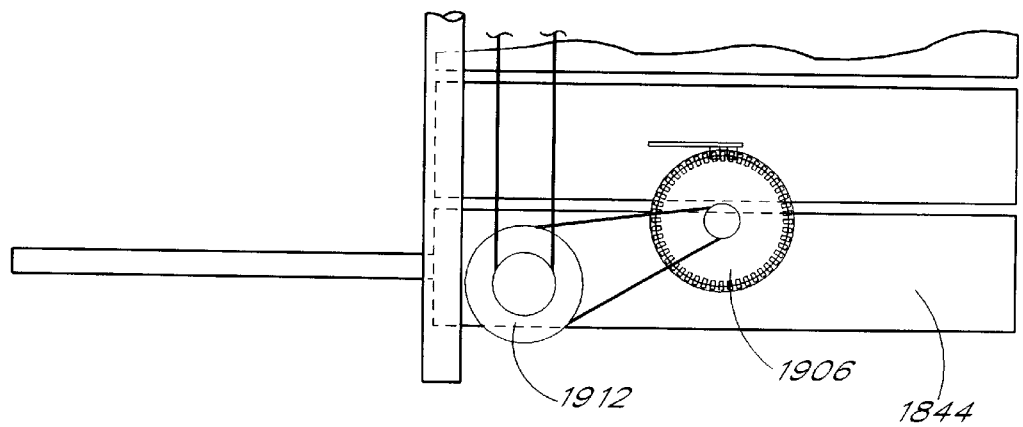
Figure 21E:
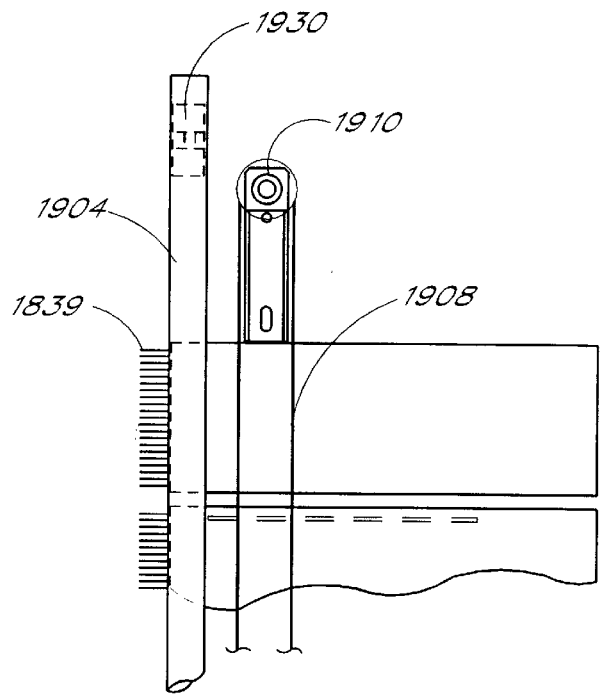
Figure 21E:
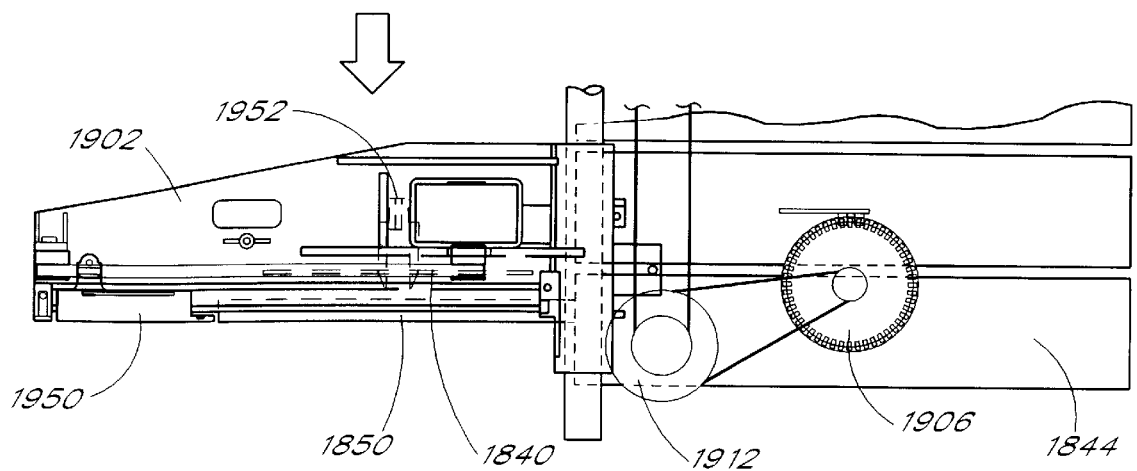
Figure 21F:
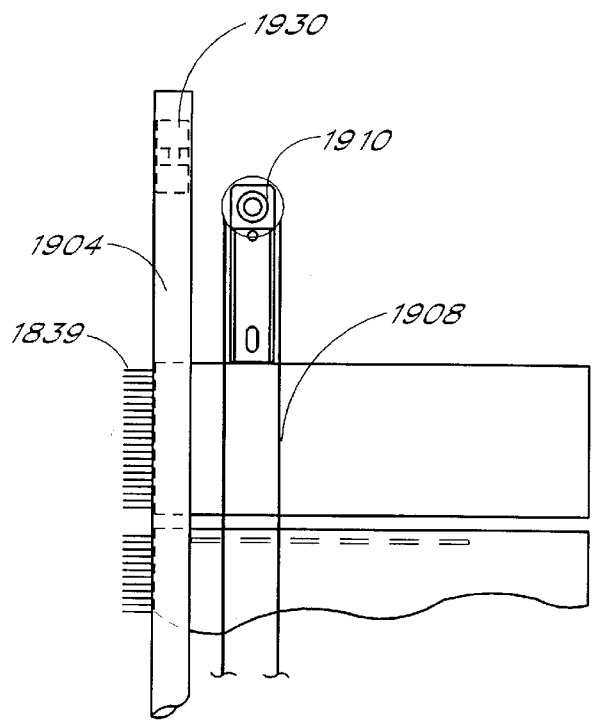
Figure 21F:
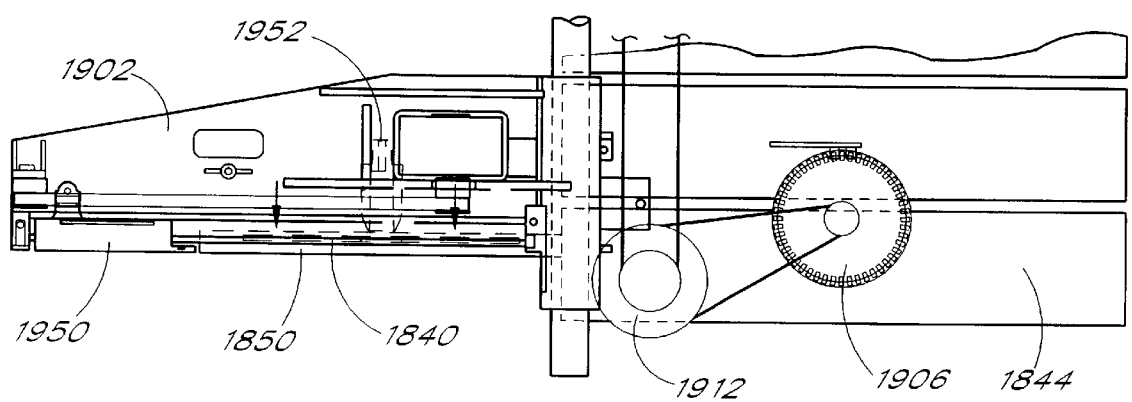
Figure 21G:
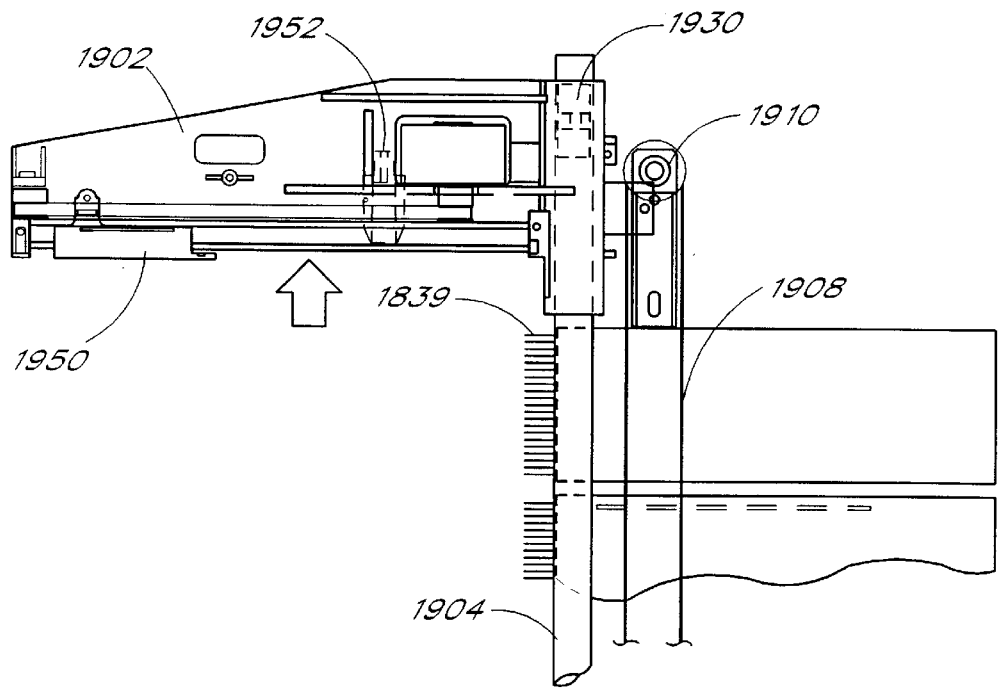
Figure 21G:
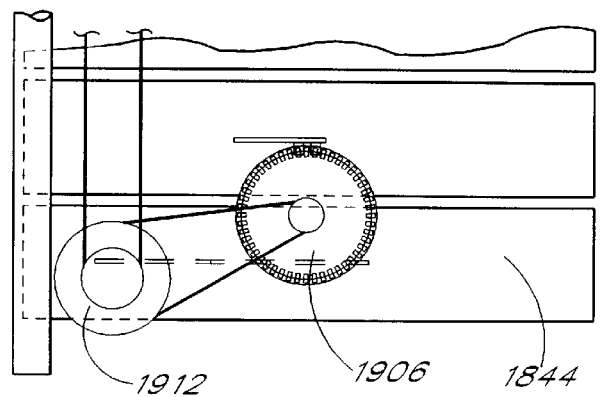

FIGS. 18 and 19 are perspective views of a disc changer whose operation is controlled by the present invention. FIG. 20 is a right side view of the disc changer. As illustrated in FIGS. 18, 19 and 20, the changer 1800 comprises a "tower" enclosure 1810 having a top 1811, a bottom 1812, a front 1813, a rear 1814, a left side 1815 and a right side 1816. One skilled in the art will appreciate that when the changer 1800 is in operation, the left and right sides 1815, 1816 will be covered with a skin (not shown) of steel or other suitable material. The sides 1815, 1816 are shown as being open in FIGS. 18 and 19 to expose the assemblies therein for illustrative purposes.

The enclosure 1810 further includes an inner frame 1820 comprising a left side portion 1821, a right side portion 1822, a top 1823 and a bottom 1824. The inner frame 1820 further comprises five magazine slots 1825, 1826, 1827, 1828, 1829 which are open toward the front 1813 and rear 1814 of the enclosure 1810. A plurality (e.g., 5) of disc magazines 1831, 1832, 1833, 1834, 1835 are stacked vertically with respect to each other in the slots 1825–1829 proximate to the front 1813 of the enclosure 1810. The magazines 1831–1835 are easily inserted and removed by sliding the magazines 1831–1835 from the slots 1825–1829 via the front 1813 of the enclosure 1810. More details regarding the insertion and removal of the magazines 1831–1835 will be provided below.

Each magazine 1831–1835 has a respective front portion 1837 and respective rear portion 1838. (For convenience, numerical identifiers have been applied to only the front portion 1837 and the rear portion 1838 of one of uppermost magazines 1831–1835.) The magazines 1831–1835 are mounted in the enclosure 1810 such that the rear portions 1838 face in the same direction as the front 1813 of the enclosure 1810 and such that the front portions 1837 are within the enclosure 1810.

Each of the magazines 1831–1835 has reference rails (not shown) which engage corresponding reference rails (not shown) in the slots 1825–1829 to hold the magazines in fixed, precise relationship with respect to the slots. The magazine rails are biased against the slot rails to assure that the engagement is uniform each time a magazine is inserted in a slot.

Each magazine 1831–1835 holds a plurality (e.g., 20) of magazine trays 1839 which slide into and out of the magazines. Each tray 1839 holds a respective disc 112, which is removed from the tray 1839 and transported to a disc drive to be accessed therein.

As further illustrated in FIGS. 18, 19 and 20, the enclosure 1810 includes a plurality (e.g., 4) of optical disc drives 1841, 1842, 1843, 1844 which are positioned in a stacked relationship beneath the disc magazines 1831–1835. (Although described herein as optical disc drives, it should be understood that other disc drives, such as writable disc drives, rewritable disc drives, and the like, can be used in the changer.) Each disc drive 1841–1844 has a respective front portion 1845 and a respective rear portion 1846. (For convenience, numeric identifiers are applied to only the front portion 1845 and the rear portion 1846 of one of the disc drives 1841–1844.) As illustrated, the disc drives 1841–1844 are mounted in the enclosure 1810 such that the rear portions 1846 face in the same direction as the front 1813 of the enclosure 1810 and such that the front portions 1845 are within the enclosure 1810. The drives 1841–1844 are biased by spring-like fingers to precisely position each drive in the enclosure 1820.

The front portion of each disc drive 1841–1844 includes a drawer 1850 which opens to receive a disc 112 from one of the magazines 1831–1835, and which closes so that the disc 112 is positioned within the disc drive to enable data to be transferred from the disc 112. The drives 1841–1844 operate in a conventional manner, and the operation will not be described in detail herein. Briefly, the drives 1841–1844 receive signals via a conventional bus, which in the preferred embodiment described herein, is a Small Computer System Interface (SCSI) bus. Each drive 1841–1844 is responsive to the signals to open its drawer 1850, to close its drawer 1850, and to transfer data from the disc 112 to the SCSI bus from storage locations determined by request signals sent via the bus. In the case of writable media and a read/write drive, data can be transferred over the SCSI bus to the disc 112 in the drive 1841–1844.

A door 1860 is hinged to the front 1813 of the enclosure 1810 proximate to the left side 1820. The door 1860 is sized to provide access to the magazines 1831–1835. An access panel 1862 is also hinged to the front 1813 proximate to the bottom front edge. The access panel 1862 is sized to provide access to the drives 1841–1844. The separate door 1860 and access panel 1862 are provided for the magazines and the drives because the magazines will be frequently accessed while it is unlikely that a user will need to access the drives on a regular basis. Preferably, the door 1860 is key-operated in a conventional manner to restrict access to the magazines 1831–1835, while the access panel 1862 can only be removed from inside the door 1860 using a special tool, thereby limiting access to the drives 1841–1844. Also preferably, a microswitch (not shown) or other detection device is provided for the door 1860 to indicate to the electronics (described below) that the door is open. Preferably, the door 1860 is provided with a dashpot (not shown) or other impeding mechanism to restrict the speed at which the door 1860 can be opened by the user. By providing a mechanical delay of approximately two seconds, the electronics (described below) are able to detect that the door has been opened and complete any disc transport operation before the user has opened the door sufficiently far to be able to remove a magazine 1831–1835. Indicating LEDs 1836 flash to warn the user not to extract a magazine prematurely.

The enclosure 1810 further includes a transport mechanism 1900 which comprises an elevator 1902 which moves vertically upward and downward on a shaft 1904. Force to move the elevator 1902 is provided by a motor assembly 1906 via a belt 1908 and a belt 2124. The belt 1908 is a toothed belt which operates over an upper toothed pulley 1910 and a lower toothed pulley 1912. The elevator 1902 is secured to the belt 1908 to move with the belt 1908. The lower toothed pulley 1912 is powered by the motor assembly 1906. As will be discussed in more detail below, the motor assembly 1906 comprises a stepper motor 1920 and a tachometer 1922. The tachometer 1922 enables the electronics (discussed below) to operate the transport mechanism 1900 as a closed loop system to thereby control the position of the elevator 1902 to true stopping position accurate to ±0 steps of the stepper motor 1920. A home position sensor 1930 is mounted proximate to the top of the shaft 1904 to detect when the elevator 1902 is at the uppermost travel position (i.e., home position) of the elevator 1902. The home position sensor 1930 comprises an internal infrared light transmitter (not shown) and an internal infrared light receiver (not shown). The home position sensor 1930 generates a signal in response to the interruption of the light.

The operation of the transport mechanism 1900 is controlled with respect to the home position. The magazines 1831–1835 and the drives 1841–1844 are accurately located within the enclosure with respect to the home position by the rail and spring arrangement to be described below such that the elevator 1902 can be stepped to a precise location with respect to a particular tray 1839 in a particular magazine 1831–1835 or with respect to a drawer 1850 in a particular drive 1841–1844.

As illustrated in FIGS. 21A–21G, the elevator 1902 supports a tray picker assembly 1950 and a disc lifter assembly 1952. As will be discussed in more detail below, the tray picker assembly 1950 engages the magazine tray 1839 with which it is aligned and withdraws the tray 1839 out of the respective magazine 1831–1835 in a horizontal plane to position the disc 112 in the tray 1839 with the center hole of the disc 112 positioned beneath the disc lifter assembly 1952. (See FIG. 21A.) The disc lifter assembly 1952 lifts the disc 112 from the tray 1839. (See FIG. 21B.) The tray picker assembly 1950 then pushes the tray 1839 back into the magazine from which it was withdrawn so that the tray 1839 does not impede the vertical movement of the elevator 1902. (See FIG. 21C.) After the tray 1839 is reinserted into the magazine 1831–1835, the elevator 1902 is moved downward along the shaft 1904 until the elevator is positioned above a drawer 1850 extending from one of the disc drives 1841–1844. (See FIG. 21D.) The lifter assembly releases the disc 112 into the drawer 1850. (See FIG. 21E.) The drawer 1850 is then retracted into the disc drive 1841–1844 so that the disc 112 is in its operating position. (See FIG. 21F.) Note that the extension and retraction of the drawer 1850 of the disc drive 1841–1844 is controlled by signals sent to the disc drive 1841–1844 via the SCSI bus, and the elevator 1902 does not control the movement of the drawer 1850.

As further illustrated in FIGS. 18, 19 and 20, the rear 1814 of the enclosure 1810 includes a conventional recessed power plug 2000 which receives a socket (not shown) on a conventional power cable (not shown) which plugs into a conventional AC outlet to provide AC electrical power to the enclosure 1810 and the components therein. The front 1813 also supports a conventional on/off switch 2004 for controlling the power applied to the changer 1800.

Figure 22:
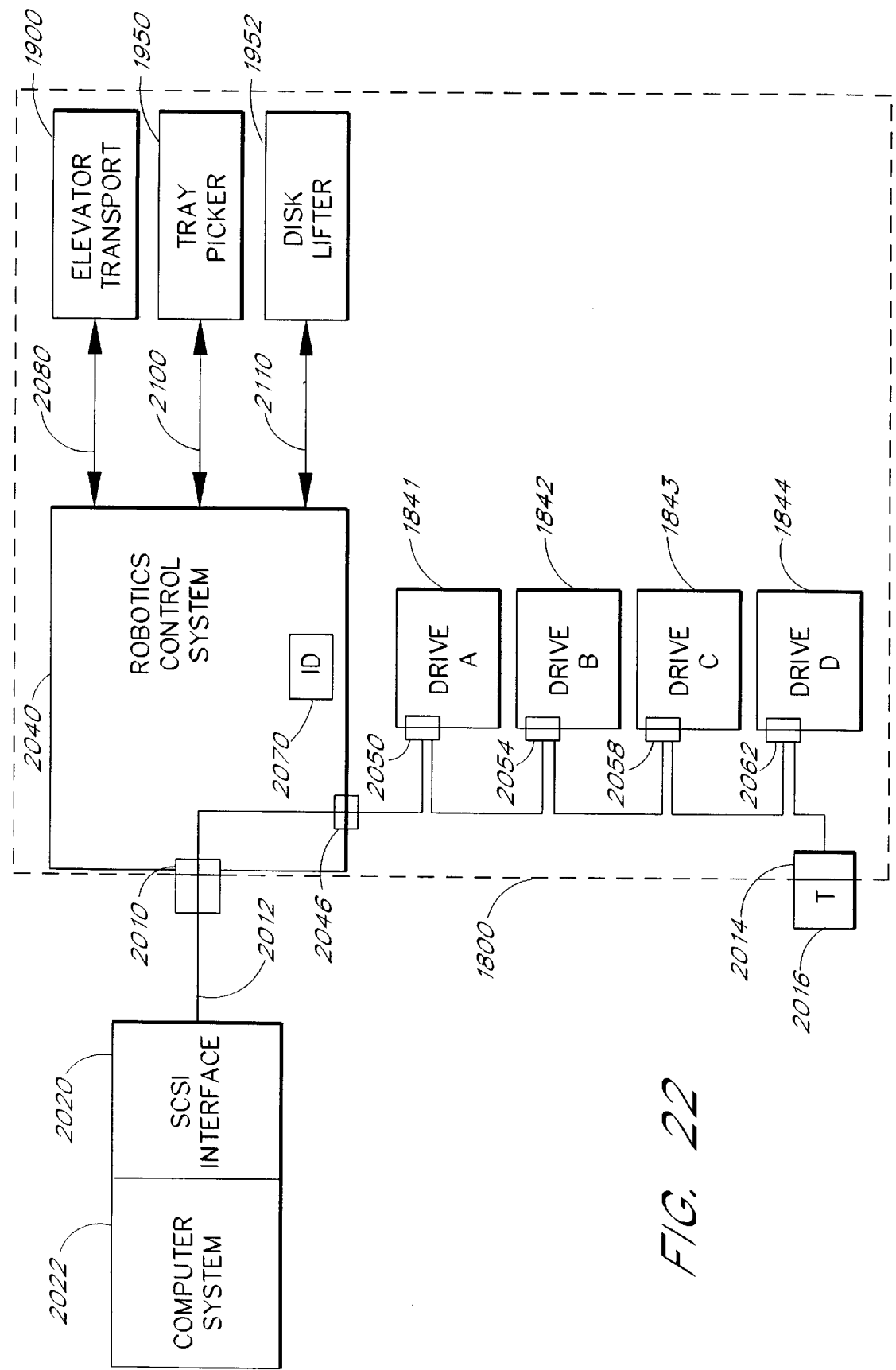
FIG. 22 illustrates a block diagram of the electrical interconnections between the principal components of the disc changer.

The rear 1814 further supports a conventional SCSI bus input connector 2010 which receives a connector (not shown) from a conventional SCSI bus cable 2012 (FIG. 22), and a conventional SCSI bus output connector 2014 which receives a connector (not shown) from a conventional SCSI bus cable (not shown) or from a SCSI bus terminator 2016 (FIG. 22). The SCSI bus cable 2012 interconnects the electronic components within the enclosure 1810 to a SCSI interface 2020 (FIG. 22) of a computer system 2022 (FIG. 22), a computer network or another digital electronic system which controls the changer 1800 and receives the data transferred therefrom.

FIG. 22 is a schematic illustration of the electrical interconnections between the principal components of the changer 1800 when connected to the SCSI interface 2020 of the computer system 2022. The computer system 2022 is a conventional computer system which includes software drivers which control the SCSI interface 2020 to cause the SCSI interface 2020 to transmit control and data signals on the SCSI bus cable 2012 and to receive control and data signals from the SCSI bus cable 2012. The operation of the computer system 2022 and the SCSI bus interface 2020 with respect to the transmission and reception of control and data signals is well known and will not be described in detail herein.

The SCSI bus cable 2012 communicates the SCSI control and data signals between the SCSI interface 2020 and the SCSI bus input connector 2010 on the changer 1800. The connector 2010 is electrically connected internally to a robotics control system 2040 (FIG. 22) which is implemented by components on a printed circuit board 2042 (FIG. 18) which is preferably mounted to the rear 1814. The robotics control system 2040 has an output connector 2046 which is electrically connected in a known manner to a conventional SCSI input/output connector 2050 on the first disc drive (DRIVE A) 1841, to a SCSI input/output connector 2054 on the second disc drive (DRIVE B) 1842, to a SCSI input/output connector 2058 on the third disc drive (DRIVE C) 1843, to a SCSI input/output connector 2062 on the fourth disc drive (DRIVE D) 1844, and to the SCSI output connector 2014 on the rear 1814, and thus to the SCSI terminator 2016. One skilled in the art will appreciate that further SCSI devices (not shown) can be connected to the SCSI bus by replacing the SCSI terminator 2016 with a cable (not shown) to such further SCSI devices. Furthermore, such further SCSI devices can be connected between the SCSI interface 2020 and the changer 1800, if desired.

The robotics control system 2040 has a conventional SCSI identification (ID) selector 2070 for selecting the SCSI address to which the robotics control system 2040. Similarly, each of the drives 1841–1844 has a respective ID selector (not shown) for selecting the SCSI address to which each drive 1841–1844 responds. It should be understood from FIG. 22, that the drives 1841–1844 are not controlled by the robotics control system 2040. Rather, the drives 1841–1844 transfer control and data signals to and from the SCSI interface 2020 in a conventional manner. The functional operation of each of the disc drives 1841–1844 is not affected by the robotics control system 2040, and the disc drives 1841–1844 therefore operate in conventional manner.

As further illustrated in FIG. 22, the robotics control system 2040 is electrically connected to the elevator transport mechanism 1900 via a set of lines 2080. In particular, and as described in more detail below, the robotics control system 2040 generates stepping signals to the stepper motor 1920 via the lines 2080 to cause the elevator 1902 to be moved up and down along the shaft 1904. The robotics control system 2040 receives feedback signals from the tachometer 1922 and the home position sensor 1930 via the lines 2080 to keep track of the position of the elevator 1902 in order to control the stepping of the motor 1920.

The robotics control system 2040 is also electrically connected to the tray picker assembly 1950 via a set of lines 2100. In particular, the robotics control system 2040 generates signals to the tray picker assembly 1950 via the lines 2100 to cause the tray picker assembly 1950 to extract a tray 1839 from a magazine and to position the tray 1839 beneath the disc lifter assembly 1952. The robotics control system further generates signals to the tray picker assembly 1950 via the lines 2100 to cause the tray picker assembly 1950 to reinsert the tray 1839 into its magazine. The robotics control system 2040 receives feedback signals from sensors on the tray picker assembly 1950 via the lines 2100 to indicate the current position of a tray 1839 being moved by the tray picker assembly 1950. Other signals received from other sensors (described below) associated with the tray picker assembly 1950 indicate the presence of obstacles to the movement of the elevator 1902 on which the tray picker assembly is mounted.

The robotics control system 2040 is also electrically connected to the disc lifter assembly 1952 via a set of lines 2110. The robotics control system 2040 generates signals on the lines 2110 to cause the disc lifter assembly 1952 to operate in a first manner to lift a disc 112 from a magazine tray 1839 or a drive drawer 1850 positioned beneath the disc lifter assembly 1952. The robotics control system 2040 further generates signals on the lines 2110 to cause the disc lifter assembly 1952 to operate in a second manner to lower a disc 112 onto a magazine tray 1839 or a drive drawer 1850 and to release the disc 112. The robotics control system 2040 receives a feedback signal from the disc lifter assembly 1952 via the lines 2110 to indicate when a disc 112 is being held by the disc lifter assembly 1952 after being lifted from a magazine tray 1839 or a drive drawer 1850. The robotics control system 2040 also receives a feedback signal from the disc lifter assembly 1952 to indicate when the disc lifter assembly 1952 is in its uppermost (i.e., raised position).

Although not shown in FIG. 22, a hard disk drive may advantageously be connected to the SCSI bus in preferred embodiments. By incorporating a hard disk drive into the system, frequently accessed programs or data may be transferred from one or more optical discs so that the information can be accessed without requiring movement of a disc from a magazine tray to a drive drawer (see caching system described above). This reduces the access time for the frequently used data and also makes all four drives available for less frequently used data.

Figure 23:
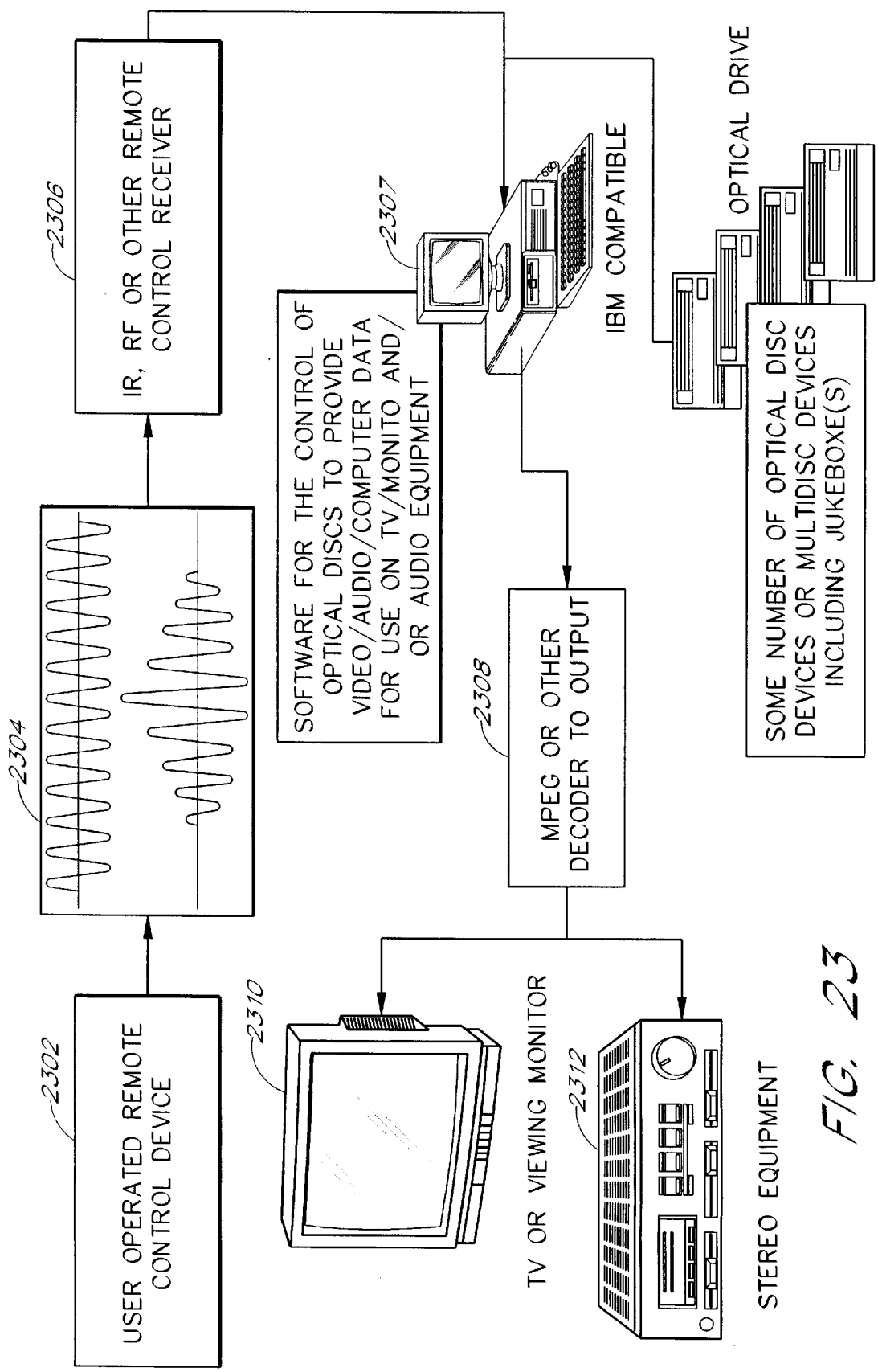
FIG. 23 is a block diagram illustrating access to a library of optical media by remote control.

FIG. 23 illustrates remote control of a robotic optical disc jukebox and of the transmission of signals generated by an optical disc drive. In a step 2302, a user operates a remote control device to issue infrared or radio frequency signals 2304. Such remote control devices, as well as others, are known in the art and the present invention is not limited by a remote control device. In a step 2306, the signals generated by the remote control device are received by a compatible receiver. Such receivers are known in the art and the present invention is not limited by remote control signal receivers.

A remote control receiver embodying features of the present invention interprets, in the step 2306, a range of received remote control signals comprising many separable identifiable signals into many corresponding computer-readable data (e.g., data that are capable of being processed by a central processing unit) which are then transmitted to a computer. In a step 2307, each of the many computer-readable data is mapped by a computer to a sequence of commands. Such commands cause directory information representing either magazine contents (i.e., titles of optical discs) or optical disc contents (i.e., titles of files of many media types) to be rendered into a format displayable on a personal computer screen (such as VGA-compatible graphical data) or displayable on a television screen (such as NTSC-compatible data) in a manner in which a user can browse entries. In a step 2308, the displayable data are in the form of MPEG-compatible signals (multimedia compressed signals), and are decoded by an MPEG decoder into NTSC-compatible signals. The present invention is not, however, limited by MPEG or NTSC, as the displayable data need not be compressed, and as many formats for storing displayable data are known in the art.

By browsing and selecting an entry using the remote control device (the signals being translated into computer-readable data values associated with browsing a list and selecting a list member) the user selects a file representing, for example, multimedia data (e.g., audio and video data). Following performance of the steps 2302, 2304, and 2306, a computer, in the step 2307, scans the file selected to determine the optimal delivery target device for the file (television 2310, stereo system 2312, or otherwise), issues commands to a robotic optical disc jukebox which retrieves the selected optical disc from magazine storage, loads the optical disc into an optical disc drive, and reads (plays) the selected file from the disc. The computer then, in the step 2308, directs, for example, an audio signal to stereo equipment 2312 and a video signal to a television monitor 2310. In this manner, a user can operate a remote control device to access and use a library of multimedia data.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A method for accessing and updating information from a library of optical discs, said method comprising the steps of:

cataloging optical discs, said cataloging step including the generation of a unique contents-based value for each of said cataloged discs, said unique value produced by iteratively reading data from the target disc and condensing said data using a selected hashing algorithm, said cataloging step including the generation of catalog data streams, said catalog data streams comprising fixed length data representing file and subdirectory attributes as well as variable length data representing file names and directory names;

producing limited catalogs representing file and subdirectory information on said optical discs, said limited catalogs confined to a fixed maximum number of subdirectory levels, said limited catalogs including files and directories on the disc possessing attributes which match a specific set of filter parameters, said fixed maximum number of subdirectory levels selected by a user, and said filter parameters selected by a user; and caching optical disc data to a hard disk, said cached data being written to said hard disk when said optical disc data is requested more frequently than other optical disc data, said requests being monitored by a caching file system, said caching file system determining when said requests for data can be satisfied by cached data, said caching file system satisfying said requests by accessing and communicating requested data from the cache.

2. The method as defined in claim 1, further comprising the step of reconciling the storage location of an optical media device, said optical media device stored in a storage location, said storage location represented by first data stored in a computer memory, said first data being associated with second data identifying an expected optical media device, said storage location being examined by a computer controlled reading device to identify said optical media device, said reading device generating third data identifying said optical media device, said third data compared to said second data.

3. A method for creating a fingerprint identification value to identify removable computer-readable media, wherein said fingerprint identification value comprises a fixed number of binary bits, said method comprising the steps of:

reading file and directory information from said removable computer-readable media to produce a stream of bytes;

sequentially adding each successive byte in said stream to a successive eight-bit segment of said fingerprint identification value, said successive eigh-tbit segment being the least significant eight bits of said fingerprint identification value following any addition involving the most significant bit of said fingerprint identification value; and replacing each successive eight-bit segment of said fingerprint identification value with the least significant eight bits of the sum of said addition performed on said successive segment.

4. A method for creating a fingerprint identification value to identify removable computer-readable media, wherein said fingerprint identification value comprises a fixed number of binary bits, said method comprising the steps of:

reading volume label information from said removable computer-readable media in a first group of bytes;

adding each of said first group of bytes to successive eight-bit segments of said fingerprint identification value;

replacing each successive eight-bit segment of said fingerprint identification value with the least significant eight bits of the sum of said addition performed on said successive segment;

reading root directory file sizes and directory sizes from said removable computer-readable media in a second group of bytes;

adding each of said second group of bytes to successive eight-bit segments of said fingerprint identification value, said addition being a second addition;

replacing each successive eight-bit segment of said fingerprint identification value with the least significant eight bits of the sum of said second addition performed on said successive segment;

reading root directory file names and directory names from said removable computer-readable media in a third group of bytes;

adding each said of said third group of bytes to successive eight-bit segments of said fingerprint identification value, said addition being a third addition;

replacing each successive eight-bit segment of said fingerprint identification value with the least significant eight bits of the sum of said third addition performed on said successive segment;

reading root directory file creation dates and times and directory creation dates and time from said removable computer-readable media in a fourth group of bytes;

adding each said of said fourth group of bytes to successive eight-bit segments of said fingerprint identification value, said addition being a fourth addition; and replacing each successive eight-bit segment of said fingerprint identification value with the least significant eight bits of the sum of said fourth addition performed on said successive segment.

5. A method for displaying an hierarchical index comprising components of a library of optical media, said method comprising the steps of:

maintaining in a computer-readable memory a first storage location data record corresponding to a first media storage device;

maintaining in the computer-readable memory an optical media record corresponding to an optical medium, said optical medium storing computer-readable data, said optical media record having a data identifier identifying said computer-readable data, said first media storage device storing said optical medium, said first storage location data record having a medium identifier uniquely identifying said optical medium;

displaying a library index option to a user via a user computer;

monitoring user input for selection of said library index option;

responding to selection of said library index option by displaying a first storage device icon associated with said first media storage device;

monitoring user input for selection of said first storage device icon;

responding to selection of said first storage device icon by displaying an optical medium icon having first horizontal and vertical displacements from said first storage device icon, and by displaying said medium identifier proximate to said optical medium icon;

monitoring user input for selection of said medium icon; and responding to selection of said medium icon by displaying said data identifier, said data identifier having second horizontal and vertical displacements from said medium icon.

6. A method for displaying an hierarchical index comprising components of a library of optical media, said method comprising the steps of:

maintaining in a computer-readable memory a first storage location data record corresponding to a first media storage device;

maintaining in the computer-readable memory a second storage location data record corresponding to a second media storage device, said first storage location data record having a subordinate storage identifier identifying said second storage device, said first media storage device storing said second media storage device;

maintaining in the computer-readable memory an optical media record corresponding to an optical medium, said optical medium storing computer-readable data, said second media storage device storing said optical medium, said second storage location data record having a medium identifier uniquely identifying said optical medium;

displaying a library index option to a user via a user computer;

monitoring user input for selection of said library index option;

responding to selection of said library index option by displaying a first storage device icon associated with said first media storage device;

monitoring user input for selection of said first storage device icon;

responding to selection of said first storage device icon by displaying a second storage device icon at first horizontal and vertical displacements from said first storage device icon, by retrieving said subordinate storage identifier from said first storage location data record, and by displaying said subordinate storage identifier proximate to said second storage device icon;

monitoring user input for selection of said second storage device icon; and responding to selection of said second storage device icon by displaying an optical medium icon at first horizontal and vertical displacements from said second storage device icon, by retrieving said medium identifier from said second storage location data record, and by displaying said medium identifier proximate to said optical medium icon.

7. A method for displaying and browsing an index comprising the contents of an off-line optical media storage device, said method comprising the steps of:

maintaining in computer-readable memory an off-line magazine data record corresponding to said off-line optical media storage device;

maintaining in computer-readable memory an optical medium data record corresponding to an optical medium, said optical medium storing computer-readable data, said off-line magazine data record having a medium identifier identifying said optical medium, said off-line optical media storage device storing said optical medium;

displaying an off-line magazine option to a user via a user computer;

monitoring user input for selection of said off-line magazine option;

responding to selection of said off-line magazine option by displaying an off-line magazine icon associated with said off-line optical media storage device;

monitoring user input for selection of said off-line magazine icon; and responding to selection of said off-line magazine icon by displaying an optical medium icon at first horizontal and vertical displacements from said off-line magazine icon, by retrieving said medium identifier from said off-line magazine data record, and by displaying said medium identifier proximate to said optical medium icon.

8. A method for verifying the location of an optical media device, said method comprising the steps of:

storing first data in a computer memory, said first data identifying said optical media device;

storing second data in the computer memory, said second data representing an expected storage location, said second data associated with said first data;

displaying a selectable representation of said optical media device to a user via a user interface of a user computer;

monitoring user input for selection of said selectable representation;

responding to selection of said selectable representation by transmitting commands via said user computer to an optical media device reader, said commands causing said optical media device reader to access said expected storage location;

determining via said optical media device reader whether said expected storage location is occupied;

reading via said optical media device reader the identity of a found optical media device occupying said expected storage location; and comparing said read identity to said first data.

9. The method as described in claim 8, wherein said method comprises the further step of:

removing said association between said first and second data;

storing third data in the computer memory, said third data identifying said found optical media device; and associating said third data with said second data.

10. The method as described in claim 8, wherein said optical media device comprises an optical disc, and said expected storage location comprises a tray of an optical disc storage magazine.

11. The method as described in claim 8, wherein said optical media device comprises an optical disc storage magazine, and said expected storage location comprises an optical disc jukebox.

12. A method for cataloging the contents of a removable computer-readable medium, said method comprising the steps of:

generating a first medium identifier identifying said removable computer-readable medium, said first medium identifier generated by iteratively combining data read from the removable computer-readable medium;

prompting a user to specify a maximum number of catalog levels;

monitoring user input for entry of said maximum number of catalog levels;

prompting a user to specify file filter parameters;

monitoring user input for entry of said file filter parameters;

reading from the removable computer-readable medium successive levels of files and directories up to said maximum number of catalog levels;

retaining attributes and names for directories and files which match said file filter parameters;

producing a first data stream comprising said retained names arranged such that names of directories precede names of files and names from a successive directory level follow names from a preceding directory level;

producing a second data stream comprising a series of fixed-length data blocks, each said fixed-length data block comprising said retained attributes of a file or directory, each said fixed-length data block having a pointer to a position in said first data stream at which an associated name occurs, each said fixed-length data block having a value corresponding to a length of an associated name, each fixed-length data block having attributes representing a directory having a pointer to a fixed-length data block corresponding to a file from said represented directory; and associating said first medium identifier with said first and second data streams.

13. The method as described in claim 12, further comprising the steps of:

generating a second medium identifier identifying a second removable computer-readable medium, said second medium identifier generated by iteratively combining data read from said second removable computer-readable medium;

comparing said second medium identifier to said first medium identifier; and determining said second medium identifier is equal to said first medium identifier, and responding to the finding of said equality by associating said first and second data streams to said second medium identifier.

\* \* \* \* \*